US012307949B2

(12) United States Patent
Zhang et al.

(10) Patent No.: US 12,307,949 B2
(45) Date of Patent: May 20, 2025

(54) DISPLAY PANEL HAVING PIXEL DRIVING CIRCUIT, DRIVING METHOD THEREOF AND DISPLAY DEVICE

(71) Applicants: Wuhan Tianma Microelectronics Co., Ltd., Wuhan (CN); Wuhan Tianma Microelectronics Co., Ltd. Shanghai Branch, Shanghai (CN)

(72) Inventors: Mengmeng Zhang, Wuhan (CN); Jieliang Li, Wuhan (CN); Xingyao Zhou, Wuhan (CN); Yue Li, Wuhan (CN); Lilian Kuang, Wuhan (CN)

(73) Assignees: Wuhan Tianma Microelectronics Co., Ltd., Wuhan (CN); Wuhan Tianma Microelectronics Co., Ltd, Shanghai Branch, Shanghai (CN)

( * ) Notice: Subject to any disclaimer, the term of this patent is extended or adjusted under 35 U.S.C. 154(b) by 0 days.

(21) Appl. No.: 18/202,528

(22) Filed: May 26, 2023

(65) Prior Publication Data

US 2023/0298513 A1 Sep. 21, 2023

Related U.S. Application Data

(63) Continuation of application No. 17/103,329, filed on Nov. 24, 2020, now abandoned.

(30) Foreign Application Priority Data

Aug. 6, 2020 (CN) ......................... 202010784841.1

(51) Int. Cl.
*G09G 3/32* (2016.01)
*G09G 3/20* (2006.01)

(52) U.S. Cl.
CPC ............. *G09G 3/32* (2013.01); *G09G 3/2092* (2013.01); *G09G 2310/0275* (2013.01); *G09G 2330/028* (2013.01)

(58) Field of Classification Search
CPC ... G09G 3/30–3291; G09G 2300/0426; G09G 2300/0439; G09G 2300/0465;
(Continued)

(56) References Cited

U.S. PATENT DOCUMENTS 6,229,506 B1 * 5/2001 Dawson ............... G09G 3/3233 345/82
2005/0200575 A1 * 9/2005 Kim ..................... G09G 3/3233 345/76

(Continued)

FOREIGN PATENT DOCUMENTS

CN 110264946 A 9/2019
CN 110322842 A 10/2019

(Continued)

OTHER PUBLICATIONS

First Office Action dated Apr. 9, 2021 for Chinese Patent Application No. 202010784841.1 (24 pages).

*Primary Examiner* — Keith L Crawley
(74) *Attorney, Agent, or Firm* — KDW Firm PLLC

(57) ABSTRACT

Provided are a display panel, a driving method, and a display device. The display panel includes: a gate driving circuit, a pixel driving circuit, and a light-emitting component. The pixel driving circuit includes a driving transistor, a data writing module, a threshold compensation module, and a light-emitting control module. A control terminal of the threshold compensation module and a control terminal of the light-emitting control module are electrically connected to a same gate driving circuit. The light-emitting control module includes a first light-emitting control unit and a second light-emitting control unit. The pixel driving circuit further comprises a blocking module which is electrically connected between the first power signal terminal and the first terminal of the driving transistor, and is connected in series to the first light-emitting control unit.

18 Claims, 40 Drawing Sheets

(58) Field of Classification Search
CPC ... G09G 2300/0814; G09G 2300/0819; G09G 2300/0842; G09G 2310/0216; G09G 2310/0251; G09G 2310/0275; G09G 2320/045; G09G 2330/028
See application file for complete search history.

(56) References Cited

U.S. PATENT DOCUMENTS

| | | | | |
|---|---|---|---|---|
| 2014/0333214 | A1* | 11/2014 | Okuno | G09G 3/32<br>315/172 |
| 2019/0096327 | A1* | 3/2019 | Peng | G09G 3/3241 |
| 2020/0388214 | A1* | 12/2020 | Yang | G09G 3/3266 |
| 2021/0142725 | A1* | 5/2021 | Yu | G09G 3/3233 |
| 2021/0312866 | A1* | 10/2021 | Fan | G09G 3/3233 |
| 2021/0407390 | A1* | 12/2021 | Li | G09G 3/3266 |
| 2022/0130933 | A1* | 4/2022 | Yu | H10K 59/1213 |
| 2022/0157238 | A1* | 5/2022 | Wang | G09G 3/3233 |

FOREIGN PATENT DOCUMENTS

| | | | | |
|---|---|---|---|---|
| CN | 111276096 | A | 6/2020 | |
| CN | 111341256 | A | 6/2020 | |
| WO | WO-2019037499 | A1 * | 2/2019 | G09G 3/3208 |

* cited by examiner

--Prior Art--

DISPLAY PANEL HAVING PIXEL DRIVING CIRCUIT, DRIVING METHOD THEREOF AND DISPLAY DEVICE

CROSS-REFERENCES TO RELATED APPLICATIONS

This is a Continuation Application of US patent application U.S. Ser. No. 17/103,329, which claims the priority to a Chinese patent application No. CN 202010784841.1 filed at the CNIPA on Aug. 6, 2020, disclosures of which are incorporated herein by reference in their entireties.

TECHNICAL FIELD

Embodiments of the present disclosure relate to the field of display technologies and, in particular, to a display panel, a driving method, and a display device.

BACKGROUND

A light-emitting display panel usually includes a display area and a non-display area. The display area is provided with multiple pixel driving circuits and light-emitting components. The pixel driving circuit is used for driving the light-emitting components to emit light for displaying images. The non-display area is provided with a gate driving circuit to provide a control signal for the pixel driving circuit, so that the light-emitting components are lit up row by row under the driving of the pixel driving circuits.

At present, for an organic light-emitting display panel, a 7T1C-type pixel driving circuit usually requires at least three gate driving circuits to provide a control signal for this pixel driving circuit. Therefore, the non-display area needs to reserve positions for three gate driving circuits, which is not is beneficial to implementing the narrow bezel.

SUMMARY

The present disclosure provides a display panel, a driving method and a display device to reduce the number of gate driving circuits, the cost and the frame width.

In a first aspect, an embodiment of the present disclosure provides a display panel, including a gate driving circuit, a pixel driving circuit, and a light-emitting component; the pixel driving circuit includes a driving transistor, a data writing module, a threshold compensation module, and a light-emitting control module.

The data writing module is used for transmitting a data voltage signal to a control terminal of the driving transistor such that the driving transistor generates a driving current according to the data voltage signal provided by a data signal terminal.

The threshold compensation module is used for detecting and self-compensating a threshold voltage deviation of the driving transistor.

The light-emitting control module is connected in series between a first power signal terminal and the light-emitting component.

A transistor in the threshold compensation module is a P-type transistor and a transistor in the light-emitting control module is an N-type transistor, or the transistor in the threshold compensation module is an N-type transistor and the transistor in the light-emitting control module is P-type transistor; a control terminal of the threshold compensation module and a control terminal of the light-emitting control module are electrically connected to a same gate driving circuit.

In a second aspect, an embodiment of the present disclosure further provides a driving method of a display panel. The driving method is applicable to the display panel described in the first aspect and includes steps described below.

In a data writing phase, a data writing module is turned on under the control of the gate driving signal and a data voltage signal is wrote into a control terminal of a driving transistor; at the same time, a threshold compensation module is turned on under the control of the gate driving signal, and a threshold voltage deviation of the driving transistor is detected and self-compensated.

In a light-emitting phase, a light-emitting control module is turned on under the control of the gate driving signal, and a driving current generated by the driving transistor is controlled to flow into a light-emitting component to drive the light-emitting component to emit light.

The threshold compensation module and the light-emitting control module are controlled by the gate driving signal output by a same gate driving circuit, and the threshold compensation module is turned on in response to the gate driving signal being at a first level, and the light-emitting control module is turned on in response to the gate driving signal being at a second level; the first level and the second level are different.

In a third aspect, an embodiment of the present disclosure further provides a display device including the display panel described in the first aspect.

In the display panel provided by the embodiment of the present disclosure, through configuring a same gate driving circuit to provide the control signal for the threshold compensation module and the light-emitting control module, there is no need to separately provide a gate driving circuit for the threshold compensation module, which reduces the total number of gate driving circuits for providing the control signal for the pixel driving circuit, thereby reducing the width of the frame area, solving the problem of low screen-to-body ratio and achieving the effect of reducing the number of gate driving circuits, the cost and the frame.

DETAILED DESCRIPTION

Figure 1:
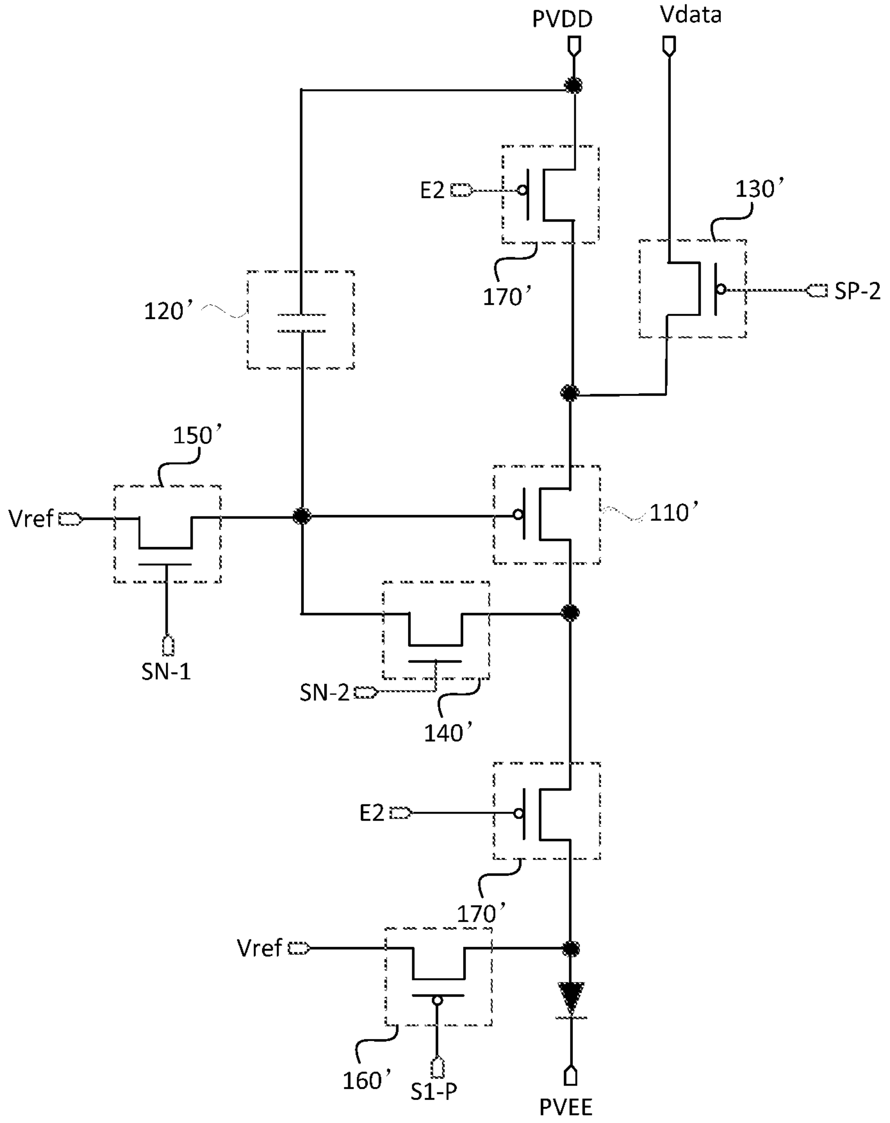
FIG. 1 is a schematic diagram showing circuit components of a pixel driving circuit provided by the related art.

Hereinafter the present disclosure will be further described in detail in conjunction with the drawings and embodiments. It is to be understood that the embodiments set forth herein are intended to explain the present disclosure and not to limit the present disclosure. Additionally, it is to be noted that for ease of description, merely part, not all, of the structures related to the present disclosure are illustrated in the drawings.

Figure 2:
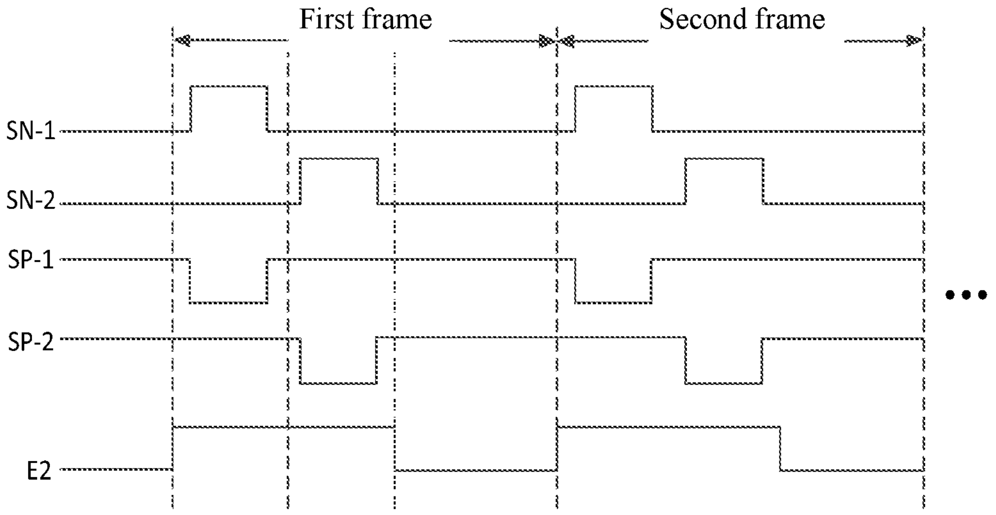
FIG. 2 is a driving timing graph illustrating a pixel driving circuit illustrated in FIG. 1.

FIG. 1 is a schematic diagram showing circuit components of a pixel driving circuit provided by the related art. FIG. 2 is a driving timing graph illustrating a pixel driving circuit illustrated in FIG. 1. Referring to FIG. 1, the pixel driving circuit includes: a driving transistor 110', a storage module 120', a data writing module 130', a threshold compensation module 140', a first initialization module 150', a second initialization module 160', and a light-emitting control module 170'. The gate driving circuit used for providing a control signal for the pixel driving circuit includes a first gate driving circuit, a second gate driving circuit, and a third gate driving circuit. The first gate driving circuit provides the control signal for the first initialization module 110' and the threshold compensation module 140'. Specifically, the first gate driving circuit includes multiple cascaded first gate driving units, a control terminal of the first initialization module 150' is electrically connected to an output terminal SN-1 of the first gate driving unit at a previous stage; a control terminal of the threshold compensation module 140' is electrically connected to an output terminal SN-2 of the first gate driving unit at a current stage. The second gate driving circuit provides the control signal for the second initialization module 160' and the data writing module 130'. Specifically, the second gate driving circuit includes multiple second gate driving units. A control terminal of the second initialization module 160' is electrically connected to an output terminal SP-1 of the second gate driving unit at a previous stage, and a control terminal of the data writing module 130' is electrically connected to an output terminal SP-2 of the second gate driving unit at a current stage. The third gate driving circuit provides the control signal for the light-emitting control module 170'. Specifically, the third gate driving circuit includes multiple cascaded third gate driving units, and a control terminal of the light-emitting control module 170' is electrically connected to an output terminal E2 of the third gate driving unit at a current stage. It can be seen that the display panel including the pixel driving circuit needs to reserve space for the three gate driving circuits in a non-display area, which is not is beneficial to implementing the narrow bezel.

In view of the above problems, an embodiment of the present disclosure provides a display panel, including a gate driving circuit, a pixel driving circuit, and a light-emitting component; the pixel driving circuit includes a driving transistor, a data writing module, a threshold compensation module, and a light-emitting control module.

The data writing module is used for transmitting a data voltage signal to a control terminal of the driving transistor such that the driving transistor generates a driving current according to the data voltage signal provided by a data signal terminal.

The threshold compensation module is used for detecting and self-compensating a threshold voltage deviation of the driving transistor;

The light-emitting control module is connected in series between a first power signal terminal and the light-emitting component.

A transistor in the threshold compensation module is a P-type transistor and a transistor in the light-emitting control module is an N-type transistor, or the transistor in the threshold compensation module is an N-type transistor and the transistor in the light-emitting control module is P-type transistor; a control terminal of the threshold compensation module and a control terminal of the light-emitting control module are electrically connected to a same gate driving circuit.

The preceding is the core idea of this application, and technical solutions in embodiments of the present disclosure will be described clearly and completely in conjunction with the drawings in embodiments of the present disclosure. Apparently, the embodiments described below are part, not all of embodiments of the present disclosure. Based on embodiments of the present disclosure, all other embodiments obtained by those skilled in the art without creative work are within the scope of the present disclosure.

Figure 3:
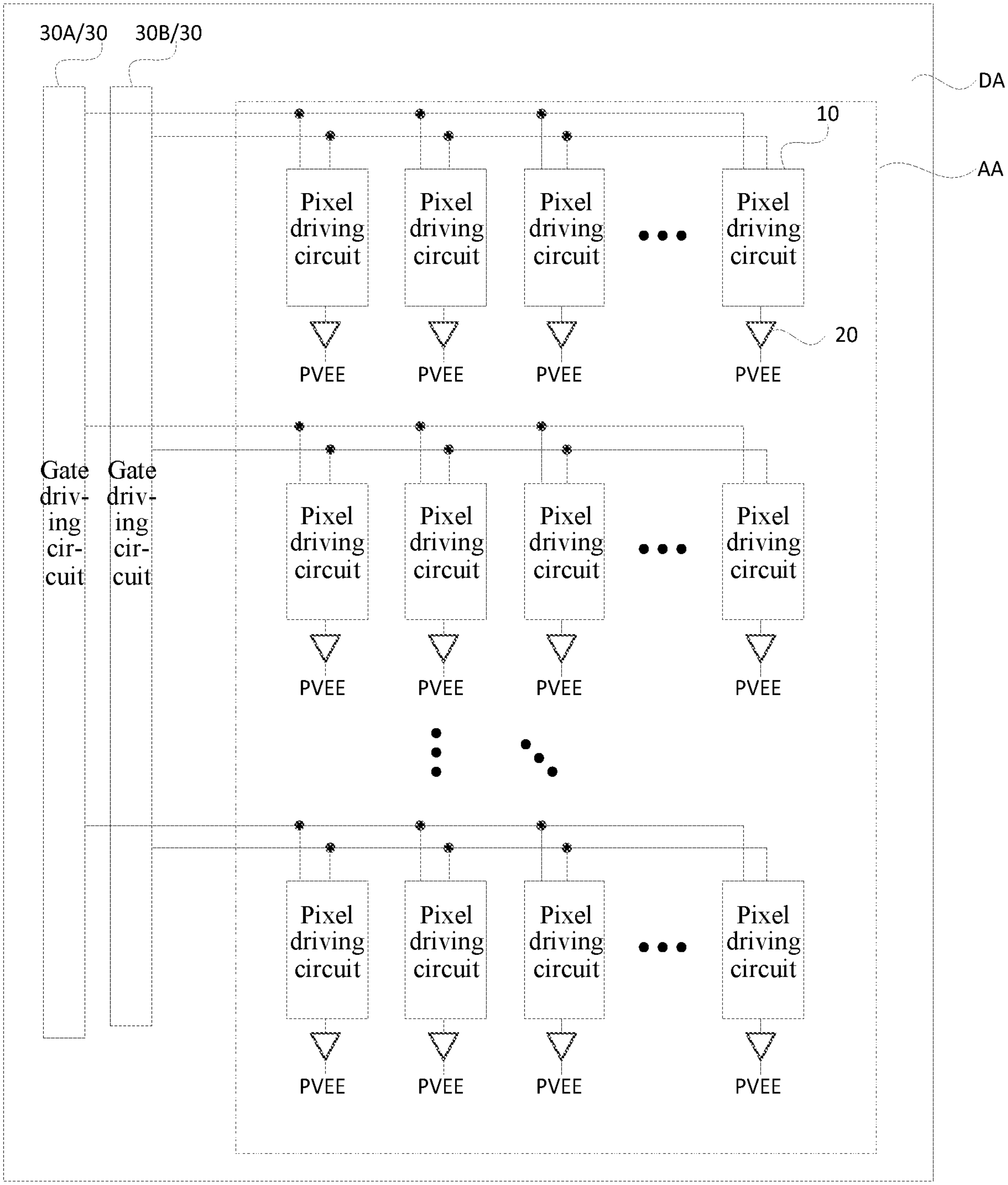
FIG. 3 is a structural diagram of a display panel provided by an embodiment of the present disclosure.
Figure 4:
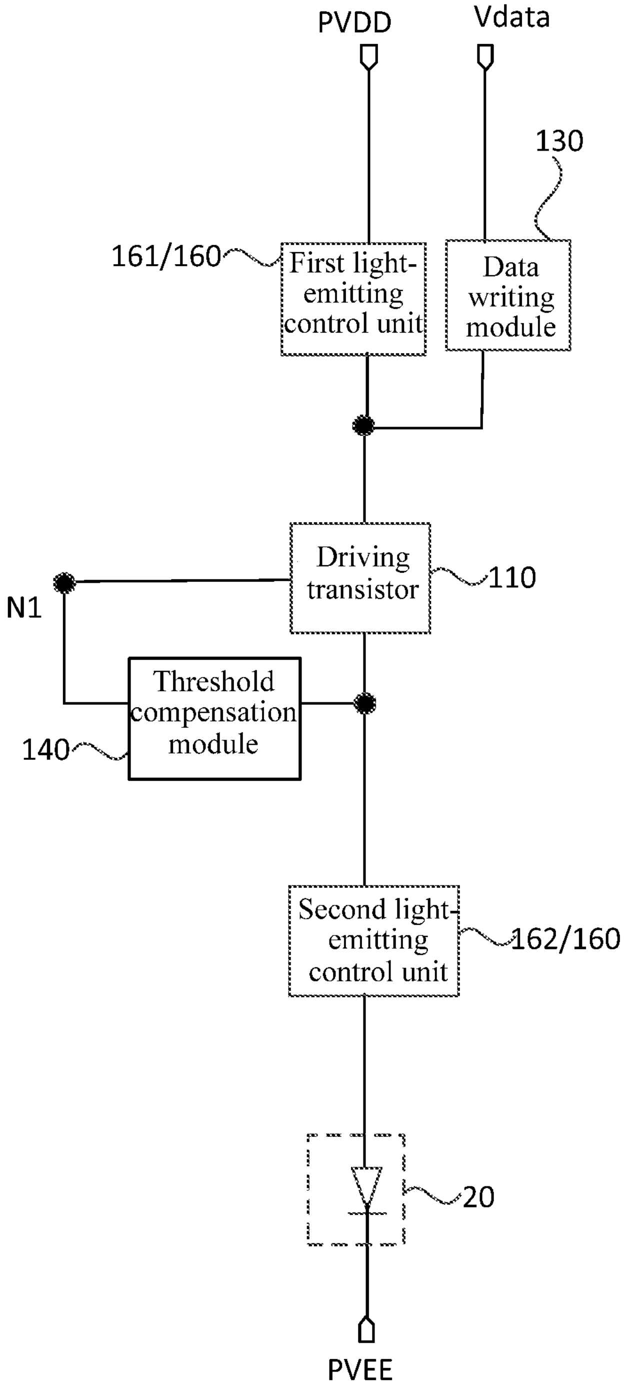
FIG. 4 is a block diagram of a pixel driving circuit provided by an embodiment of the present disclosure.
Figure 5:
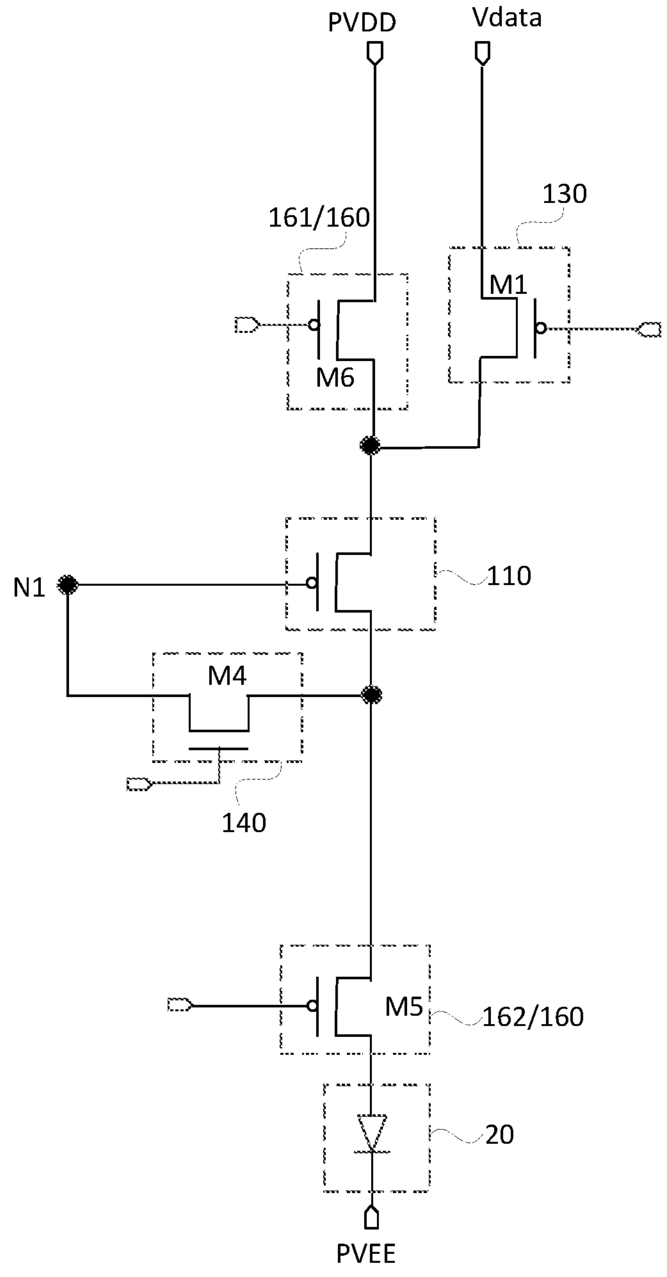
FIG. 5 is a schematic diagram showing circuit components of a pixel driving circuit shown in FIG. 4.

FIG. 3 is a structural diagram of a display panel provided by an embodiment of the present disclosure. FIG. 4 is a block diagram of a pixel driving circuit provided by an embodiment of the present disclosure. FIG. 5 is a schematic diagram showing circuit components of a pixel driving circuit shown in FIG. 4. Referring to FIGS. 3 to 5, a display panel includes: a gate driving circuit 30, a pixel driving circuit 10, and a light-emitting component 20; the pixel driving circuit 10 includes a driving transistor 110, a data writing module 130, a threshold compensation module 140 and a light-emitting control module 160. The data writing module 130 is used for transmitting a data voltage signal to a control terminal of the driving transistor 110 such that the driving transistor 110 generates a driving current according to the data voltage signal provided by a data signal terminal. The threshold compensation module 140 is used for detecting and self-compensating a threshold voltage deviation of the driving transistor 110. The light-emitting control module 160 is connected in series between a first power signal terminal PVDD and the light-emitting component 20. A transistor in the threshold compensation module 140 is a P-type transistor and a transistor in the light-emitting control module 160 is an N-type transistor, or the transistor in the threshold compensation module 140 is an N-type transistor and the transistor in the light-emitting control module 160 is P-type transistor; a control terminal (not shown in FIGS. 4 and 5) of the threshold compensation module 140 and a control terminal (not shown in FIGS. 4 and 5) of the light-emitting control module 160 are electrically connected to a same gate driving circuit 30.

Referring to FIGS. 4 and 5, optionally, the driving transistor 110 is electrically connected between the data writing module 130 and the threshold compensation module 140; the data writing module 130 is electrically connected to a data line signal terminal Vdata and a first terminal of the driving transistor 110; a first terminal of the threshold compensation module 140 and the control terminal of the driving transistor 110 are electrically connected to a first node N1, and a second terminal of the threshold compensation module 140 is electrically connected to a second terminal of the driving transistor 110.

Referring to FIGS. 4 and 5, optionally, a control terminal (not shown in FIGS. 4 and 7) of the data writing module 130 is electrically connected to the gate driving circuit 30.

Figure 6:
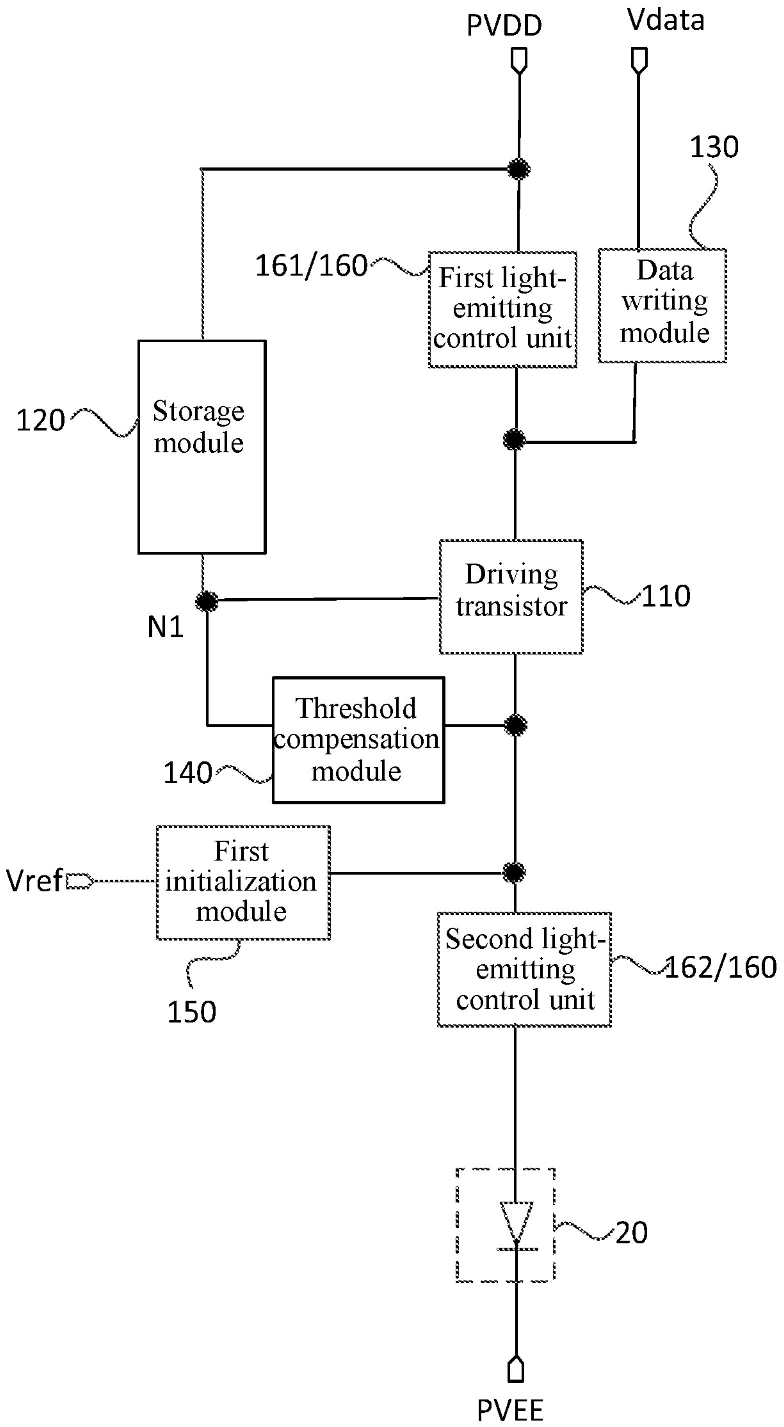
FIG. 6 is a block diagram of another pixel driving circuit provided by an embodiment of the present disclosure.
Figure 7:
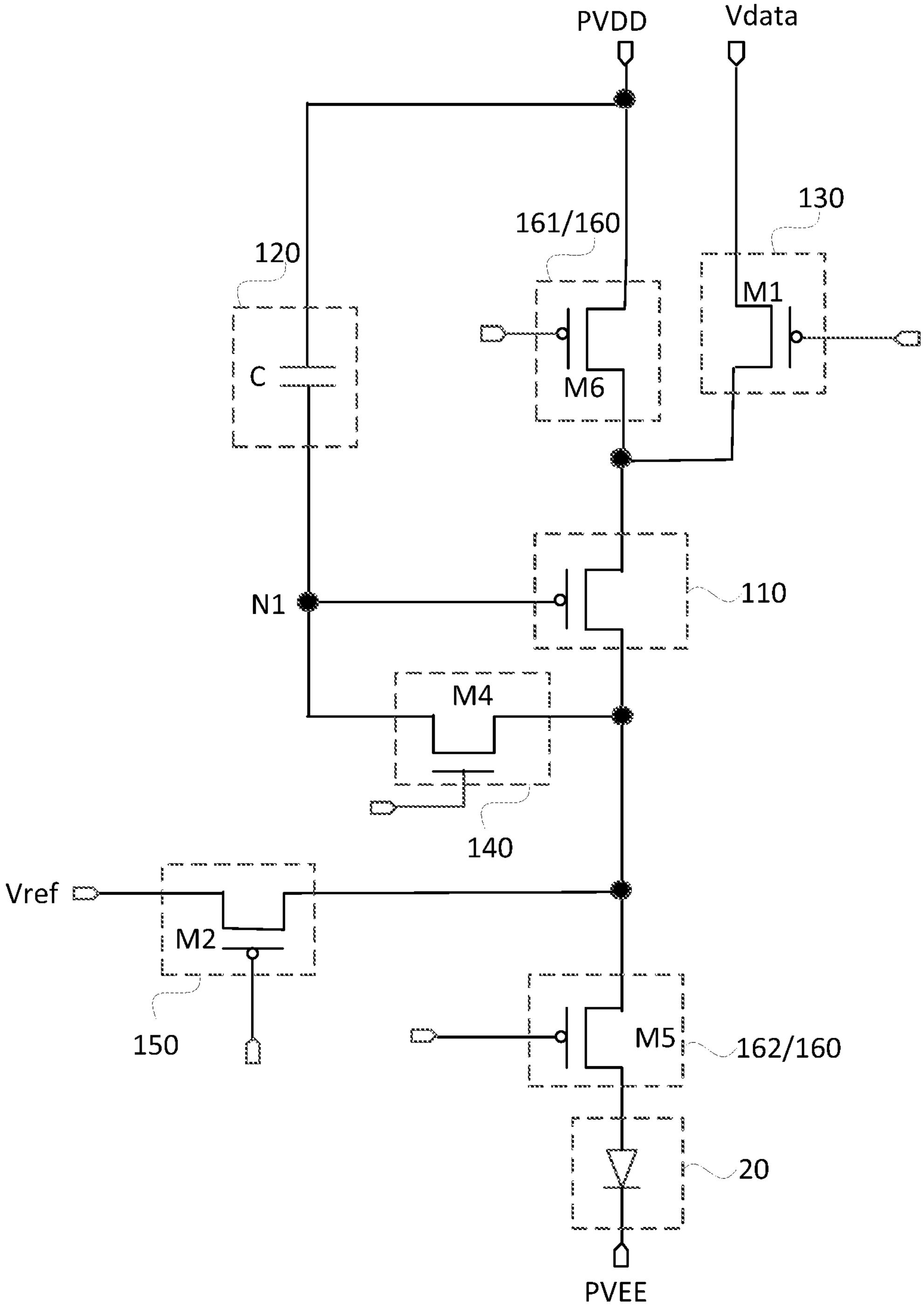
FIG. 7 is a schematic diagram showing circuit components of a pixel driving circuit shown in FIG. 6.

FIG. 6 is a block diagram of another pixel driving circuit provided by an embodiment of the present disclosure. FIG. 7 is a schematic diagram showing circuit components of a pixel driving circuit shown in FIG. 6. Referring to FIGS. 3, 6 and 7, a display panel further includes a first initialization module 150. A control terminal (not shown in FIGS. 6 and 7) of the first initialization module 150 is electrically connected to a gate driving circuit 30; and the first initialization module 150 is used for providing an initialization voltage signal to a control terminal of a driving transistor.

Referring to FIGS. 6 and 7, optionally, the display panel further includes a storage module 120 which is electrically connected between a first power signal terminal PVDD and the control terminal of the driving transistor and is used for stabilizing a voltage of the control terminal of the driving transistor in a light-emitting phase.

Figure 8:
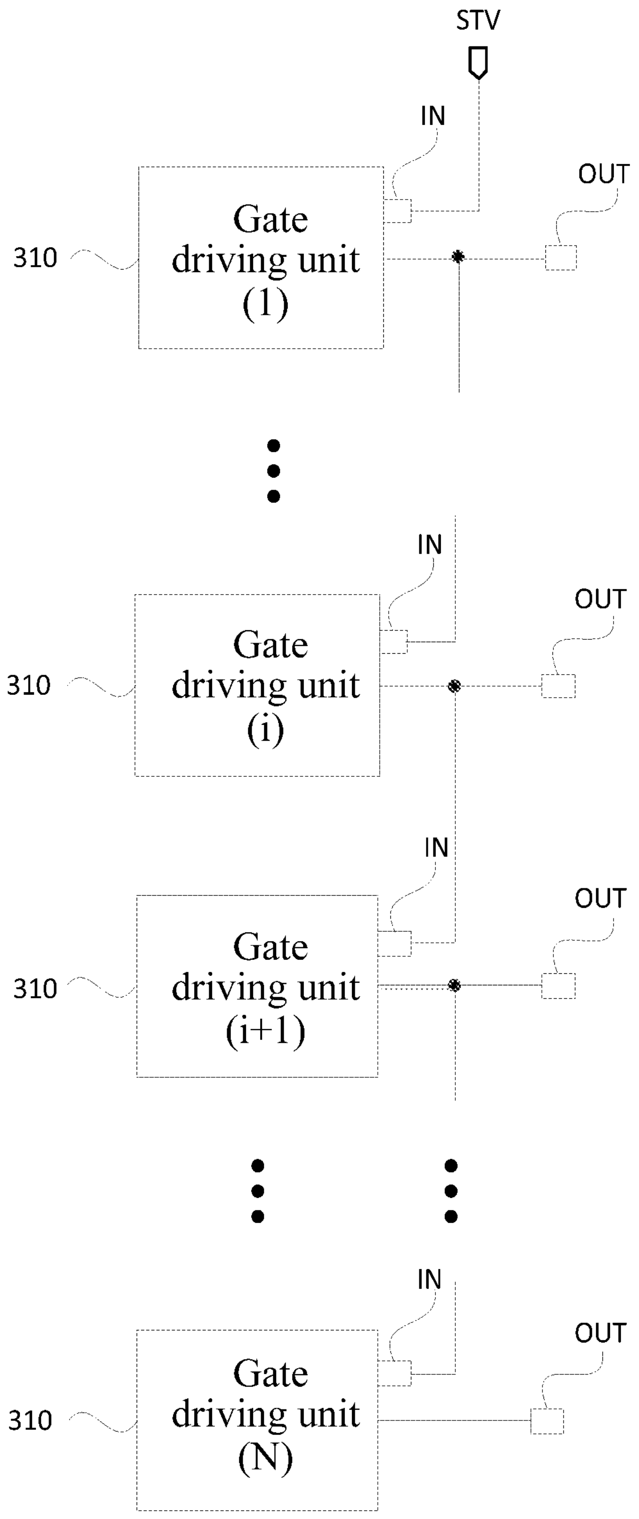
FIG. 8 is a block diagram of a gate driving circuit provided by an embodiment of the present disclosure.

Specifically, the display panel includes a display area AA and a non-display area DA around the display area AA. The display area AA is provided with multiple sub-pixels. Each sub-pixel includes a pixel driving circuit 10 and a light-emitting component 20. The pixel driving circuit 10 is configured to drive the light-emitting component 20 to emit light to display image information. The non-display area DA is used for setting peripheral circuits such as a gate driving circuit 30. Exemplarily, FIG. 8 is a block diagram of a gate driving circuit provided by an embodiment of the present disclosure. Referring to FIG. 8, the gate driving circuit 30 includes N cascaded gate driving units 310, where a gate driving unit (i) represents an i-th stage gate driving unit. The meaning of cascade is that an output terminal OUT of the i-th stage gate driving unit is electrically connected to an input terminal IN of an (i+1)-th stage gate driving unit, and an input terminal IN of a first stage gate driving unit is electrically connected to an enabling signal terminal STV of the display panel, where N is a positive integer greater than or equal to 1, i is an integer, and $1 \le i \le N-1$. An output terminal of each gate driving unit 310 may output a gate driving signal which is used for controlling turn-on and turn-off of the data writing module 130, the threshold compensation module 140, the first initialization module 150 and the light-emitting control module 160 in the pixel driving circuit 10, thereby enabling the pixel driving circuit 10 to drive the light-emitting component 20 to emit light.

Specifically, in the pixel driving circuit 10, an initialization signal terminal Vref is used for receiving the initialization voltage signal, a first power signal terminal PVDD is used for receiving a first power voltage signal, and a data line signal terminal Vdata is used for receiving a data voltage signal. The brightness of the light-emitting component 20 driven by the pixel driving circuit 10 is determined by the voltage value of the data voltage signal. Exemplarily, the initialization voltage signal, the first power voltage signal, and the data voltage signal may all be provided by a driving IC.

Specifically, a first terminal of the first initialization module 150 is electrically connected to the initialization signal terminal Vref. The first initialization module 150 is at least turned on in an initialization phase, and writes the initialization voltage signal into a first node N1, so that the driving transistor 110 is able to be turned on in a data writing phase, and further the data voltage signal is able to be written into the first node N1. It should be noted that FIGS. 6 and 7 only exemplarily show that a second terminal of the first initialization module 150 is electrically connected to a second terminal of the driving transistor 110, but this is not a limitation to the present disclosure. For example, in other embodiments, the second terminal of the first initialization module 150 may also be electrically connected to the first node N1. It should also be noted that by reasonably configuring a connection position of the second terminal of the first initialization module 150 in the pixel driving circuit 10, and reasonably configuring a connection mode between each module in the pixel driving circuit 10 and the gate driving unit in the gate driving circuit 30, the first initialization module 150 may also be used for providing the initialization voltage signal for an anode of the light-emitting component 20 in some embodiments. This part of contents will be described in detail later and not be described here. Referring to FIG. 7, optionally, the first initialization module 150 includes a second transistor M2. A first terminal of the second transistor M2 is electrically connected to the initialization signal terminal Vref. What kind of device is connected to a second terminal of the second transistor M2 will be described in detail later, a control terminal of the second transistor M2 is electrically connected to an output terminal of the gate driving circuit 30.

Specifically, the storage module 120 may include one capacitor C (as shown in FIG. 7), or multiple capacitors C connected in parallel. The storage module 120 is used for storing a voltage provided by the data voltage signal in a data writing phase so as to maintain the voltage of the first node N1 almost unchanged in the entire light-emitting phase. Specifically, the driving transistor 110 is used for generating a driving current having a corresponding size according to a size of the data voltage signal in the light-emitting phase, so that the light-emitting brightness of the light-emitting component 20 matches the size of the data voltage signal.

Specifically, in the data writing phase, the data writing module 130 is turned on under the control of the gate driving signal, and writes the data voltage signal of the data signal terminal Vdata into the first node N1, and at the same time, the threshold compensation module 14 is turned on under the control of the gate driving signal and compensates a threshold voltage of the driving transistor 110 to the first node N1. Referring to FIG. 7, optionally, the data writing module 130 includes a first transistor M1, a first terminal of the first transistor M1 is electrically connected to the data signal terminal Vdata, a second terminal of the first transistor M1 is electrically connected to the first terminal of the driving transistor 110, and a control terminal of the first transistor M1 is electrically connected to the output terminal of the gate driving circuit 30. Optionally, the threshold compensation module 140 includes a fourth transistor M4, a first terminal of the fourth transistor M4 is electrically connected to the first node N1, a second terminal of the fourth transistor M4 is electrically connected to the second terminal of the driving transistor 110, and a control terminal of the fourth transistor M4 is electrically connected to the output terminal of the gate driving circuit 30.

Referring to FIG. 4, optionally, the light-emitting control module 160 includes a first light-emitting control unit 161 and a second light-emitting control unit 162; the first light-emitting control unit 161 is electrically connected between the first power signal terminal PVDD and the first terminal of the driving transistor 110; and the second light-emitting control unit 162 is electrically connected between the second terminal of the driving transistor 110 and the light-emitting component 20. Referring to FIG. 7, optionally, the first light-emitting control unit 161 includes a sixth transistor M6, a first terminal of the sixth transistor M6 is electrically connected to the first power signal terminal PVDD, and a second terminal of the sixth transistor M6 is electrically connected to the first terminal of the driving transistor 110, and a gate of the sixth transistor M6 is electrically connected to the output terminal of the gate driving circuit 30; the second light-emitting control unit 162 includes a fifth transistor M5, and a first terminal of the fifth transistor M5 is electrically connected to the second terminal of the driving transistor 110, a second terminal of the fifth transistor M5 is electrically connected to the anode of the light-emitting component 20, a cathode of the light-emitting component 20 is electrically connected to the second power signal terminal PVEE, and the second power signal terminal PVEE is used for receiving a second power voltage signal, exemplarily, the second power voltage signal may be provided by the driving IC.

Specifically, a working process of the pixel driving circuit 10 usually includes the initialization phase, the data writing phase, and the light emitting phase. In the initialization phase, the first initialization module 150 is turned on under the control of the gate driving signal, and at least writes the initialization voltage signal into the first node N1 to initialize the first node N1. In the data writing phase, the data writing module 130 is turned on under the control of the gate driving signal and writes the data voltage signal into the first node N1, and at the same time, the threshold compensation module 140 is turned on under the control of the gate driving signal and compensates the threshold voltage of the driving transistor 110 to the first node N1. In the light-emitting phase, the light-emitting control module 160 is turned on under the control of the gate driving signal, and controls the driving current generated by the driving transistor 110 to flow into the light-emitting component 20 to drive the light-emitting component 20 to emit light. Specifically, how the gate driving signal output by each gate driving unit controls the data writing module 130, the threshold compensation module 140, the first initialization module 150, and the light-emitting control module 160 in the corresponding pixel driving circuit 10 will be described later in detail, and thus no further details are provided herein.

It is understandable that since the threshold compensation module 140 and the light-emitting control module 160 are provided with the gate driving signal by a same gate driving circuit 30, compared with the related art, at least one gate driving circuit 30 may be saved in the display panel, according to design concepts of saving the cost and reducing the frame, optionally, the display panel includes at most two gate driving circuits 30. Specifically, the display panel may include one or two gate driving circuits 30. Compared with a case where at least three gate driving circuits 30 need to be configured in the existing art, at most two gate driving circuits 30 are configured to provide the control signal for the pixel driving circuit 10, which may reduce a size of a space reserved by the non-display area DA, thereby reducing the frame area.

In the display panel provided by the embodiment of the present disclosure, through configuring a same gate driving circuit to provide the control signal for the threshold compensation module and the light-emitting control module, there is no need to separately provide a gate driving circuit for the threshold compensation module, which reduces the total number of gate driving circuits for providing the control signal for the pixel driving circuit, thereby reducing the width of the frame area, solving the problem of low screen-to-body ratio and implementing the effect of reducing the number of gate driving circuits, the cost and the frame.

Specifically, when the display panel includes one gate driving circuit 30 or two gate driving circuits 30, there are many specific implementation modes of the pixel driving circuit 10 and specific connection modes of the gate driving circuit 30 and the pixel driving circuit 10. Typical examples are described below, but the present application is not limited thereto.

Figure 9:
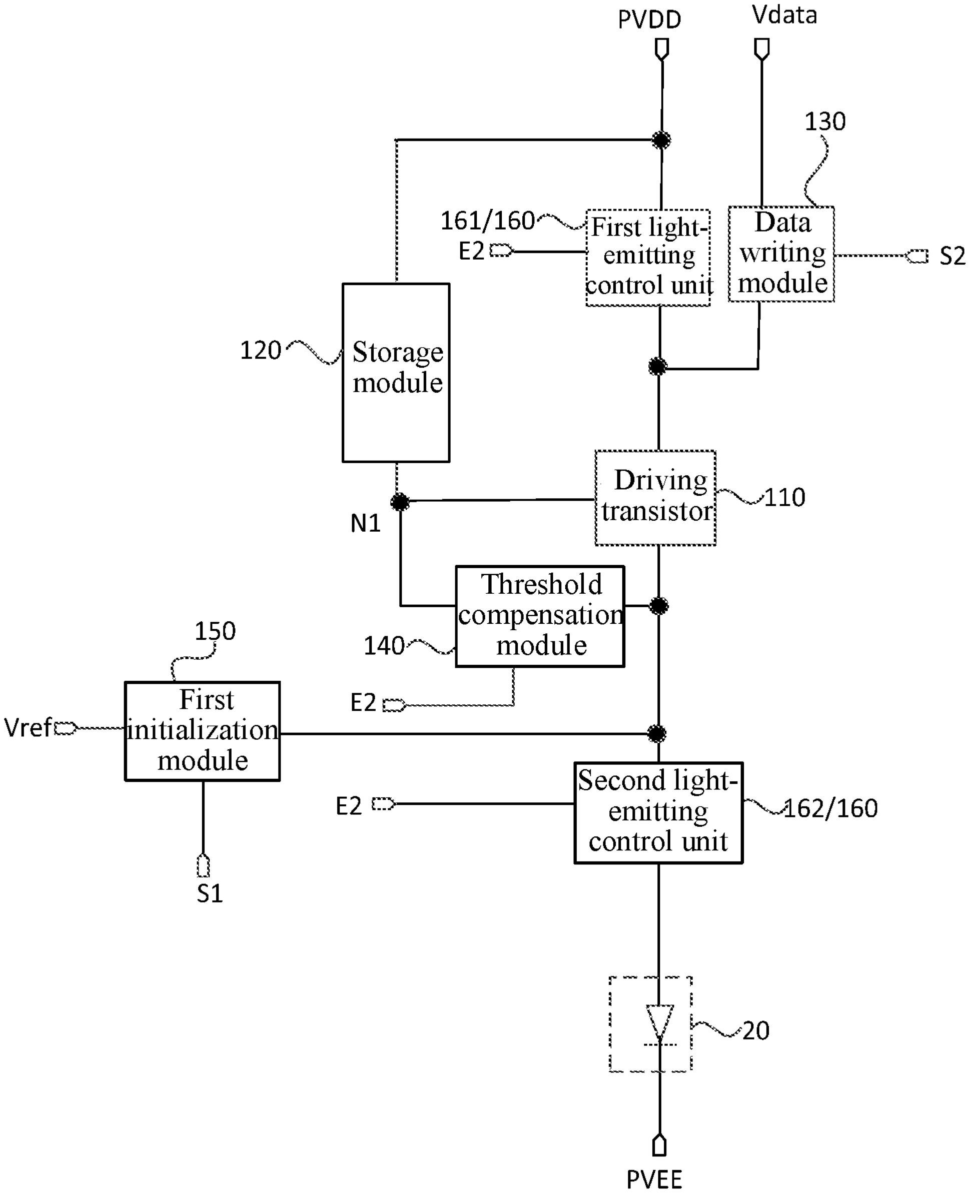
FIG. 9 is a block diagram of another pixel driving circuit provided by an embodiment of the present disclosure.

FIG. 9 is a block diagram of another pixel driving circuit provided by an embodiment of the present disclosure. Referring to FIGS. 3 and 7, optionally, a display panel includes a first gate driving circuit 30A and a second gate driving circuit 30B. The first gate driving circuit 30A includes multiple cascaded first gate driving units, the second gate driving circuit 30B includes multiple cascaded second gate driving units. A control terminal of a data writing module 130 is electrically connected to an output terminal S2 of the second gate driving unit at a current stage; a control terminal of a first light-emitting control unit 161 and a control terminal of a threshold compensation module 140 are electrically connected to an output terminal E2 of the first gate driving unit at a current stage; a control terminal of a second light-emitting control unit 162 is electrically connected to an output terminal E2 of the first gate driving unit at a current stage; a first initialization module 150 is electrically connected between an initialization signal terminal Vref and a second terminal of a driving transistor 110, and a control terminal of the first initialization module 150 is electrically connected to an output terminal S1 of the second gate driving unit at a previous stage.

Specifically, for a certain pixel driving circuit 10 in the display panel, the first gate driving unit at the current stage, the first gate driving unit at the subsequent stage, the second gate driving unit at the previous stage, and the second gate driving unit at the current stage corresponding to the certain pixel driving circuit 10 is related to a specific position of the certain pixel driving circuit 10 in the display panel. Optionally, multiple pixel driving circuits 10 are arranged in X rows and Y columns. The first gate driving circuit 30A includes X-stage cascaded first gate driving units; and the second gate driving circuit 30B includes (X+1)-stage cascaded second gate driving units. The first gate driving unit at the current stage of the pixel driving circuit 10 located in a j-th row is a first gate driving unit in a j-th stage, and the second gate driving unit at the current stage is a second gate driving unit in a (j+1)-th stage, the second gate driving unit at the previous stage is a second gate driving unit in a j-th stage, where X and Y are both positive integers greater than or equal to 1, and 1≤j≤X.

Figure 10:
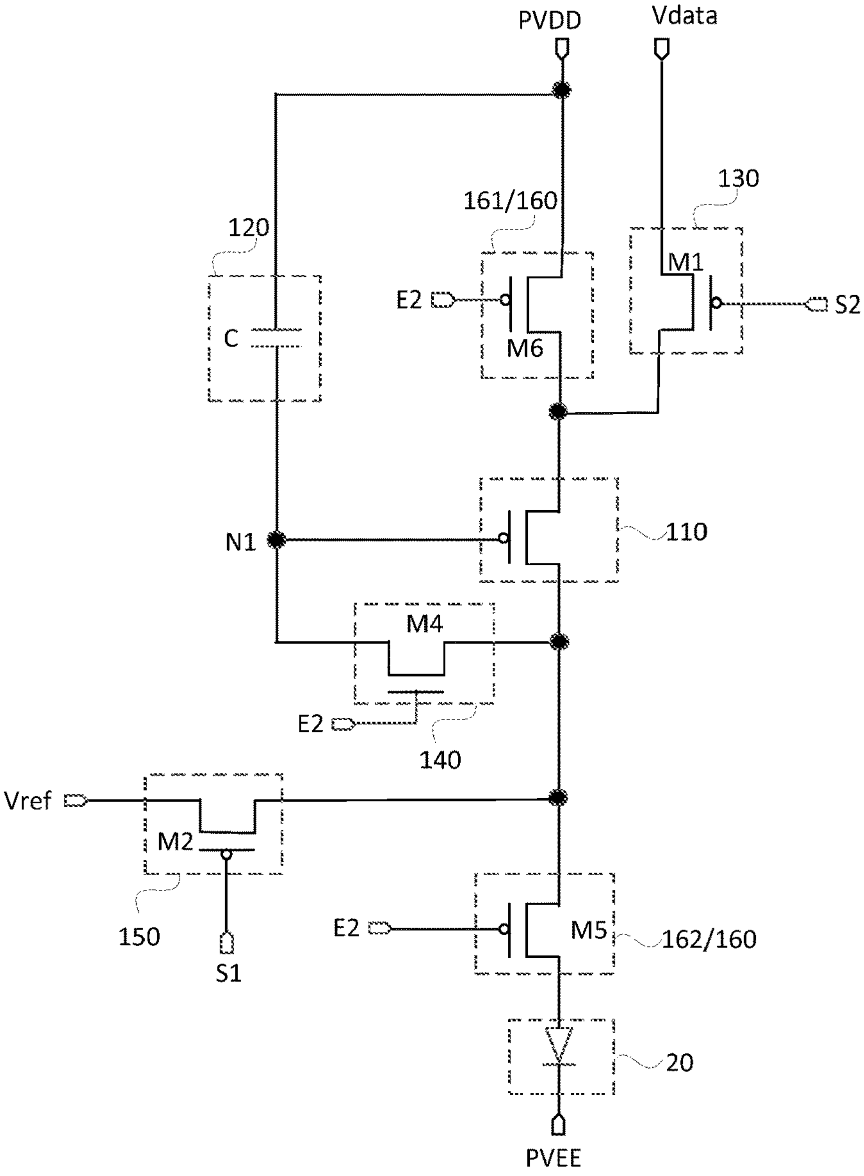
FIG. 10 is a schematic diagram showing circuit components of a pixel driving circuit shown in FIG. 9.
Figure 11:
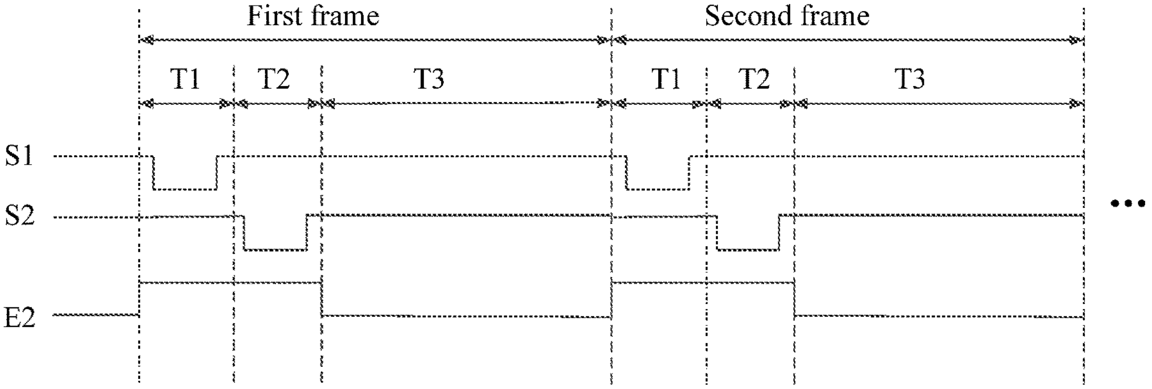
FIG. 11 is a driving timing graph provided by an embodiment of the present disclosure.

FIG. 10 is a schematic diagram showing circuit components of a pixel driving circuit shown in FIG. 9. FIG. 11 is a driving timing graph provided by an embodiment of the present disclosure. A working process of the pixel driving circuit 10 shown in FIG. 10 at a driving timing shown in FIG. 11 is as follows.

In a T1 phase, i.e., in an initialization phase, a second gate driving signal at the previous stage output by the output terminal S1 of the second gate driving unit at the previous stage is a logic low-level signal, and a second transistor M2 is turned on; the second gate driving signal at the current stage output by the output terminal S2 of the second gate driving unit is a logic high-level signal, and a first transistor M1 is turned off; the first gate driving signal at the current stage output by the output terminal E2 of the first gate driving unit at the current stage is a logic high-level signal, a fourth transistor M4 is turned on, and a fifth transistor M5 and a sixth transistor M6 are turned off. The initialization voltage signal of the initialization signal terminal Vref is written into a first node N1 through the turned-on second transistor M2 and the turned-on fourth transistor M4, where the initialization voltage signal provided by the initialization signal terminal Vref is a logic low-level signal to ensure the driving transistor 110M3 in a next phase is able to be turned on.

In a T2 stage, i.e., in a data writing phase, the second gate driving signal at the previous stage is the logic high-level signal, the second transistor M2 is turned off; the second gate driving signal at the current stage is the logic low-level signal, the first transistor M1 is turned on; and the first gate driving signal at the current stage is the logic high-level signal, the fourth transistor M4 is turned on, and the fifth transistor M5 and the sixth transistor M6 are turned off. The data voltage signal Vd of the data signal terminal Vdata is written into the control terminal of the driving transistor 110 (i.e., the first node N1) and a first electrode plate of the capacitor C (i.e., an electrode plate connected to the driving transistor 110) through the first transistor M1, the driving transistor 110, and the fourth transistor M4 sequentially, so that a voltage of the control terminal of the driving transistor 110 gradually increases until a voltage difference between the voltage of the control terminal of the driving transistor 110 and the voltage of a first terminal of the driving transistor 110 is equal to the threshold voltage Vth of the driving transistor 110, that is, a voltage of the control terminal of the driving transistor VN1=Vd where Vd is the data voltage signal provided by the data signal terminal Vdata; at the same time, the voltage of the control terminal of the driving transistor 110 is stored in the capacitor C.

In a T3 stage, i.e., in a light-emitting phase, the second gate driving signal at the previous stage is the logic high-level signal, the second transistor M2 is turned off; the second gate driving signal at the current stage is the logic high-level signal, the first transistor M1 is turned off; and the first gate driving signal at the current stage is the logic low-level signal, the fourth transistor M4 is turned off, and the fifth transistor M5 and the sixth transistor M6 are turned on. The power signal voltage Vpvdd of the first power signal terminal PVDD is written into the first terminal of the driving transistor 110 through the turned-on sixth transistor M6. At this time, the voltage difference between the voltage of the first terminal of the driving transistor 110 and the voltage of the control terminal of the driving transistor 110 is Vsg=Vpvdd−Vd+|Vth|, the driving transistor 110 generates a driving current, the driving current flows into the light-emitting component 20 through the fifth transistor M5, and drives the light-emitting component 20 to emit light. A driving current Id is:

$$I_d = \frac{1}{2}\mu C_{ox}\frac{W}{L}(V_{sg} - |V_{th}|)^2 = \frac{1}{2}\mu C_{ox}\frac{W}{L}(V_{pvdd} - V_d + |V_{th}| - |V_{th}|)^2 + \frac{1}{2}\mu C_{ox}\frac{W}{L}(V_{pvdd} - V_d)^2$$

μ is a carrier mobility, Cox is a channel capacitance C of the driving transistor 110 per unit area, and $$\frac{W}{L}$$

is a width to length ratio of the driving transistor 110.

Figure 12:
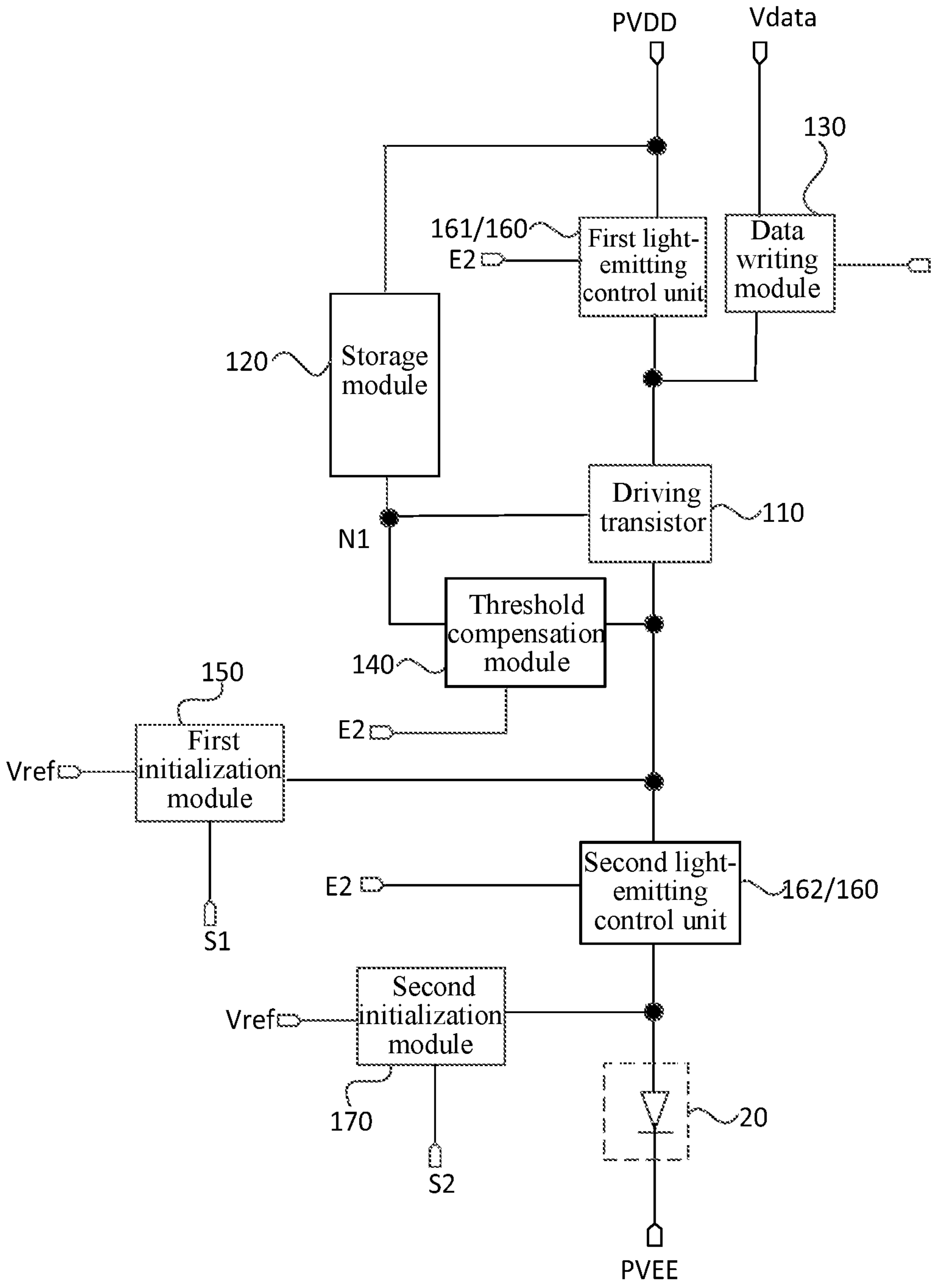
FIG. 12 is a block diagram of another pixel driving circuit provided by an embodiment of the present disclosure.

FIG. 12 is a block diagram of another pixel driving circuit provided by an embodiment of the present disclosure.

Figure 13:
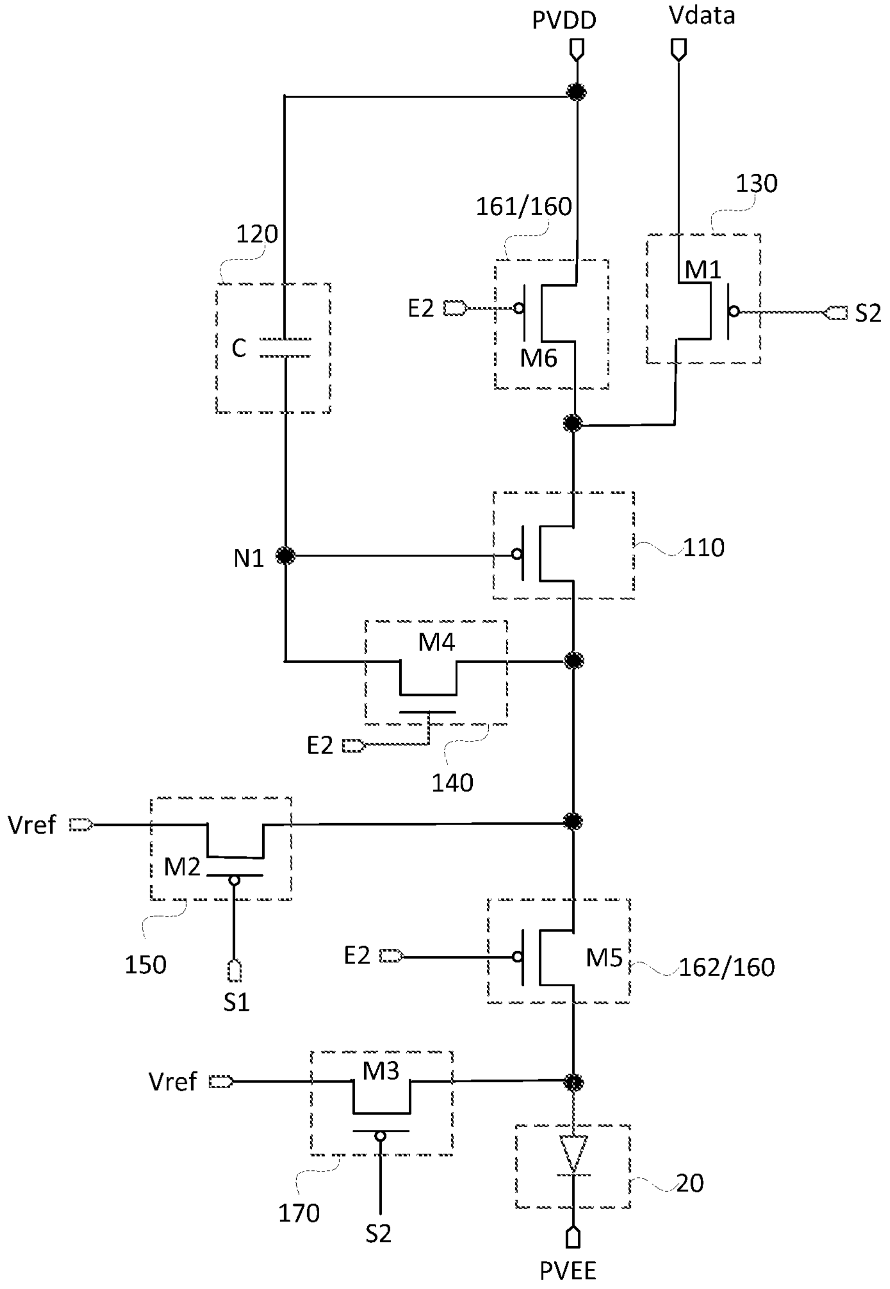
FIG. 13 is a schematic diagram showing circuit components of a pixel driving circuit shown in FIG. 12.

FIG. 13 is a schematic diagram showing circuit components of a pixel driving circuit shown in FIG. 12.

A difference between a pixel driving circuit 10 shown in FIG. 12 and a pixel driving circuit 10 shown in FIG. 9 is that, optionally, the pixel driving circuit 10 further includes a second initialization module 170 which is electrically connected between an initialization signal terminal Vref and an anode of a light-emitting component 20. A control terminal of the second initialization module 170 is electrically connected to an output terminal S2 of a second gate driving unit at the current stage; the second initialization module 170 is used for providing an initialization voltage signal to the anode of the light-emitting component 20. Referring to FIG. 13, optionally, the second initialization module 170 includes a third transistor M3. A first terminal of the third transistor M3 is electrically connected to the initialization signal terminal Vref, and a second terminal of the third transistor M3 is connected to the anode of the light-emitting component 20, a control terminal of the third transistor M3 is electrically connected to the output terminal S2 of the second gate driving unit at the current stage.

A working process of the pixel driving circuit 10 shown in FIG. 13 at the driving timing shown in FIG. 11 is as follows.

In a T1 phase, i.e., in an initialization phase, a second gate driving signal at a previous stage output by an output terminal S1 of the second gate driving unit at the previous stage is a logic low-level signal, and a second transistor M2 is turned on; a second gate driving signal at the current stage output by the output terminal S2 of the second gate driving unit at the current stage is a logic high-level signal, and a first transistor M1 and a third transistor is turned off; a first gate driving signal at the current stage output by the output terminal E2 of the first gate driving unit at the current stage is a logic high-level signal, a fourth transistor M4 is turned on, and a fifth transistor M5 and a sixth transistor M6 are turned off. The initialization voltage signal of the initialization signal terminal Vref is written into a first node N1 through the turned-on second transistor M2 and the turned-on fourth transistor M4.

In a T2 stage, i.e., in a data writing phase, the second gate driving signal at the previous stage is the logic high-level signal, the second transistor M2 is turned off; the second gate driving signal at the current stage is the logic low-level signal, the first transistor M1 and the third transistor M3 is turned on; and the first gate driving signal at the current stage is the logic high-level signal, the fourth transistor M4 is turned on, and the fifth transistor M5 and the sixth transistor M6 are turned off. The data voltage signal of the data signal terminal Vdata is written into a control terminal of the driving transistor 110 and a first electrode plate of the capacitor C through the first transistor M1, the driving transistor 110, and the fourth transistor M4 sequentially. Reference may be made to the previous contents for the specific process, and details are not described here again. At the same time, the initialization voltage signal of the initialization signal terminal Vref is written into the anode of the light-emitting component 20 through the turned-on third transistor M3, an anode potential of the light-emitting component 20 is initialized, thus the influence of the voltage of the anode of the light-emitting component 20 in a previous frame on the voltage of the anode of the light-emitting component 20 in a subsequent frame is reduced and the uniformity of the display is improved.

In a T3 stage, i.e., in a light-emitting phase, the second gate driving signal at the previous stage is the logic high-level signal, the second transistor M2 is turned off; the second gate driving signal at the current stage is the logic high-level signal, the first transistor M1 and the third transistor M3 is turned off; and the first gate driving signal at the current stage is the logic low-level signal, the fourth transistor M4 is turned off, and the fifth transistor M5 and the sixth transistor M6 are turned on. A power signal voltage of a first power signal terminal PVDD is written into a first terminal of the driving transistor 110 through the turned-on sixth transistor M6, the driving transistor 110 generates a driving current, and the driving current flows into the light-emitting component 20 through the fifth transistor M5 to drive the light-emitting component 20 to emit light.

Figure 14:
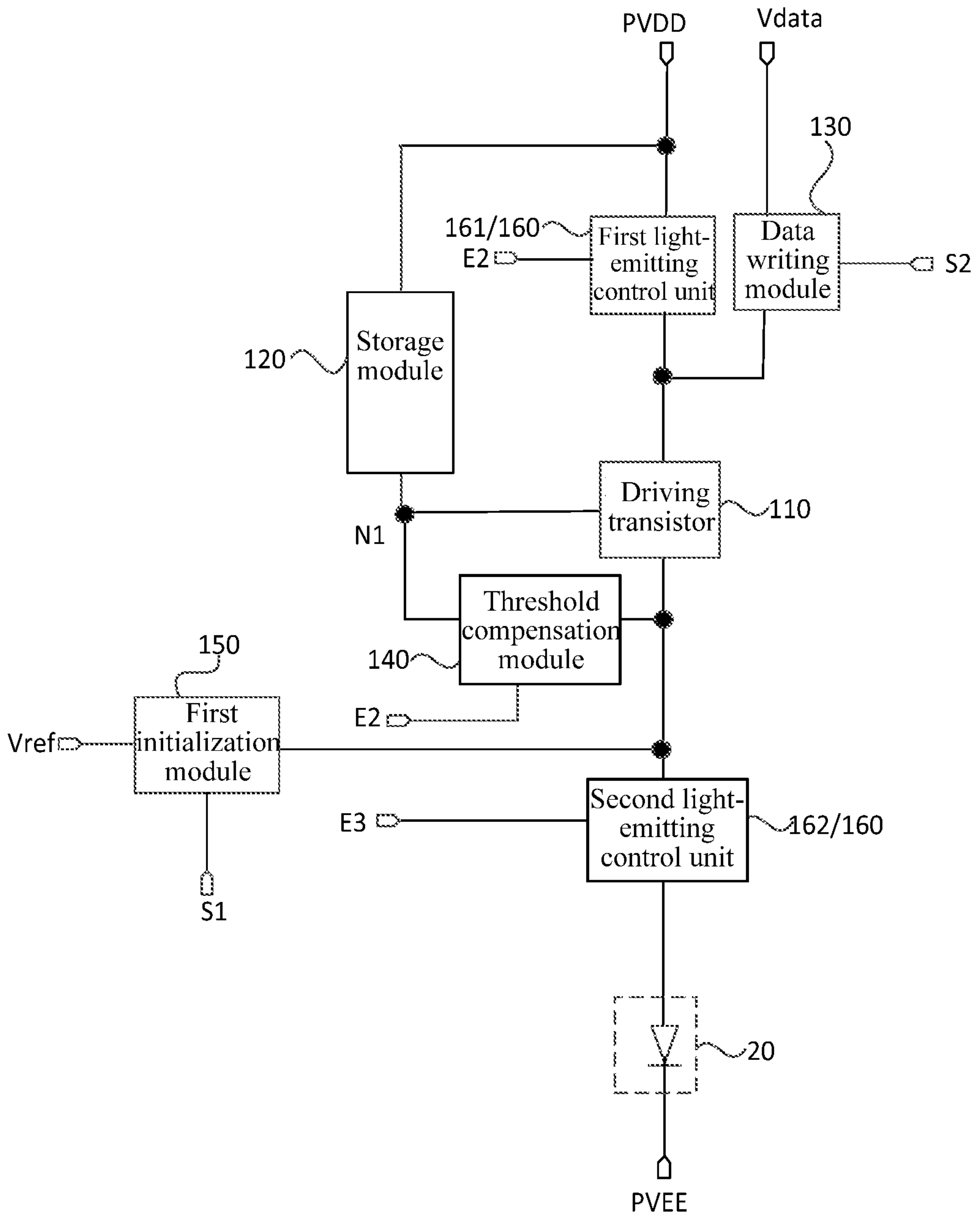
FIG. 14 is a block diagram of a pixel driving circuit provided by an embodiment of the present disclosure.

FIG. 14 is a block diagram of a pixel driving circuit provided by an embodiment of the present disclosure. A difference between the pixel driving circuit shown in FIG. 14 and the pixel driving circuit shown in FIG. 9 is that, optionally, a control terminal of a second light-emitting control unit 162 is electrically connected to an output terminal E3 of a first gate driving unit at a subsequent stage. A first initialization module 150 is used for providing an initialization voltage signal for a control terminal of a driving transistor and an anode of a light-emitting component 20.

Optionally, multiple pixel driving circuits 10 are arranged in X rows and Y columns. The first gate driving circuit 30A includes (X+1)-stage cascaded first gate driving units; and the second gate driving circuit 30B includes (X+1)-stage cascaded second gate driving units. A first gate driving unit at a current stage of the pixel driving circuit 10 located in a j-th row is a first gate driving unit in a j-th stage, and a first gate driving unit at a subsequent stage is a first gate driving unit in a (j+1)-th stage, a second gate driving unit at the current stage is a second gate driving unit in a j-th stage, a second gate driving unit at a previous stage is a second gate driving unit in a j-th stage, where X and Y are both positive integers greater than or equal to 1, and 1≤j≤X.

Figure 15:
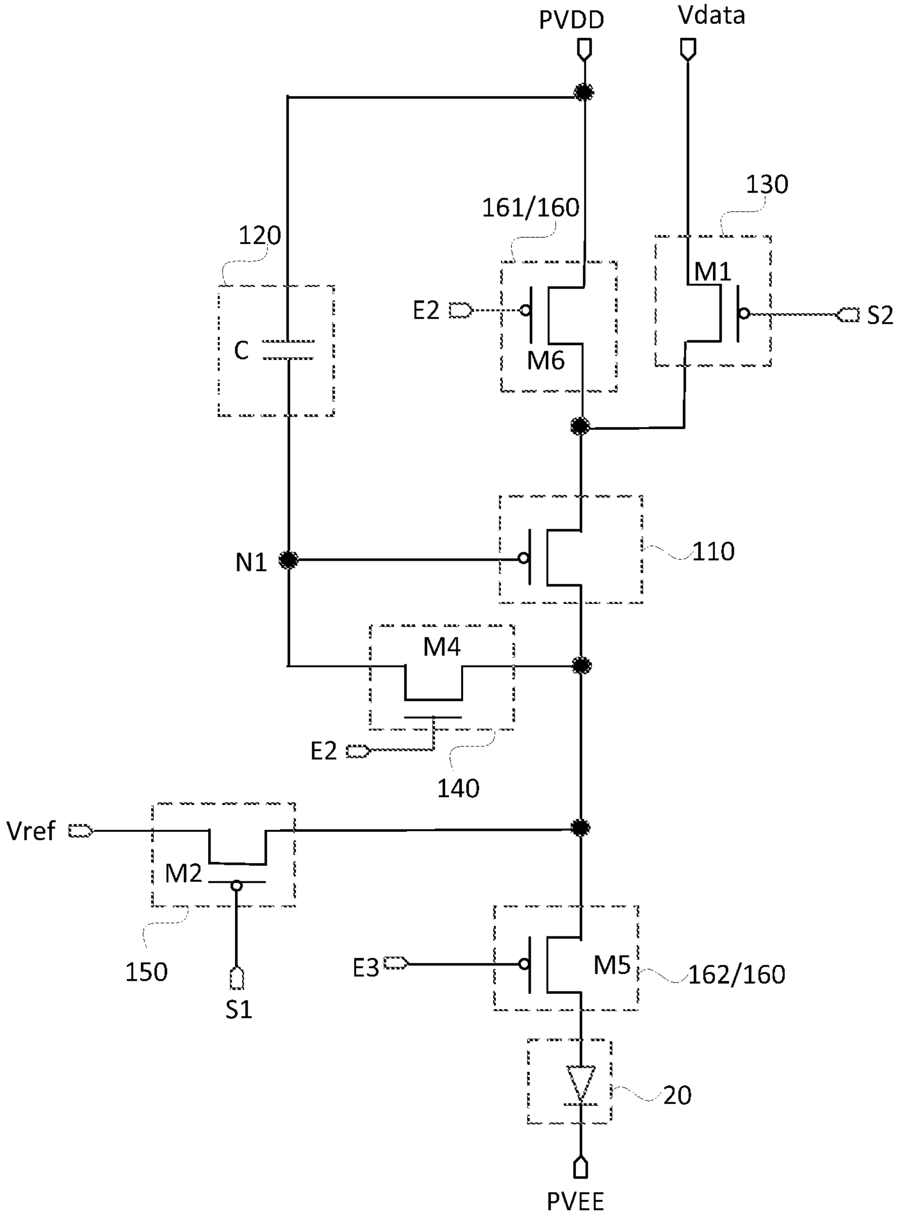
FIG. 15 is a schematic diagram showing circuit components of a pixel driving circuit shown in FIG. 14.
Figure 16:
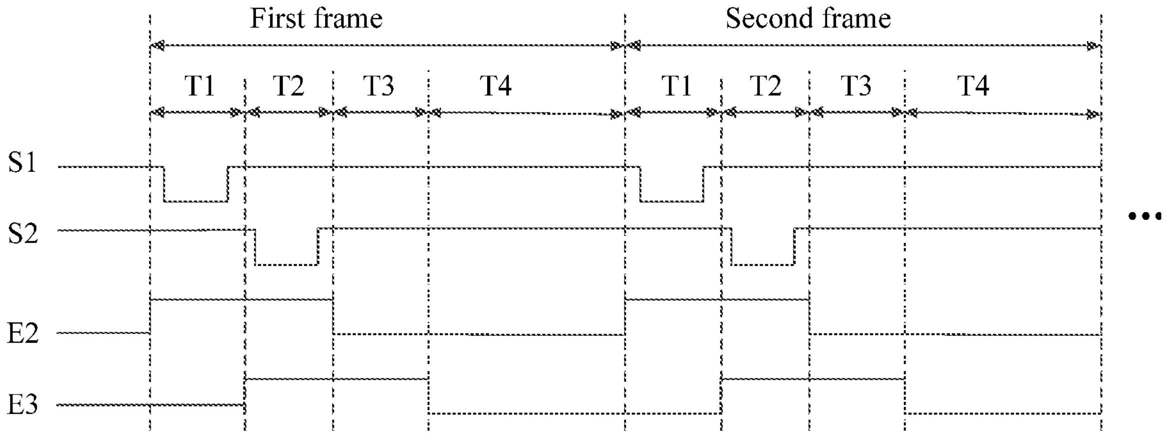
FIG. 16 is another driving timing graph provided by an embodiment of the present disclosure.

FIG. 15 is a schematic diagram showing circuit components of a pixel driving circuit shown in FIG. 14. FIG. 16 is another driving timing graph provided by an embodiment of the present disclosure. A working process of the pixel driving circuit 10 shown in FIG. 15 under the control of driving timing shown in FIG. 16 is as follows.

In a T1 phase, i.e., in an initialization phase, a second gate driving signal at a previous stage output by an output terminal S1 of the second gate driving unit at the previous stage is a logic low-level signal, and the second transistor M2 is turned on; a second gate driving signal at a current stage output by an output terminal S2 of the second gate driving unit at the current stage is a logic high-level signal, and a first transistor M1 is turned off; a first gate driving signal at the current stage output by an output terminal E2 of a first gate driving unit at the current stage is a logic high-level signal, a fourth transistor M4 is turned on, and the sixth transistor M6 is turned off; and a first gate driving signal at a subsequent stage output by an output terminal E3 of a first gate driving unit at the subsequent stage is the logic low-level signal, the fifth transistor M5 is turned on. The initialization voltage signal of an initialization signal terminal Vref is written into a first node N1 through the turned-on second transistor M2 and the turned-on fourth transistor M4. At the same time, the initialization voltage signal is written into the anode of the light-emitting component 20 through the turned-on second transistor M2 and the turned-on fifth transistor M5.

In a T2 phase, i.e., in a data writing phase, the second gate driving signal at the previous stage is the logic high-level signal, the second transistor M2 is turned off; the second gate driving signal at the current stage is the logic low-level signal, the first transistor M1 is turned on; and the first gate driving signal at the current stage is the logic high-level signal, the fourth transistor M4 is turned on and the sixth transistor M6 is turned off; and the first gate driving signal at the subsequent stage is the logic high-level signal, the fifth transistor M5 is turned off. A data voltage signal of a data signal terminal Vdata is written into a control terminal of the driving transistor 110 (i.e., the first node N1) through the first transistor M1, the driving transistor 110, and the fourth transistor M4 sequentially. Reference may be made to the previous contents for the specific process, and at the same time, a voltage of the control terminal of the driving transistor 110 is stored in the capacitor C.

In a T3 phase, the second gate driving signal at the previous stage is the logic high-level signal, the second transistor M2 is turned off; the second gate driving signal at the current stage is the logic high-level signal, the first transistor M1 is turned off; and the first gate driving signal at the current stage is the logic low-level signal, the fourth transistor M4 is turned off and the sixth transistor M6 is turned on; and the first gate driving signal at the subsequent stage is the logic high-level signal, the fifth transistor M5 is turned off, and no action.

In a T4 phase, i.e., in the light-emitting phase, the second gate driving signal at the previous stage is the logic high-level signal, the second transistor M2 is turned off; the second gate driving signal at the current stage is the logic high-level signal, the first transistor M1 is turned off; and the first gate driving signal at the current stage is the logic low-level signal, the fourth transistor M4 is turned off and the sixth transistor M6 is turned on; and the first gate driving signal at the subsequent stage is the logic low-level signal, the fifth transistor M5 is turned on. A power signal of a first power signal terminal PVDD is written into a first terminal of the driving transistor 110 through the turned-on sixth transistor M6, the driving transistor 110 generates a driving current, and the driving current flows into the light-emitting component 20 through the fifth transistor M5 to drive the light-emitting component 20 to emit light.

It should be noted that FIGS. 10, 15 and 13 exemplarily show that the first transistor M1, the second transistor M2, the fifth transistor M5, the sixth transistor M6, the driving transistor 110 are P-type transistors, and the fourth transistor M4 is an N-type transistor. FIG. 13 also exemplarily shows that the third transistor M3 is a P-type transistor, but this is not a limitation to the present disclosure. Generally, the P-type transistor is turned on under the control of the logic low-level signal and turned off under the control of the logic high-level signal. The N-type transistor is turned on under the control of the logic high-level signal, and turned off under the control of the logic low-level signal. In some optional embodiments, the transistors in the pixel driving circuit 10 may all be N-type transistors, or P-type transistors, or some transistors in the pixel driving circuit 10 are N-type transistors and some transistors in the pixel driving circuit 10 are P-type transistors. The type of each transistor in the pixel driving circuit 10 is not specifically limited in the embodiment of the present disclosure.

Figure 17:
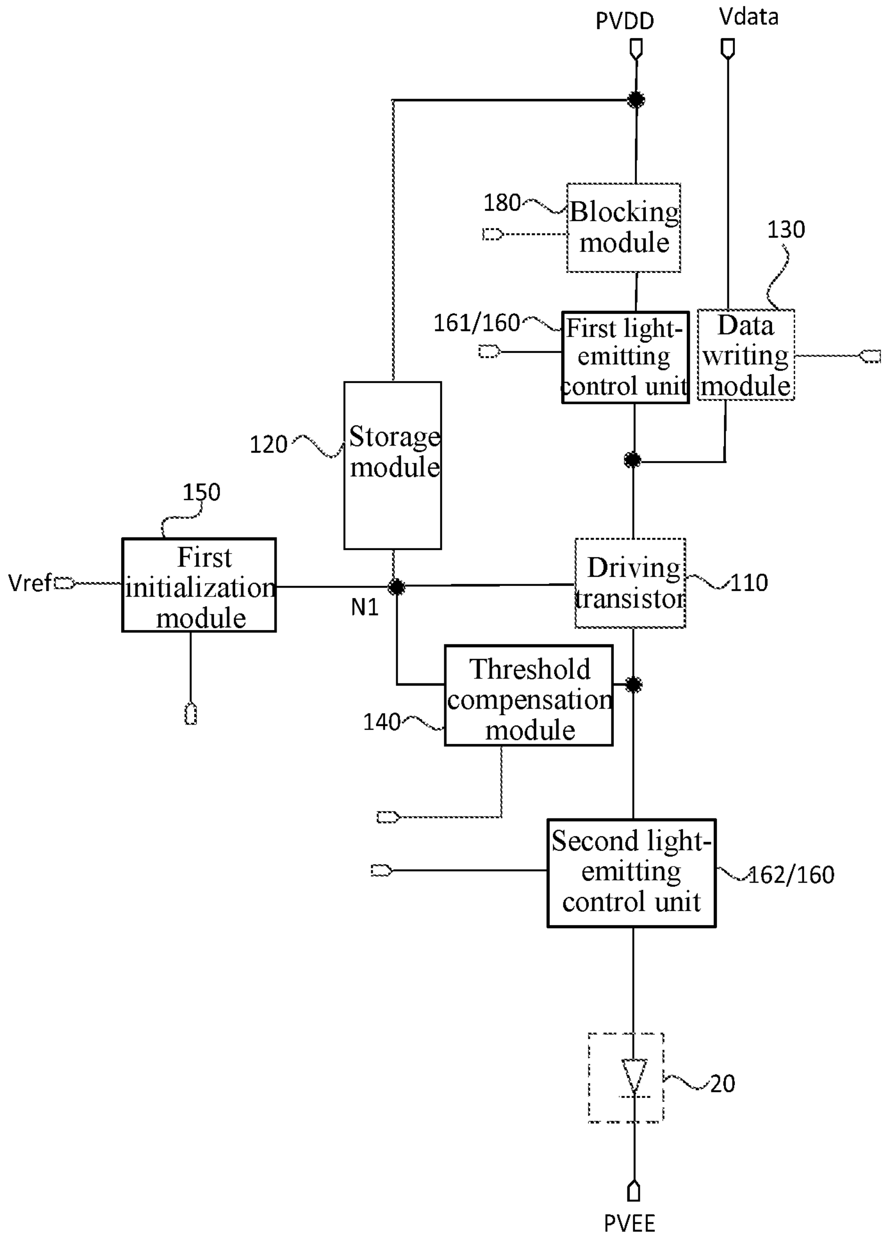
FIG. 17 is a block diagram of another pixel driving circuit provided by an embodiment of the present disclosure.
Figure 18:
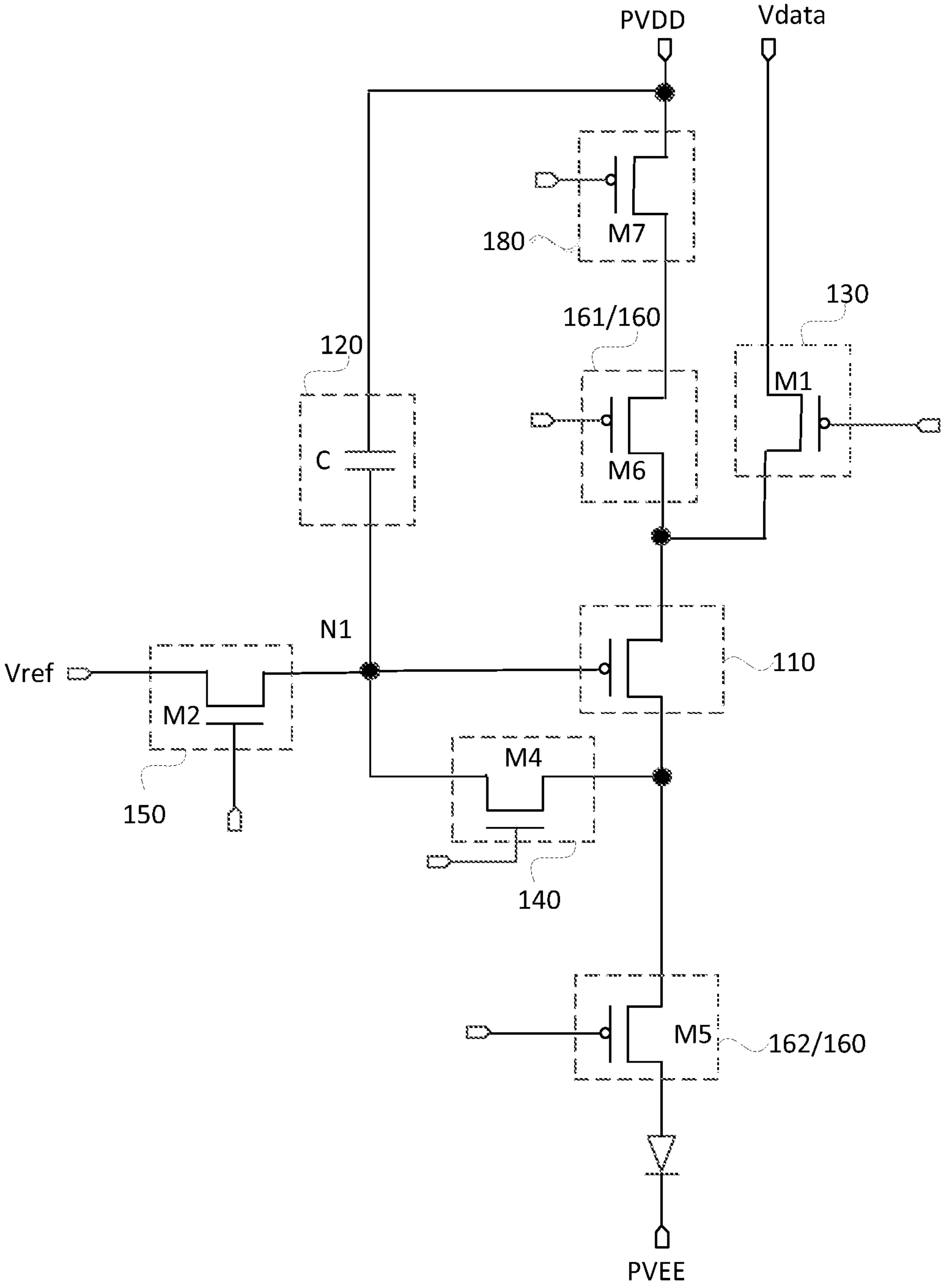
FIG. 18 is a schematic diagram showing circuit components of a pixel driving circuit shown in FIG. 17.

FIG. 17 is a block diagram of another pixel driving circuit provided by an embodiment of the present disclosure. FIG. 18 is a schematic diagram showing circuit components of a pixel driving circuit shown in FIG. 17. Referring to FIGS. 17 and 18, optionally, a pixel driving circuit 10 further includes a blocking module 180 which is electrically connected between a first power signal terminal PVDD and a first terminal of the driving transistor 110, and is connected in series to a first light-emitting control unit 161; a control terminal of the blocking module 180 is electrically connected to an output terminal of a gate driving circuit 30 (not shown in FIGS. 17 and 18), and the blocking module 180 is used for blocking a first power voltage signal of the first power signal terminal PVDD from being transmitted to the first terminal of the driving transistor 110 in a data writing phase.

Specifically, at least in the data writing phase, the blocking module 180 is turned off under the control of the gate driving signal to block the first power voltage signal from being transmitted to the first terminal of the driving transistor 110, thereby ensuring that a data voltage signal is successfully written into a first node N1; at least in the light-emitting phase, the blocking module 180 is turned on under the control of the gate driving signal, the first power voltage signal is written into the first terminal of the driving transistor 110 through the turned-on blocking module 180 and the first light-emitting control unit 161, and enables the driving transistor 110 to generate a driving current.

Still referring to FIG. 18, optionally, the blocking module 180 includes a seventh transistor M7, and a control terminal of the seventh transistor M7 is electrically connected to an output terminal of the gate driving circuit 30. It should be noted that FIG. 18 only exemplarily shows that a first terminal of the seventh transistor M7 is electrically connected to the first power signal terminal PVDD, and a second terminal of the seventh transistor M7 is electrically connected to a first terminal of the first light-emitting control unit 161, but this is not a limitation to the present disclosure. In other implementation modes, the first terminal of the seventh transistor M7 may also be electrically connected to a second terminal of the first light-emitting control unit 161, and the second terminal of the seventh transistor M7 is electrically connected to the first terminal of the driving transistor 110. It should be further noted that FIG. 18 only exemplarily shows that a second terminal of the first initialization module 150 is electrically connected to a second terminal of the driving transistor 110, but this is not a limitation to the present disclosure. For example, in other embodiments, the second terminal of the first initialization module 150 may also be electrically connected to the second terminal of the driving transistor 110.

Figure 19:
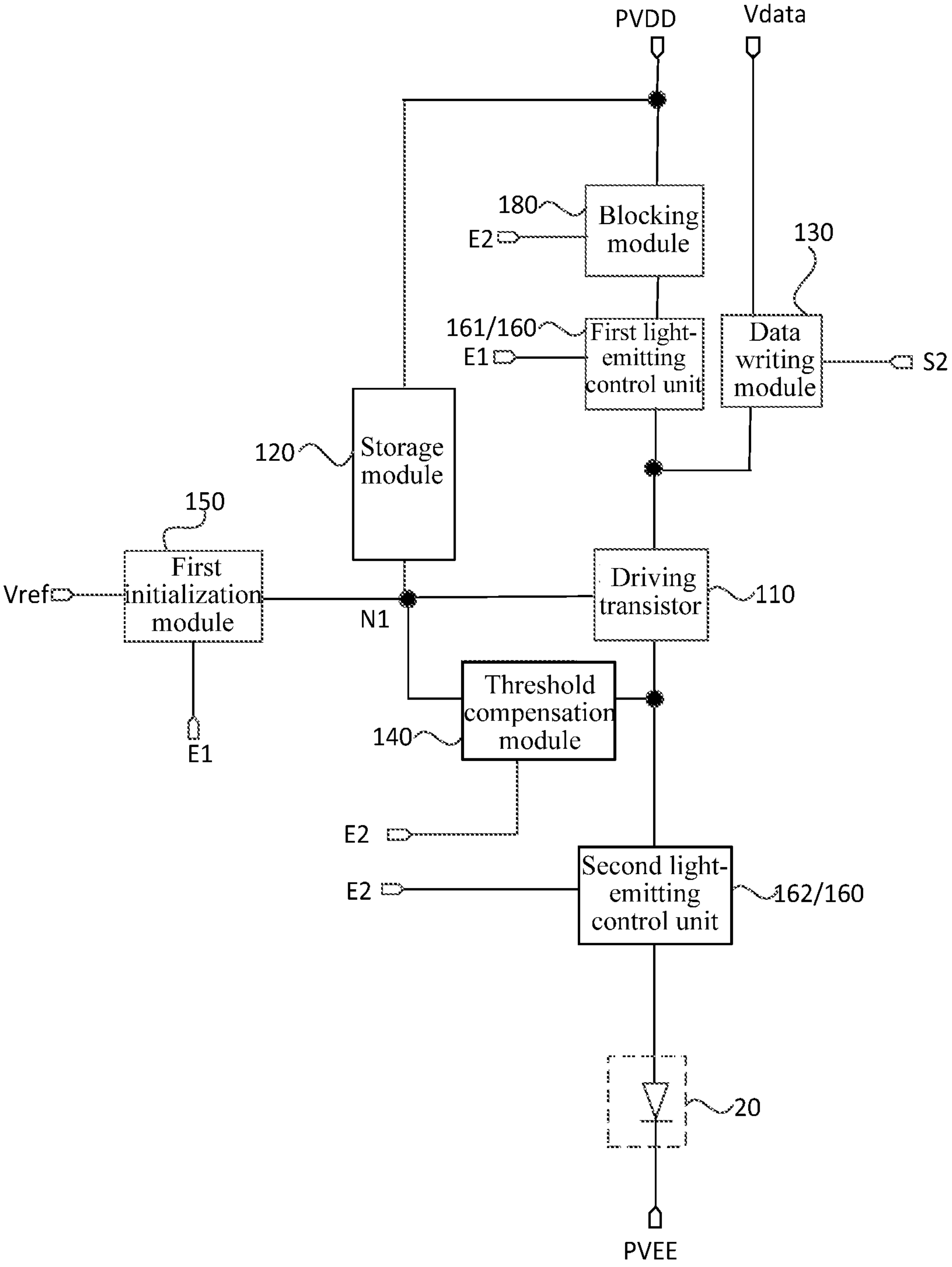
FIG. 19 is a block diagram of another pixel driving circuit provided by an embodiment of the present disclosure.

FIG. 19 is a block diagram of another pixel driving circuit provided by an embodiment of the present disclosure. Referring to FIGS. 3 and 19, optionally, a display panel includes a first gate driving circuit 30A and a second gate driving circuit 30B. The first gate driving circuit 30A includes multiple cascaded first gate driving units, the second gate driving circuit 30B includes multiple cascaded second gate driving units. A control terminal of a data writing module 130 is electrically connected to an output terminal S2 of the second gate driving unit at a current stage; a control terminal of a first light-emitting control unit 161 is electrically connected to an output terminal E1 of the first gate driving unit at a previous stage; a control terminal of a blocking module 180 and a control terminal of a threshold compensation module 140 are electrically connected to an output terminal E2 of the first gate driving unit at the current stage; a control terminal of a second light-emitting control unit 162 is electrically connected to the output terminal E2 of the first gate driving unit at the current stage; and a control terminal of a first initialization module 150 is electrically connected between an initialization signal terminal Vref and a first node N1, and the control terminal of the first initialization module 150 is electrically connected to the output terminal E1 of the first gate driving unit at the previous stage.

Optionally, multiple pixel driving circuits 10 are arranged in X rows and Y columns. The first gate driving circuit 30A includes (X+1)-stage cascaded first gate driving units; and the second gate driving circuit 30B includes X-stage cascaded second gate driving units. The first gate driving unit at the current stage of the pixel driving circuit 10 located in a j-th row is a first gate driving unit at a (j+1)-th stage, and the first gate driving unit at the previous stage is a first gate driving unit at a j-th stage, the second gate driving unit at the current stage is a second gate driving unit at a j-th stage, where X and Y are both positive integers greater than or equal to 1, and $1 \le j \le X$.

Figure 20:
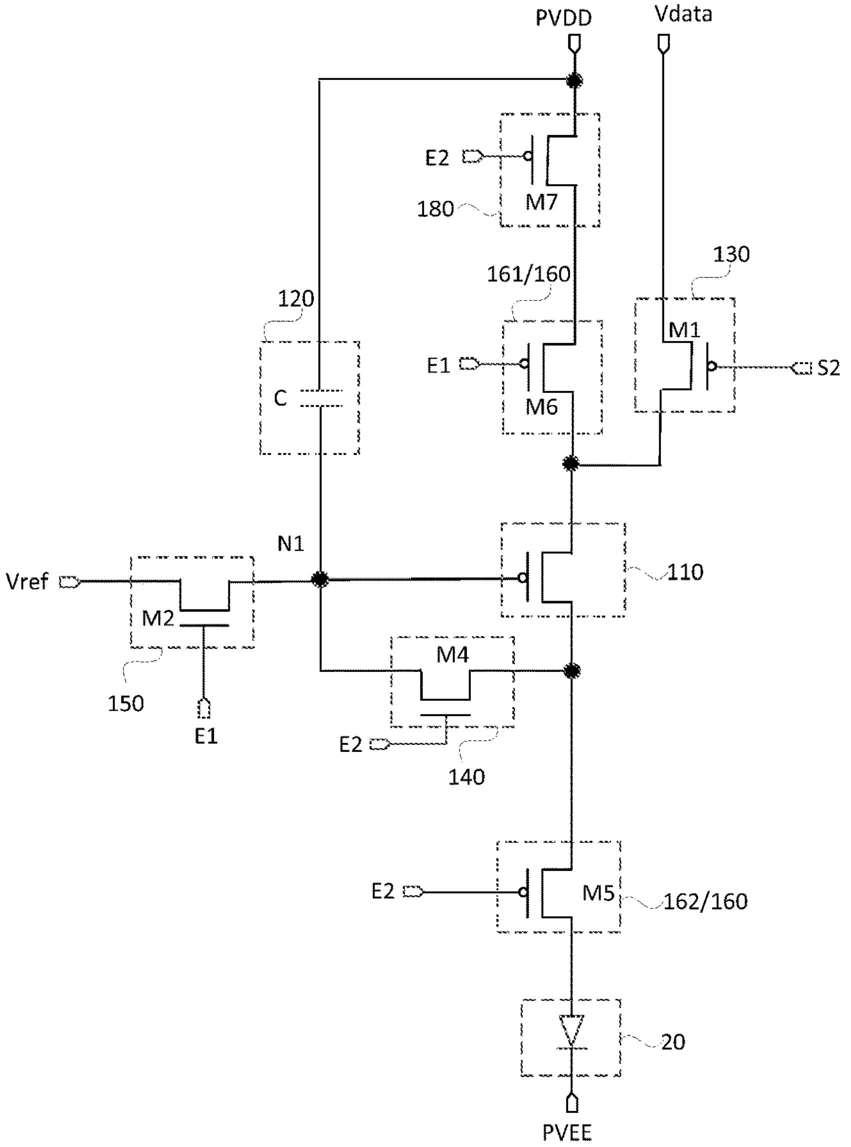
FIG. 20 is a schematic diagram showing circuit components of a pixel driving circuit shown in FIG. 19.
Figure 21:
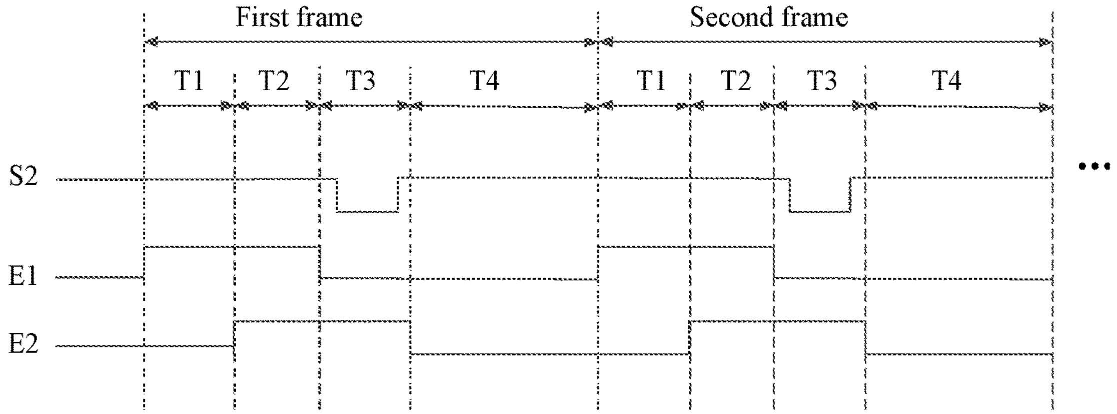
FIG. 21 is another driving timing graph provided by an embodiment of the present disclosure.

FIG. 20 is a schematic diagram showing circuit components of a pixel driving circuit shown in FIG. 19. FIG. 21 is another driving timing graph provided by an embodiment of the present disclosure. A working process of the pixel driving circuit 20 shown in FIG. 10 under the control of the driving timing shown in FIG. 21 is as follows.

In a T1 phase, i.e., a first sub-initialization phase in an initialization phase, a second gate driving signal at a current stage output by an output terminal S2 of a second gate driving unit at the current stage is a logic high-level signal, and a first transistor M1 is turned off; a first gate driving signal at a previous stage output by an output terminal E1 of the first gate driving unit at the previous stage is a logic high-level signal, a second transistor M2 is turned on and a sixth transistor M6 is turned off; a first gate driving signal at the current stage output by an output terminal E2 of the first gate driving unit at the current stage is a logic low-level signal, a seventh transistor M7 is turned on, a fourth transistor M4 is turned off, and a fifth transistor M5 is turned on. An initialization voltage signal of the initialization signal terminal Vref is written into the first node N1 through the turned-on second transistor M2.

In a T2 phase, i.e., in a second sub-initialization phase in the initialization phase, the second gate driving signal at the current stage is the logic high-level signal, and the first transistor M1 is turned off; the first gate driving signal at the previous stage is the logic high-level signal, the second transistor M2 is turned on and the sixth transistor M6 is turned off; the first gate driving signal at the current stage is the logic high-level signal, the seventh transistor M7 is turned off, the fourth transistor M4 is turned on, and the fifth transistor M5 is turned off. An initialization voltage signal of the initialization signal terminal Vref is written into the first node N1 through the turned-on second transistor M2.

In a T3 phase, i.e., in a data writing phase, the second gate driving signal at the current stage is the logic low-level signal, and the first transistor M1 is turned on; the first gate driving signal at the previous stage is the logic low-level signal, the second transistor M2 is turned off and the sixth transistor M6 is turned on; the first gate driving signal at the current stage is the logic high-level signal, the seventh transistor M7 is turned off, the fourth transistor M4 is turned on, and the fifth transistor M5 is turned off. A data voltage signal of a data signal terminal Vdata is written into a control terminal of the driving transistor 110 (i.e., the first node N1) through the first transistor M1, the driving transistor 110, and the fourth transistor M4 sequentially. Reference may be made to the previous contents for the specific process, and at the same time, a voltage of the control terminal of the driving transistor 110 is stored in the capacitor C.

In a T4 phase, i.e., in a light-emitting phase, the second gate driving signal at the current stage is the logic high-level signal, the first transistor M1 is turned off; the first gate driving signal at the previous stage is the logic low-level signal, the second transistor M2 is turned off and the sixth transistor M6 is turned on; the first gate driving signal at the current stage is the logic low-level signal, the seventh transistor M7 is turned on, the fourth transistor M4 is turned off, and the fifth transistor M5 is turned on. A power signal of a first power signal terminal PVDD is written into a first terminal of the driving transistor 110 through the turned-on seventh transistor M7 and the turned-on sixth transistor M6, the driving transistor 110 generates a driving current, and the driving current flows into the light-emitting component 20 through the fifth transistor M5 to drive the light-emitting component 20 to emit light.

Figure 22:
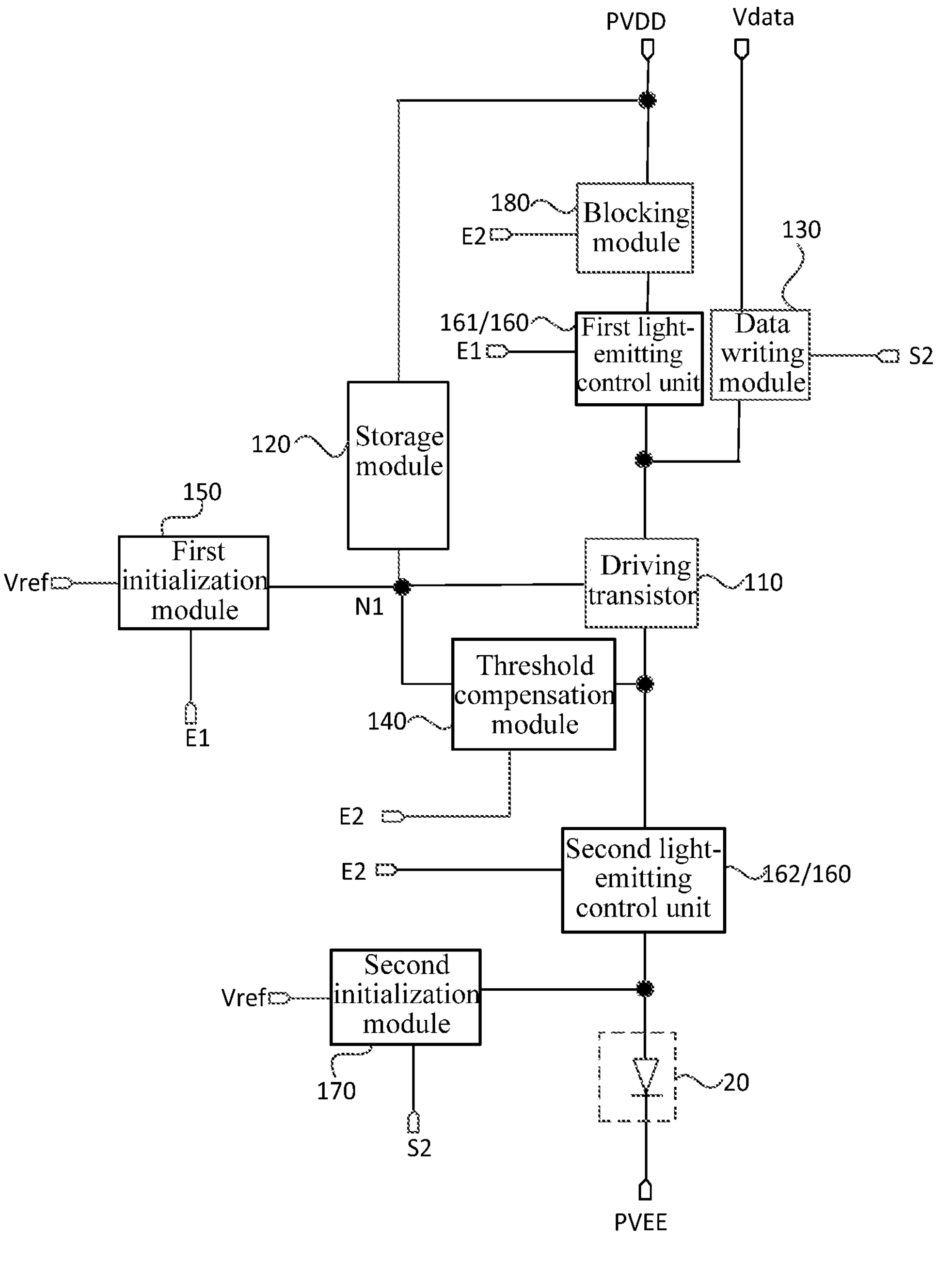
FIG. 22 is a block diagram of another pixel driving circuit provided by an embodiment of the present disclosure.
Figure 23:
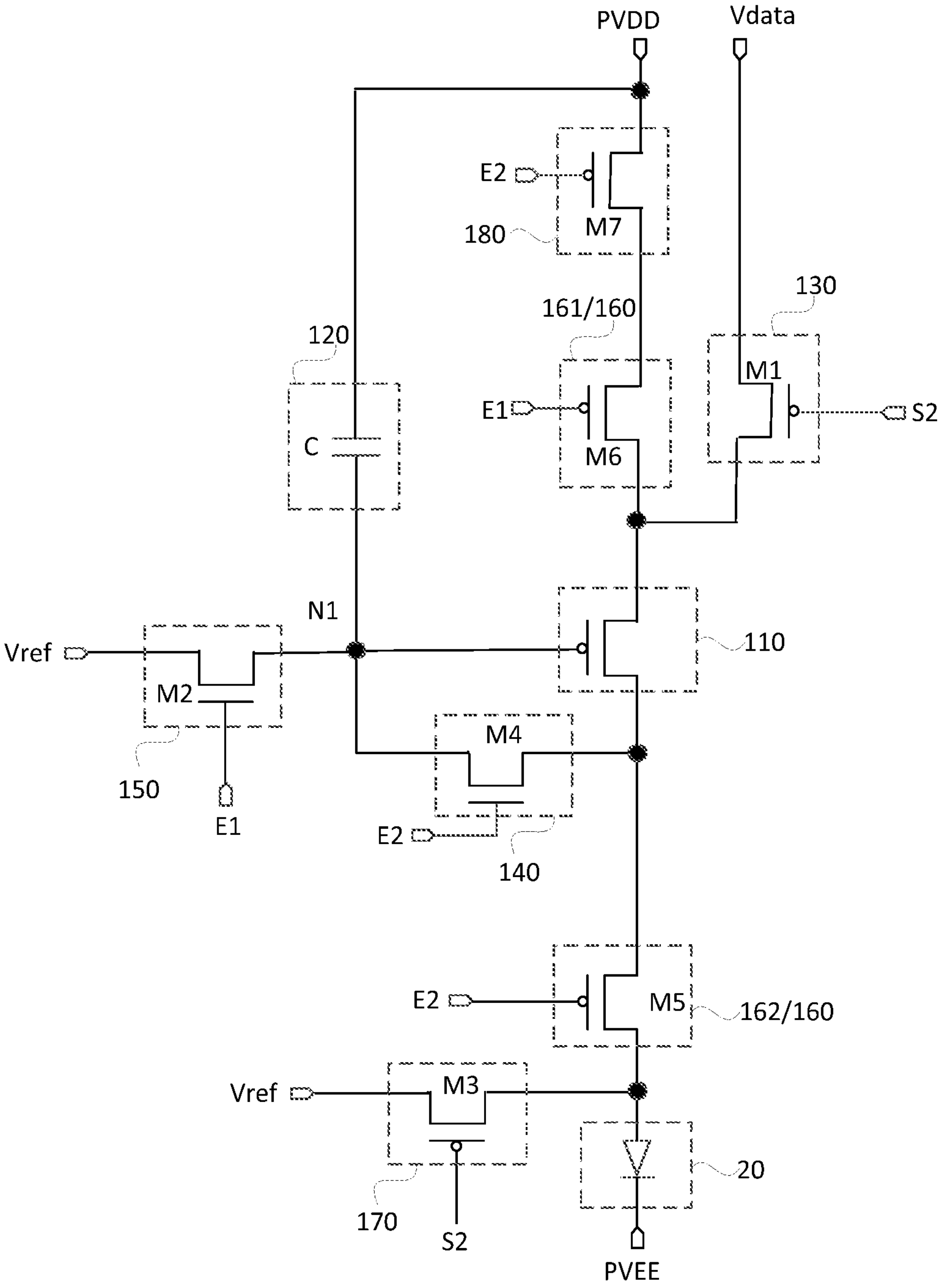
FIG. 23 is a schematic diagram showing circuit components of a pixel driving circuit shown in FIG. 22.

FIG. 22 is a block diagram of another pixel driving circuit provided by an embodiment of the present disclosure. FIG. 23 is a schematic diagram showing circuit components of a pixel driving circuit shown in FIG. 22. The difference between a pixel driving circuit 10 shown in FIG. 22 and a pixel driving circuit 10 shown FIG. 19 is that, optionally, the pixel driving circuit 10 further includes a second initialization module 170 which is electrically connected between an initialization signal terminal Vref and an anode of a light-emitting component 20. A control terminal of a second initialization module 170 is electrically connected to an output terminal S2 of a second gate driving unit at a current stage; the second initialization module 170 is used for providing an initialization voltage signal to the anode of the light-emitting component 20. Referring to FIG. 23, optionally, the second initialization module 170 includes a third transistor M3, a first terminal of the third transistor M3 is electrically connected to the initialization signal terminal Vref, a second terminal of the third transistor M3 is electrically connected to the anode of the light-emitting component 20, and a control terminal of the third transistor M3 is electrically connected to the output terminal S2 of the second gate driving unit at the current stage.

A working process of the pixel driving circuit 23 shown in FIG. 10 under the control of driving timing shown in FIG. 21 is as follows.

In a T1 phase, i.e., a first sub-initialization phase in an initialization phase, a second gate driving signal at a current stage output by the output terminal S2 of the second gate driving unit at the current stage is a logic high-level signal, and a first transistor M1 is turned off and a third transistor M3 is turned off; a first gate driving signal at a previous stage output by an output terminal E1 of a first gate driving unit at the previous stage is a logic high-level signal, a second transistor M2 is turned on and a sixth transistor M6 is turned off; a first gate driving signal at the current stage output by an output terminal E2 of a first gate driving unit at the current stage is a logic low-level signal, a seventh transistor M7 is turned on, a fourth transistor M4 is turned off, and a fifth transistor M5 is turned on. The initialization voltage signal of the initialization signal terminal Vref is written into the first node N1 through the turned-on second transistor M2.

In a T2 phase, i.e., in a second sub-initialization phase in the initialization phase, the second gate driving signal at the current stage is the logic high-level signal, and the first transistor M1 is turned off and the third transistor M3 is turned off; the first gate driving signal at the previous stage is the logic high-level signal, the second transistor M2 is turned on and the sixth transistor M6 is turned off; the first gate driving signal at the current stage is the logic high-level signal, the seventh transistor M7 is turned off, the fourth transistor M4 is turned on, and the fifth transistor M5 is turned off. The initialization voltage signal of the initialization signal terminal Vref is written into the first node N1 through the turned-on second transistor M2.

In a T3 phase, i.e., in a data writing phase, the second gate driving signal at the current stage is the logic low-level signal, and the first transistor M1 is turned on and the third transistor M3 is turned on; the first gate driving signal at the previous stage is the logic low-level signal, the second transistor M2 is turned off and the sixth transistor M6 is turned on; the first gate driving signal at the current stage is the logic high-level signal, the seventh transistor M7 is turned off, the fourth transistor M4 is turned on, and the fifth transistor M5 is turned off. A data voltage signal of a data signal terminal Vdata is written into a control terminal of the driving transistor 110 (i.e., the first node N1) through the first transistor M1, the driving transistor 110, and the fourth transistor M4 sequentially. Reference may be made to the previous contents for the specific process; a voltage of the control terminal of the driving transistor is stored in the capacitor C; and at the same time, the initialization voltage signal of the initialization signal terminal Vref is written into the anode of the light-emitting component 20 through the turned-on third transistor M3.

In a T4 phase, i.e., in a light-emitting phase, the second gate driving signal at the current stage is the logic high-level signal, and the first transistor M1 is turned off and the third transistor M3 is turned off; the first gate driving signal at the previous stage is the logic low-level signal, the second transistor M2 is turned off and the sixth transistor M6 is turned on; the first gate driving signal at the current stage is the logic low-level signal, the seventh transistor M7 is turned on, the fourth transistor M4 is turned off, and the fifth transistor M5 is turned on. A power signal of a first power signal terminal PVDD is written into a first terminal of the driving transistor 110 through the turned-on seventh transistor M7 and the turned-on sixth transistor M6, the driving transistor 110 generates a driving current, and the driving current flows into the light-emitting component 20 through the fifth transistor M5 to drive the light-emitting component 20 to emit light.

Figure 24:
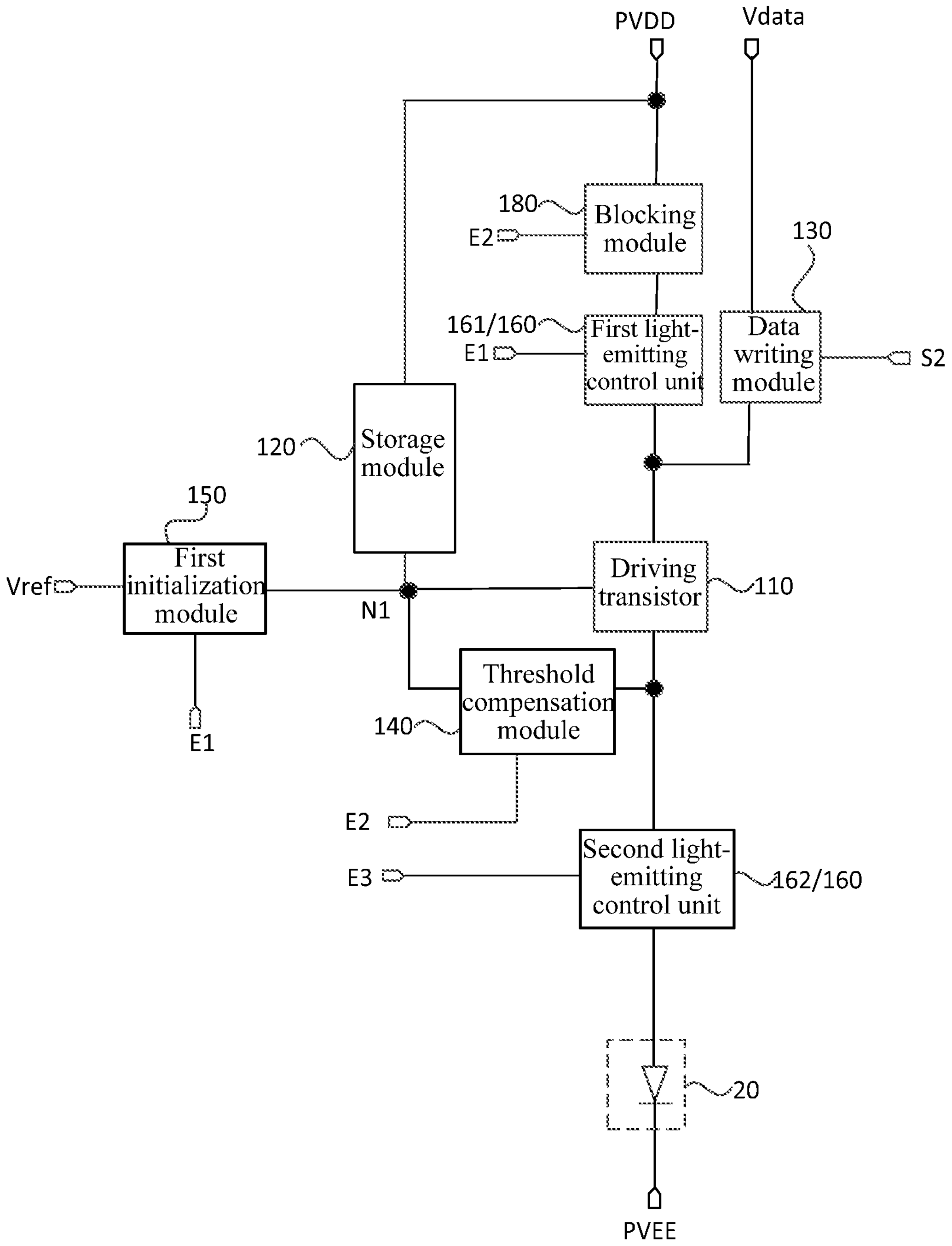
FIG. 24 is a block diagram of a pixel driving circuit provided by an embodiment of the present disclosure.

FIG. 24 is a block diagram of a pixel driving circuit provided by an embodiment of the present disclosure. The difference between the pixel driving circuit 10 shown in FIG. 24 and the pixel driving circuit 10 shown in FIG. 19 is that, optionally, a control terminal of a second light-emitting control unit 162 is electrically connected to an output terminal E3 of a first gate driving unit at a subsequent stage. At this time, a first initialization module 150 is used for providing an initialization voltage signal for a control terminal of a driving transistor and an anode of a light-emitting component 20.

Optionally, multiple pixel driving circuits 10 are arranged in X rows and Y columns. The first gate driving circuit 30A includes (X+2)-stage cascaded first gate driving units; and the second gate driving circuit 30B includes X-stage cascaded second gate driving units. A first gate driving unit at a previous stage of the pixel driving circuit 10 located in a j-th row is a first gating driving unit at a j-th stage, and a first gate driving unit at a current stage is a first gate driving unit at a (j+1)-th stage, the first gate driving unit at the subsequent stage is a first gate driving unit at a (j+2)-th stage, a second gate driving unit at the current stage is a second gate driving unit at a j-th stage, where X and Y are both positive integers greater than or equal to 1, and 1≤j≤X.

Figure 25:
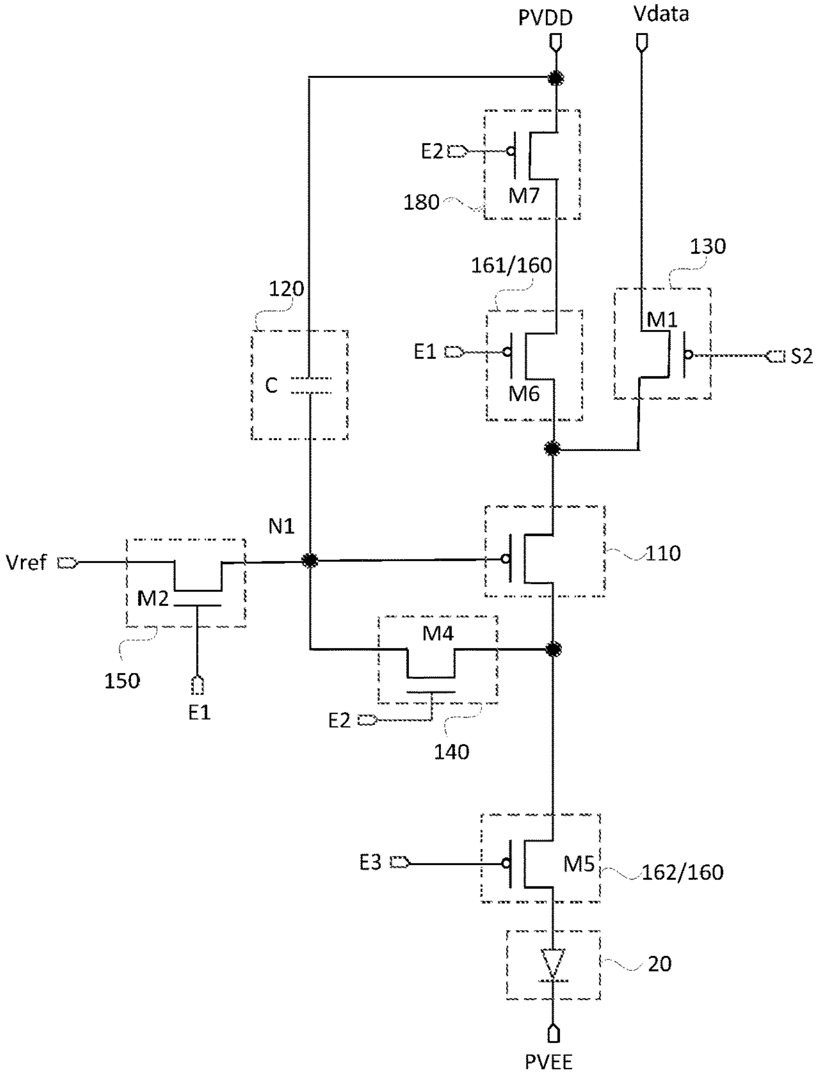
FIG. 25 is a schematic diagram showing circuit components of a pixel driving circuit shown in FIG. 24.
Figure 26:
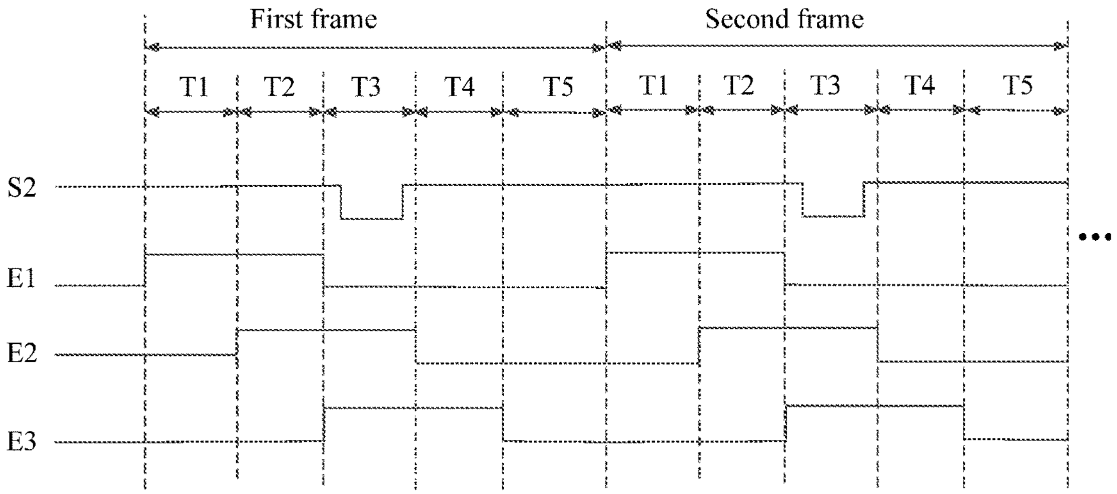
FIG. 26 is another driving timing graph provided by an embodiment of the present disclosure.

FIG. 25 is a schematic diagram showing circuit components of a pixel driving circuit shown in FIG. 24. FIG. 26 is another driving timing graph provided by an embodiment of the present disclosure. A working process of the pixel driving circuit 25 shown in FIG. 10 under the control of the driving timing shown in FIG. 26 is as follows.

In a T1 phase, i.e., a first sub-initialization phase in an initialization phase, a second gate driving signal at a current stage output by an output terminal S2 of a second gate driving unit at the current stage is a logic high-level signal, and a first transistor M1 is turned off; a first gate driving signal at a previous stage output by an output terminal E1 of the first gate driving unit at the previous stage is a logic high-level signal, a second transistor M2 is turned on and a sixth transistor M6 is turned off; a first gate driving signal at the current stage output by an output terminal E2 of the first gate driving unit at the current stage is a logic low-level signal, a seventh transistor M7 is turned on, a fourth transistor M4 is turned off, and the first gate driving signal at the subsequent stage is the logic low-level signal, a fifth transistor M5 is turned on. The initialization voltage signal of the initialization signal terminal Vref is written into the first node N1 through the turned-on second transistor M2.

In a T2 phase, i.e., in a second sub-initialization phase in the initialization phase, the second gate driving signal at the current stage is the logic high-level signal, and the first transistor M1 is turned off; the first gate driving signal at the previous stage is the logic high-level signal, the second transistor M2 is turned on and the sixth transistor M6 is turned off; the first gate driving signal at the current stage is the logic high-level signal, the seventh transistor M7 is turned off and the fourth transistor M4 is turned on; the first gate driving signal at the subsequent stage is the logic low-level signal, the fifth transistor M5 is turned on. The initialization voltage signal of the initialization signal terminal Vref is written into the first node N1 through the turned-on second transistor M2. At the same time, the initialization voltage signal is written into the anode of the light-emitting component 20 through the turned-on second transistor M2, the turned-on fourth transistor M4 and the turned-on fifth transistor M5.

In a T3 phase, i.e., in a data writing phase, the second gate driving signal at the current stage is the logic low-level signal, and the first transistor M1 is turned on; the first gate driving signal at the previous stage is the logic low-level signal, the second transistor M2 is turned off and the sixth transistor M6 is turned on; the first gate driving signal at the current stage is the logic high-level signal, the seventh transistor M7 is turned off, the fourth transistor M4 is turned on; and the first gate driving signal at the subsequent stag is the logic high-level signal, the fifth transistor M5 is turned off. A data voltage signal of a data signal terminal Vdata is written into a control terminal of the driving transistor 110 (i.e., the first node N1) through the first transistor M1, the driving transistor 110, and the fourth transistor M4 sequentially. Reference may be made to the previous contents for the specific process, and a voltage of the control terminal of the driving transistor is stored in the capacitor C.

In a T4 phase, the second gate driving signal at the current stage is the logic high-level signal, the first transistor M1 is turned off; the first gate driving signal at the previous stage is the logic low-level signal, the second transistor M2 is turned off and the sixth transistor M6 is turned on; the first gate driving signal at the current stage is the logic low-level signal, the seventh transistor M7 is turned on and the fourth transistor M4 is turned off; the first gate driving signal at the subsequent stage is the logic high-level signal, the fifth transistor M5 is turned off and no action.

In a T5 phase, i.e., a light-emitting phase, the second gate driving signal at the current stage is the logic high-level signal, the first transistor M1 is turned off; the first gate driving signal at the previous stage is the logic low-level signal, the second transistor M2 is turned off and the sixth transistor M6 is turned on; the first gate driving signal at the current stage is the logic low-level signal, the seventh transistor M7 is turned on and the fourth transistor M4 is turned off; the first gate driving signal at the subsequent stage is the logic low-level signal, the fifth transistor M5 is turned on. A power signal of a first power signal terminal PVDD is written into a first terminal of the driving transistor 110 through the turned-on seventh transistor M7 and the turned-on sixth transistor M6, the driving transistor 110 generates a driving current, and the driving current flows into the light-emitting component 20 through the fifth transistor M5 to drive the light-emitting component 20 to emit light.

It should be noted that FIGS. 20, 23 and 25 exemplarily show that the first transistor M1, the fifth transistor M5, the sixth transistor M6, the seventh transistor M7 and the driving transistor 110 are P-type transistors, and the second transistor M2 and the fourth transistor M4 are N-type transistors. FIG. 23 also exemplarily shows that the third transistor M3 is a P-type transistor, but this is not a limitation to the present disclosure. In some optional embodiments, the transistors in the pixel driving circuit 10 may all be N-type transistors, or P-type transistors, or some transistors in the pixel driving circuit 10 are N-type transistors and some transistors in the pixel driving circuit 10 are P-type transistors. The type of each transistor in the pixel driving circuit 10 is not specifically limited in the embodiment of the present disclosure.

Figure 27:
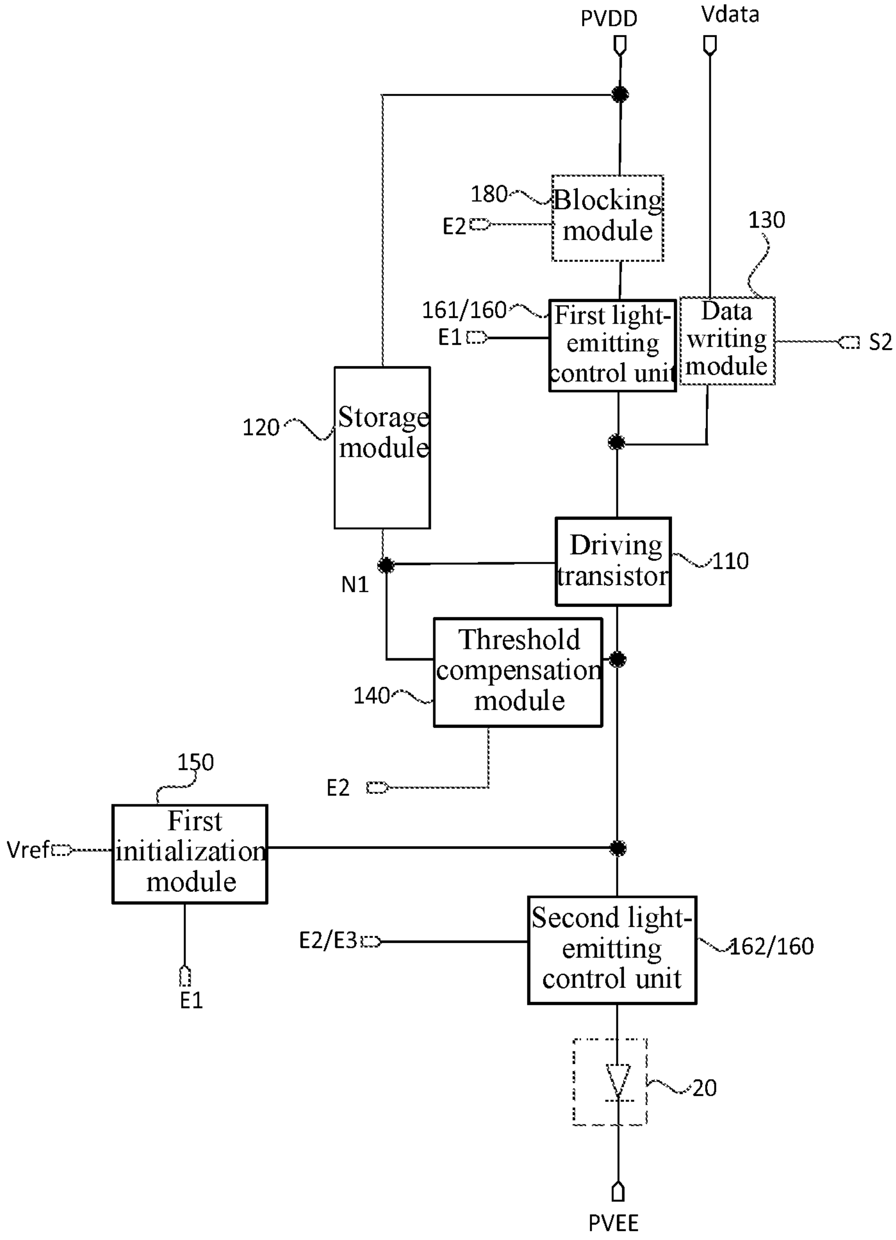
FIG. 27 is a block diagram of another pixel driving circuit provided by an embodiment of the present disclosure.

FIG. 27 is a block diagram of another pixel driving circuit provided by an embodiment of the present disclosure. Referring to FIGS. 3 and 27, a display panel includes a first gate driving circuit 30A and a second gate driving circuit 30B. The first gate driving circuit 30A includes multiple cascaded first gate driving units, the second gate driving circuit 30B includes multiple cascaded second gate driving units. A control terminal of a data writing module 130 is electrically connected to an output terminal S2 of the second gate driving unit at a current stage; a control terminal of a first light-emitting control unit 161 is electrically connected to an output terminal E1 of the first gate driving unit at a previous stage; a control terminal of a blocking module 180 and a control terminal of a threshold compensation module 140 are electrically connected to an output terminal E2 of the first gate driving unit at the current stage; a control terminal of a second light-emitting control unit 162 is electrically connected to the output terminal E2 of the first gate driving unit at the current stage or an output terminal E3 of the first gate driving unit at a subsequent stage; and a first initialization module 150 is electrically connected between an initialization signal terminal Vref and a second terminal of a driving transistor 110, a control terminal of the first initialization module 150 is electrically connected to the output terminal E1 of the first gate driving unit at the previous stage, and the first initialization module 150 is used for providing an initialization voltage signal to a control terminal of the driving transistor and an anode of a light-emitting component 20.

Optionally, multiple pixel driving circuits 10 are arranged in X rows and Y columns. When the control terminal of the second light-emitting control unit 162 is electrically connected to the output terminal E2 of the first gate driving unit at the current stage, the first gate driving circuit 30A includes (X+1)-stage cascaded first gate driving units. When the control terminal of the second light-emitting control unit 162 is electrically connected to the output terminal E3 of the first gate driving unit at the subsequent stage, the first gate driving circuit 30A includes (X+2)-stage cascaded first gate driving units and the second gate driving circuit 30B includes X-stage cascaded second gate driving units. The first gate driving unit at the previous stage of the pixel driving circuit 10 located in a j-th row is a first gating driving unit at a j-th stage, and a first gate driving unit at the current stage is a first gate driving unit at a (j+1)-th stage, the first gate driving unit at the subsequent stage is a first gate driving unit at a (j+2)-th stage, the second gate driving unit at the current stage is a second gate driving unit at a j-th stage, where X and Y are both positive integers greater than or equal to 1, and 1≤j≤X.

Figure 28:
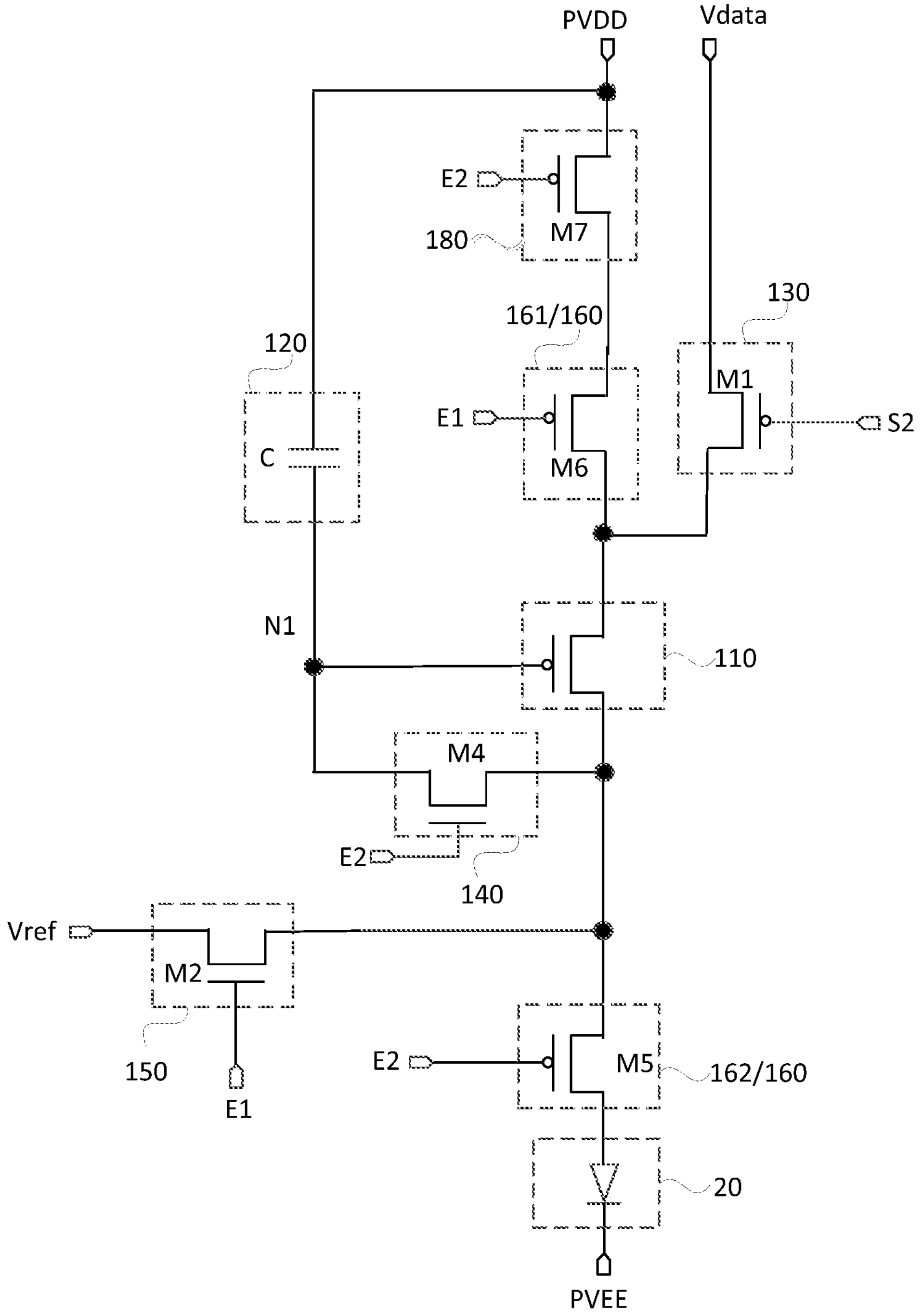
FIG. 28 is a schematic diagram showing circuit components of a pixel driving circuit shown in FIG. 27.

FIG. 28 is a schematic diagram showing circuit components of a pixel driving circuit shown in FIG. 27. A working process of the pixel driving circuit 28 shown in FIG. 10 under the control of the driving timing shown in FIG. 21 is as follows.

In a T1 phase, i.e., a first sub-initialization phase in an initialization phase, a second gate driving signal at the current stage output by an output terminal S2 of the second gate driving unit at the current stage is a logic high-level signal, and a first transistor M1 is turned off; a first gate driving signal at the previous stage output by an output terminal E1 of the first gate driving unit at the previous stage is a logic high-level signal, a second transistor M2 is turned on and a sixth transistor M6 is turned off; and a first gate driving signal at the current stage output by an output terminal E2 of the first gate driving unit at the current stage is a logic low-level signal, a seventh transistor M7 is turned on, a fourth transistor M4 is turned off, and a fifth transistor M5 is turned on. The initialization voltage signal of the initialization signal terminal Vref is written into the anode of the light-emitting component 20 through the turned-on second transistor M2 and the turned-on fifth transistor M5.

In a T2 phase, i.e., in a second sub-initialization phase in the initialization phase, the second gate driving signal at the current stage is the logic high-level signal, and the first transistor M1 is turned off; the first gate driving signal at the previous stage is the logic high-level signal, the second transistor M2 is turned on and the sixth transistor M6 is turned off; and the first gate driving signal at the current stage is the logic high-level signal, the seventh transistor M7 is turned off, the fourth transistor M4 is turned on, and the fifth transistor M5 is turned off. The initialization voltage signal of the initialization signal terminal Vref is written into a first node N1 through the turned-on second transistor M2 and the turned-on fourth transistor M4.

In a T3 phase, i.e., in a data writing phase, the second gate driving signal at the current stage is the logic low-level signal, and the first transistor M1 is turned on; the first gate driving signal at the previous stage is the logic low-level signal, the second transistor M2 is turned off and the sixth transistor M6 is turned on; and the first gate driving signal at the current stage is the logic high-level signal, the seventh transistor M7 is turned off, the fourth transistor M4 is turned on, and the fifth transistor M5 is turned off. A data voltage signal of a data signal terminal Vdata is written into a control terminal of the driving transistor 110 (i.e., the first node N1) through the first transistor M1, the driving transistor 110, and the fourth transistor M4 sequentially. Reference may be made to the previous contents for the specific process, and at the same time, a voltage of the control terminal of the driving transistor 110 is stored in the capacitor C.

In a T4 phase, i.e., in a light-emitting phase, the second gate driving signal at the current stage is the logic high-level signal, the first transistor M1 is turned off; the first gate driving signal at the previous stage is the logic low-level signal, the second transistor M2 is turned off and the sixth transistor M6 is turned on; and the first gate driving signal at the current stage is the logic low-level signal, the seventh transistor M7 is turned on, the fourth transistor M4 is turned off, and the fifth transistor M5 is turned on. A power signal of a first power signal terminal PVDD is written into a first terminal of the driving transistor 110 through the turned-on seventh transistor M7 and the turned-on sixth transistor M6, the driving transistor 110 generates a driving current, and the driving current flows into the light-emitting component 20 through the fifth transistor M5 to drive the light-emitting component 20 to emit light.

Figure 29:
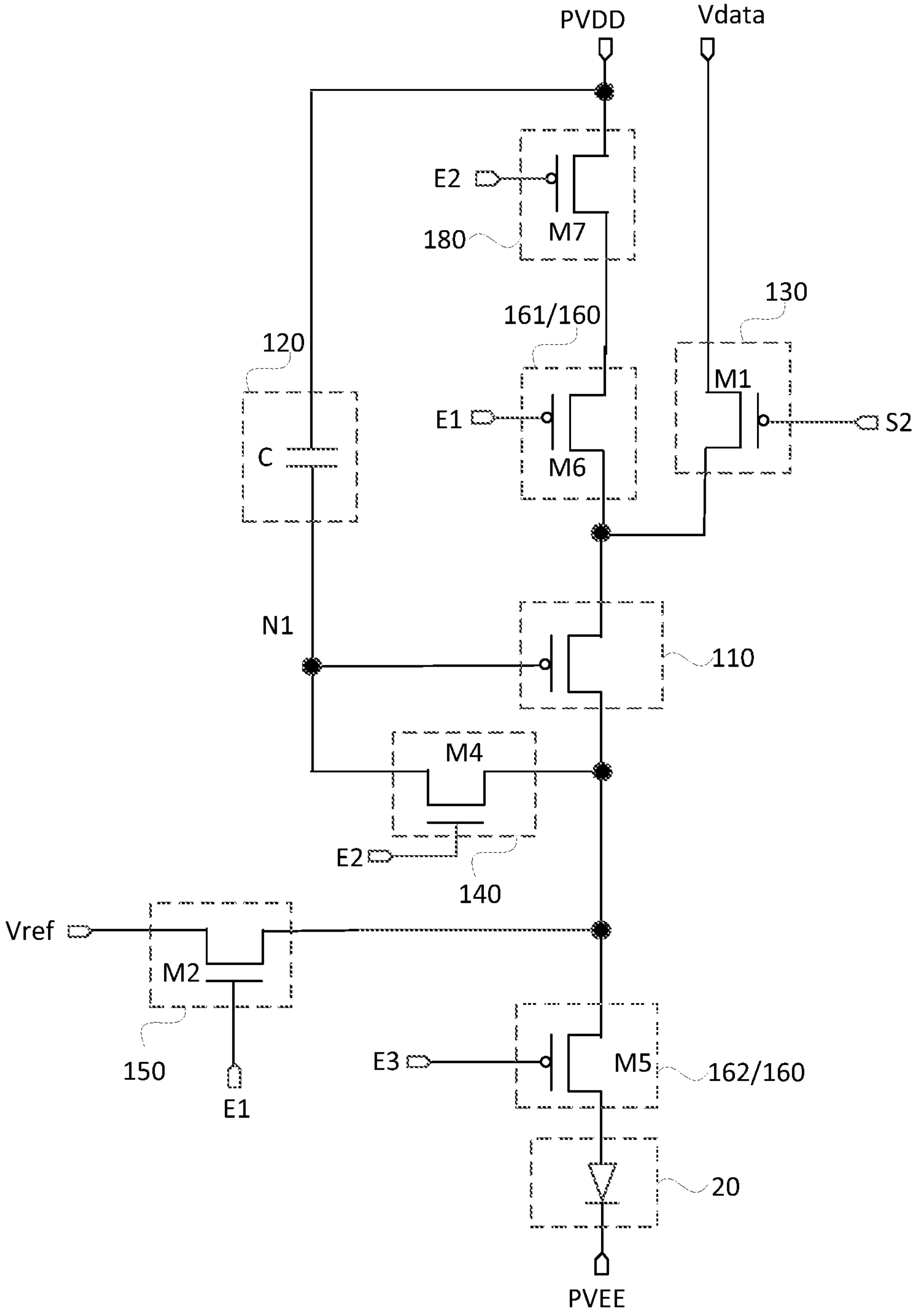
FIG. 29 is a another schematic diagram of circuit components of a pixel driving circuit shown in FIG. 27.

FIG. 29 is another schematic diagram showing circuit components of a pixel driving circuit shown in FIG. 27. A working process of the pixel driving circuit 29 shown in FIG. 10 under the control of the driving timing shown in FIG. 26 is as follows.

In a T1 phase, i.e., a first sub-initialization phase in an initialization phase, a second gate driving signal at the current stage output by an output terminal S2 of the second gate driving unit at the current stage is a logic high-level signal, and a first transistor M1 is turned off; a first gate driving signal at a previous stage output by an output terminal E1 of the first gate driving unit at the previous stage is a logic high-level signal, a second transistor M2 is turned on and a sixth transistor M6 is turned off; a first gate driving signal at the current stage output by an output terminal E2 of the first gate driving unit at the current stage is a logic low-level signal, a seventh transistor M7 is turned on, a fourth transistor M4 is turned off, and a first gate driving signal at the subsequent stage is the logic low-level signal, a fifth transistor M5 is turned on. The initialization voltage signal of the initialization signal terminal Vref is written into the anode of the light-emitting component 20 through the turned-on second transistor M2 and the turned-on fifth transistor M5.

In a T2 phase, i.e., in a second sub-initialization phase in the initialization phase, the second gate driving signal at the current stage is the logic high-level signal, and the first transistor M1 is turned off; the first gate driving signal at the previous stage is the logic high-level signal, the second transistor M2 is turned on and the sixth transistor M6 is turned off; the first gate driving signal at the current stage is the logic high-level signal, the seventh transistor M7 is turned off and the fourth transistor M4 is turned on; the first gate driving signal at the subsequent stage is the logic low-level signal, the fifth transistor M5 is turned on. The initialization voltage signal of an initialization signal terminal Vref is written into a first node N1 through the turned-on second transistor M2 and the turned-on fourth transistor M4. At the same time, the initialization voltage signal is written into the anode of the light-emitting component 20 through the turned-on second transistor M2 and the turned-on fifth transistor M5.

In a T3 phase, i.e., in a data writing phase, the second gate driving signal at the current stage is the logic low-level signal, and the first transistor M1 is turned on; the first gate driving signal at the previous stage is the logic low-level signal, the second transistor M2 is turned off and the sixth transistor M6 is turned on; the first gate driving signal at the current stage is the logic high-level signal, the seventh transistor M7 is turned off, the fourth transistor M4 is turned on; and the first gate driving signal at the subsequent stag is the logic high-level signal, the fifth transistor M5 is turned off. A data voltage signal of a data signal terminal Vdata is written into a control terminal of the driving transistor 110 (i.e., the first node N1) through the first transistor M1, the driving transistor 110, and the fourth transistor M4 sequentially. Reference may be made to the previous contents for the specific process, and a voltage of the control terminal of the driving transistor is stored in the capacitor C.

In a T4 phase, the second gate driving signal at the current stage is the logic high-level signal, the first transistor M1 is turned off; the first gate driving signal at the previous stage is the logic low-level signal, the second transistor M2 is turned off and the sixth transistor M6 is turned on; the first gate driving signal at the current stage is the logic low-level signal, the seventh transistor M7 is turned on and the fourth transistor M4 is turned off; the first gate driving signal at the subsequent stage is the logic high-level signal, the fifth transistor M5 is turned off and no action.

In a T5 phase, i.e., a light-emitting phase, the second gate driving signal at the current stage is the logic high-level signal, the first transistor M1 is turned off; the first gate driving signal at the previous stage is the logic low-level signal, the second transistor M2 is turned off and the sixth transistor M6 is turned on; the first gate driving signal at the current stage is the logic low-level signal, the seventh transistor M7 is turned on and the fourth transistor M4 is turned off; the first gate driving signal at the subsequent stage is the logic low-level signal, the fifth transistor M5 is turned on. A power signal of a first power signal terminal PVDD is written into a first terminal of the driving transistor 110 through the turned-on seventh transistor M7 and the turned-on sixth transistor M6, the driving transistor 110 generates a driving current, and the driving current flows into the light-emitting component 20 through the fifth transistor M5 to drive the light-emitting component 20 to emit light.

It should be noted that FIGS. 28 and 29 exemplarily show that the first transistor M1, the fifth transistor M5, the sixth transistor M6, the seventh transistor M7 and the driving transistor 110 are P-type transistors, and the second transistor M2 and the fourth transistor M4 are N-type transistors, but this is not a limitation to the present disclosure. In some optional embodiments, the transistors in the pixel driving circuit 10 may all be N-type transistors, or P-type transistors, or some transistors in the pixel driving circuit 10 are N-type transistors and some transistors in the pixel driving circuit 10 are P-type transistors. The type of each transistor in the pixel driving circuit 10 is not specifically limited in the embodiment of the present disclosure.

Figure 30:
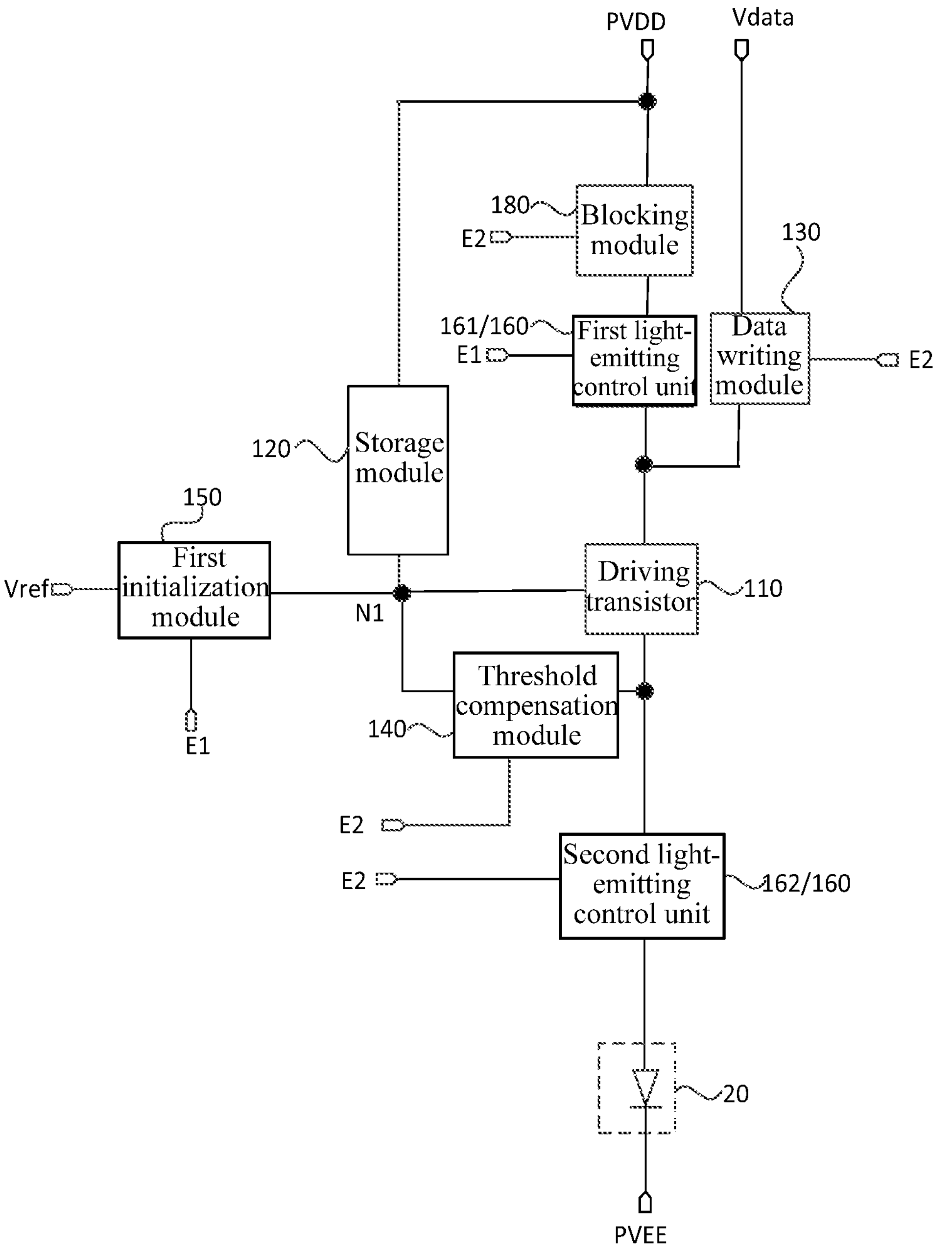
FIG. 30 is a block diagram of another pixel driving circuit provided by an embodiment of the present disclosure.
Figure 31:
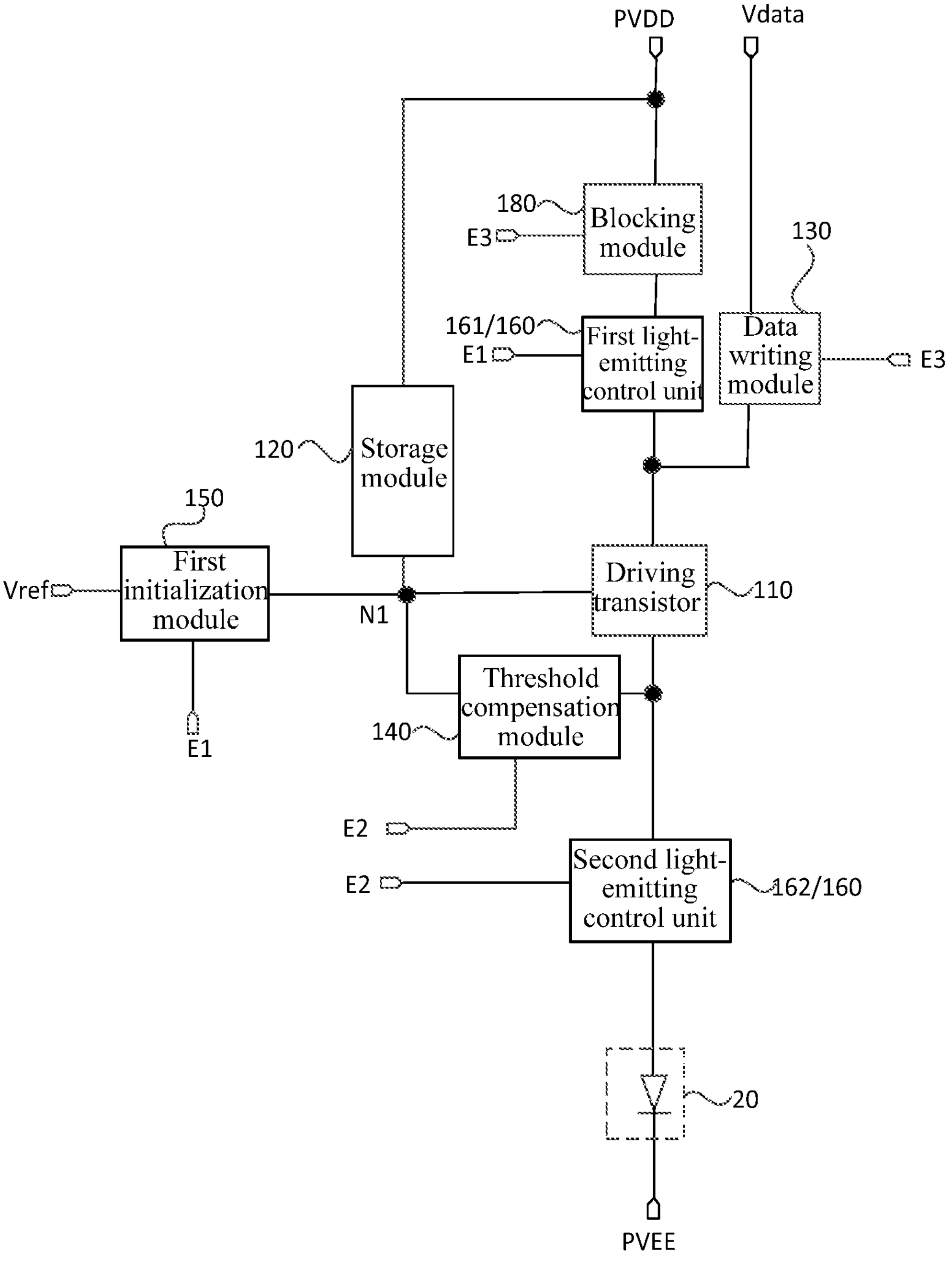
FIG. 31 is a block diagram of another pixel driving circuit provided by an embodiment of the present disclosure.

FIG. 30 is a block diagram of another pixel driving circuit provided by an embodiment of the present disclosure. FIG. 31 is a block diagram of another pixel driving circuit provided by an embodiment of the present disclosure. Referring to FIGS. 30 and 31, a display panel includes a first gate driving circuit, and the first gate driving circuit includes multiple cascaded first gate driving units. A control terminal of a first light-emitting control unit 161 is electrically connected to an output terminal E1 of the first gate driving unit at the previous stage; a control terminal of a blocking module 180 and a control terminal of a data writing module 130 are electrically connected to an output terminal E2 of the first gate driving unit at the current stage (as shown in FIG. 30) or an output terminal E3 of the first gate driving unit at the subsequent stage (as shown in FIG. 31); a control terminal of the threshold compensation module 140 and a control terminal of the second light-emitting control unit 162 are electrically connected to the output terminal E2 of the first gate driving unit at the current stage; and the first initialization module 150 is electrically connected between the initialization signal terminal Vref and the control terminal of the driving transistor, and a control terminal of the first initialization module 150 is electrically connected to the output terminal E1 of the first gate driving unit at the previous stage.

Optionally, multiple pixel driving circuits 10 are arranged in X rows and Y columns. When the control terminal of the blocking module 180 and the control terminal of the data writing module 130 are electrically connected to the output terminal E2 of the first gate driving unit at the current stage, the first gate driving circuit includes (X+1)-stage cascaded first gate driving units. When the control terminal of the blocking module 180 and the control terminal of the data writing module 130 are electrically connected to the output terminal E3 of the first gate driving unit at the subsequent stage, the first gate driving circuit includes (X+2)-stage cascaded first gate driving units. The first gate driving unit at the previous stage of the pixel driving circuit 10 located in a j-th row is a first gate driving unit at a j-th stage, and the first gate driving unit at the current stage is a first gate driving unit at a (j+1)-th stage, the first gate driving unit at the subsequent stage is a first gate driving unit at a (j+2)-th stage, where X and Y are both positive integers greater than or equal to 1, and 1≤j≤X.

Figure 32:
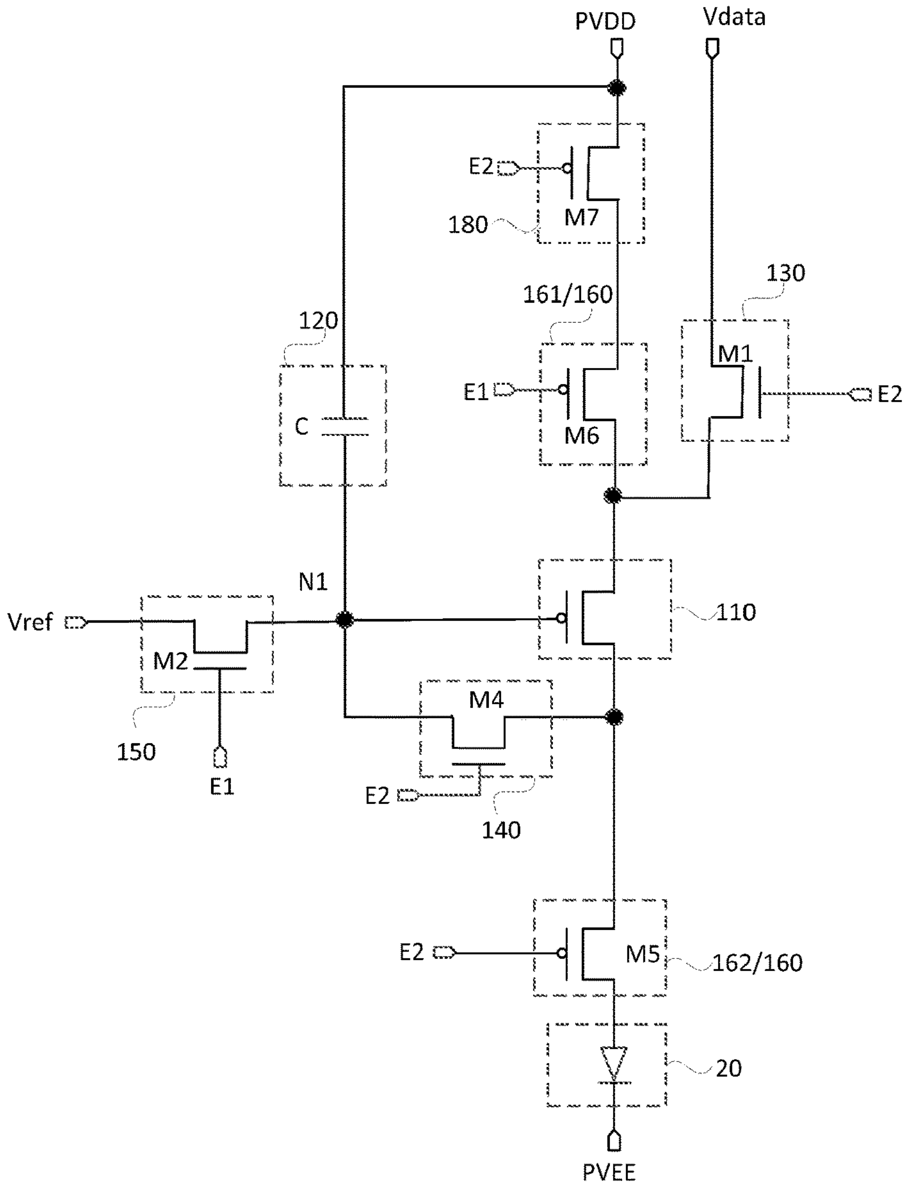
FIG. 32 is a schematic diagram showing circuit components of a pixel driving circuit shown in FIG. 30.
Figure 33:
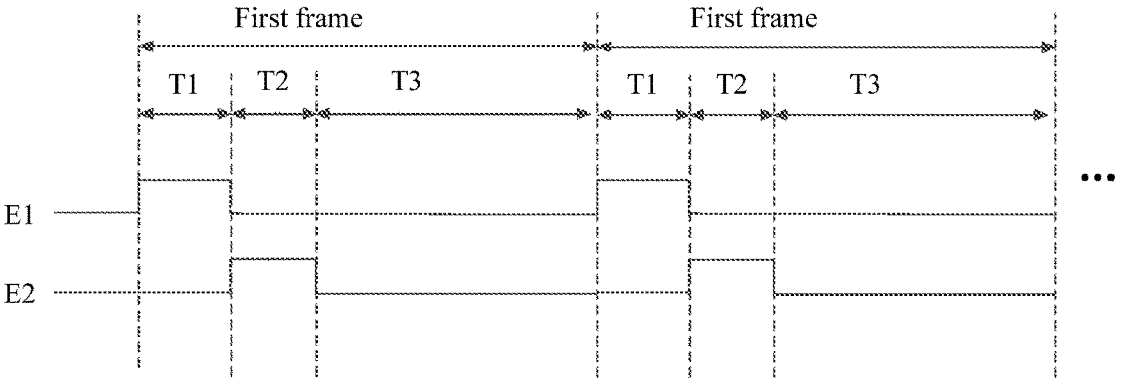
FIG. 33 is a diagram illustrating a driving timing sequence provided by an embodiment of the present disclosure.

FIG. 32 is a schematic diagram showing circuit components of a pixel driving circuit shown in FIG. 30. FIG. 33 is a driving timing graph provided by an embodiment of the present disclosure. A working process of the pixel driving circuit shown in FIG. 32 under the control of the driving timing shown in FIG. 33 is as follows.

In a T1 phase, i.e., in an initialization phase, a first gate driving signal at the previous stage output by the first gate driving unit at the previous stage is a logic high-level signal, and a second transistor M2 is turned on and a sixth transistor M6 is turned off; the first gate driving signal at the current stage is a logic high-level signal, a seventh transistor M7 is turned on and a fourth transistor M4 is turned off, a first transistor M1 is turned off and a fifth transistor M5 is turned on. The initialization voltage signal of the initialization signal terminal Vref is written into a first node N1 through the turned-on second transistor M2.

In a T2 phase, i.e., in a data writing phase, the first gate driving signal at the previous stage is the logic low-level signal, and the second transistor M2 is turned off and the sixth transistor M6 is turned on; the first gate driving signal output by the first gate driving unit at the current stage is the logic high-level signal, the seventh transistor M7 is turned off and the fourth transistor M4 is turned on, the first transistor M1 is turned on and the fifth transistor M5 is turned off. A data voltage signal of a data signal terminal Vdata is written into a control terminal of the driving transistor 110 (i.e., the first node N1) through the first transistor M1, the driving transistor 110, and the fourth transistor M4 sequentially. Reference may be made to the previous contents for the specific process, and at the same time, a voltage of the control terminal of the driving transistor 110 is stored in the capacitor C.

In a T3 phase, i.e., in a light-emitting phase, the first gate driving signal at the previous stage is the logic low-level signal, the second transistor M2 is turned off, and the sixth transistor M6 is turned on; the first gate driving signal at the current stage is the logic low-level signal, the seventh transistor M7 is turned on, the fourth transistor M4 is turned off, the first transistor M1 is turned off, and the fifth transistor M5 is turned on. A first power voltage signal of a first power signal terminal PVDD is written into a first terminal of the driving transistor 110 through the turned-on seventh transistor M7 and the turned-on sixth transistor M6, the driving transistor 110 generates a driving current, and the driving current flows into the light-emitting component 20 through the fifth transistor M5 to drive the light-emitting component 20 to emit light.

Figure 34:
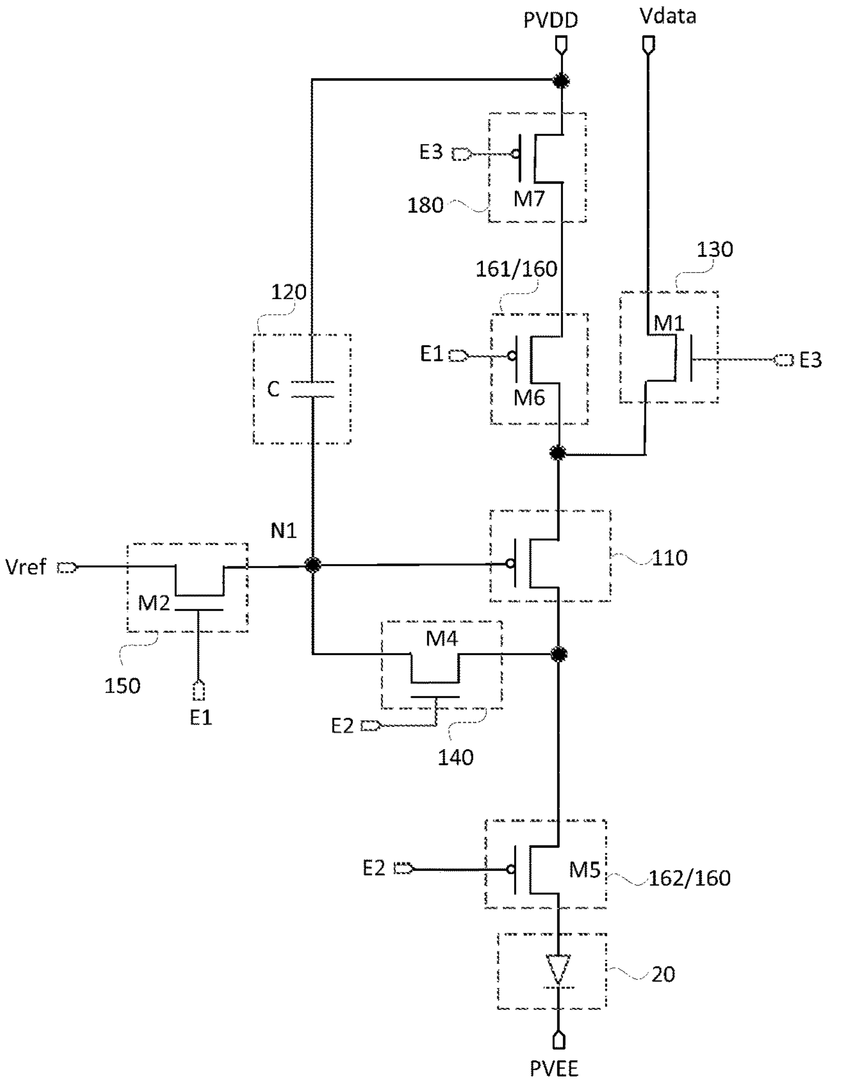
FIG. 34 is a schematic diagram showing circuit components of a pixel driving circuit shown in FIG. 31.
Figure 35:
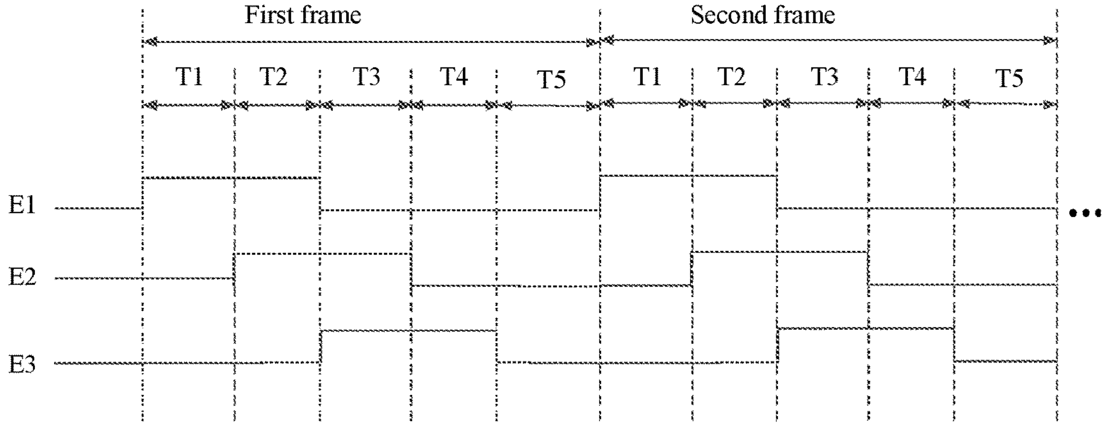
FIG. 35 is another driving timing graph provided by an embodiment of the present disclosure.

FIG. 34 is a schematic diagram showing circuit components of a pixel driving circuit shown in FIG. 31. FIG. 35 is another driving timing graph provided by an embodiment of the present disclosure. A working process of the pixel driving circuit 10 shown in FIG. 34 under the control of the driving timing shown in FIG. 35 is as follows.

In a T1 phase, i.e., a first sub-initialization phase in an initialization phase, the first gate driving signal at the previous stage output by the first gate driving unit at the previous stage is a logic high-level signal, and the second transistor M2 is turned on and the sixth transistor M6 is turned off; the first gate driving signal at the current stage output by the first gate driving unit at the current stage is the logic low-level signal, the fourth transistor M4 is turned off and the fifth transistor M5 is turned on, the first gate driving signal at the subsequent stage output by the first gate driving unit at the subsequent stage is the logic low-level signal, the first transistor M1 is turned off and the seventh transistor M7 is turned on. The initialization voltage signal of the initialization signal terminal Vref is written into the first node N1 through the turned-on second transistor M2.

In a T2 phase, i.e., in a second sub-initialization phase in the initialization phase, the first gate driving signal at the previous stage is the logic high-level signal, and the second transistor M2 is turned on and the sixth transistor M6 is turned off; the first gate driving signal at the current stage is the logic high-level signal, the fourth transistor M4 is turned on and the fifth transistor M5 is turned off, the first gate driving signal at the subsequent stage is the logic low-level signal, the first transistor M1 is turned off and the seventh transistor M7 is turned on. The initialization voltage signal of the initialization signal terminal Vref is written into the first node N1 through the turned-on second transistor M2.

In a T3 phase, i.e., in a data writing phase, the first gate driving signal at the previous stage is the logic low-level signal, and the second transistor M2 is turned off and the sixth transistor M6 is turned on; the first gate driving signal at the current stage is the logic high-level signal, the fourth transistor M4 is turned on and the fifth transistor M5 is turned off, the first gate driving signal at the subsequent stage is the logic high-level signal, the first transistor M1 is turned on and the seventh transistor M7 is turned off. The data voltage signal of the data signal terminal Vdata is written into a control terminal of the driving transistor 110 (i.e., the first node N1) through the first transistor M1, the driving transistor 110, and the fourth transistor M4 sequentially. Reference may be made to the previous contents for the specific process, and at the same time, a voltage of the control terminal of the driving transistor 110 is stored in the capacitor C.

In a T4 phase, the first gate driving signal at the previous stage is the logic low-level signal, and the second transistor M2 is turned off and the sixth transistor M6 is turned on; the first gate driving signal at the current stage is the logic low-level signal, the fourth transistor M4 is turned off and the fifth transistor M5 is turned on, the first gate driving signal at the subsequent stage is the logic high-level signal, the first transistor M1 is turned on, the seventh transistor M7 is turned off and no action.

In a T5 phase, i.e., in the light-emitting phase, the first gate driving signal at the previous stage is the logic low-level signal, and the second transistor M2 is turned off and the sixth transistor M6 is turned on; the first gate driving signal at the current stage is the logic low-level signal, the fourth transistor M4 is turned off and the fifth transistor M5 is turned on, the first gate driving signal at the subsequent stage is the logic low-level signal, the first transistor M1 is turned off, the seventh transistor M7 is turned on. A first power voltage signal of a first power signal terminal PVDD is written into a first terminal of the driving transistor 110 through the turned-on seventh transistor M7 and the turned-on sixth transistor M6, the driving transistor 110 generates a driving current, and the driving current flows into the light-emitting component 20 through the fifth transistor M5 to drive the light-emitting component 20 to emit light.

It should be noted that FIGS. 32 and 34 exemplarily show that the fifth transistor M5, the sixth transistor M6, the seventh transistor M7 and the driving transistor 110 are P-type transistors, the first transistor M1, the second transistor M2 and the fourth transistor M4 are N-type transistors, but this is not a limitation to the present disclosure. In some optional embodiments, the transistors in the pixel driving circuit 10 may all be N-type transistors, or P-type transistors, or some transistors in the pixel driving circuit 10 are N-type transistors and some transistors in the pixel driving circuit 10 are P-type transistors. The type of each transistor in the pixel driving circuit 10 is not specifically limited in the embodiment of the present disclosure.

Figure 36:
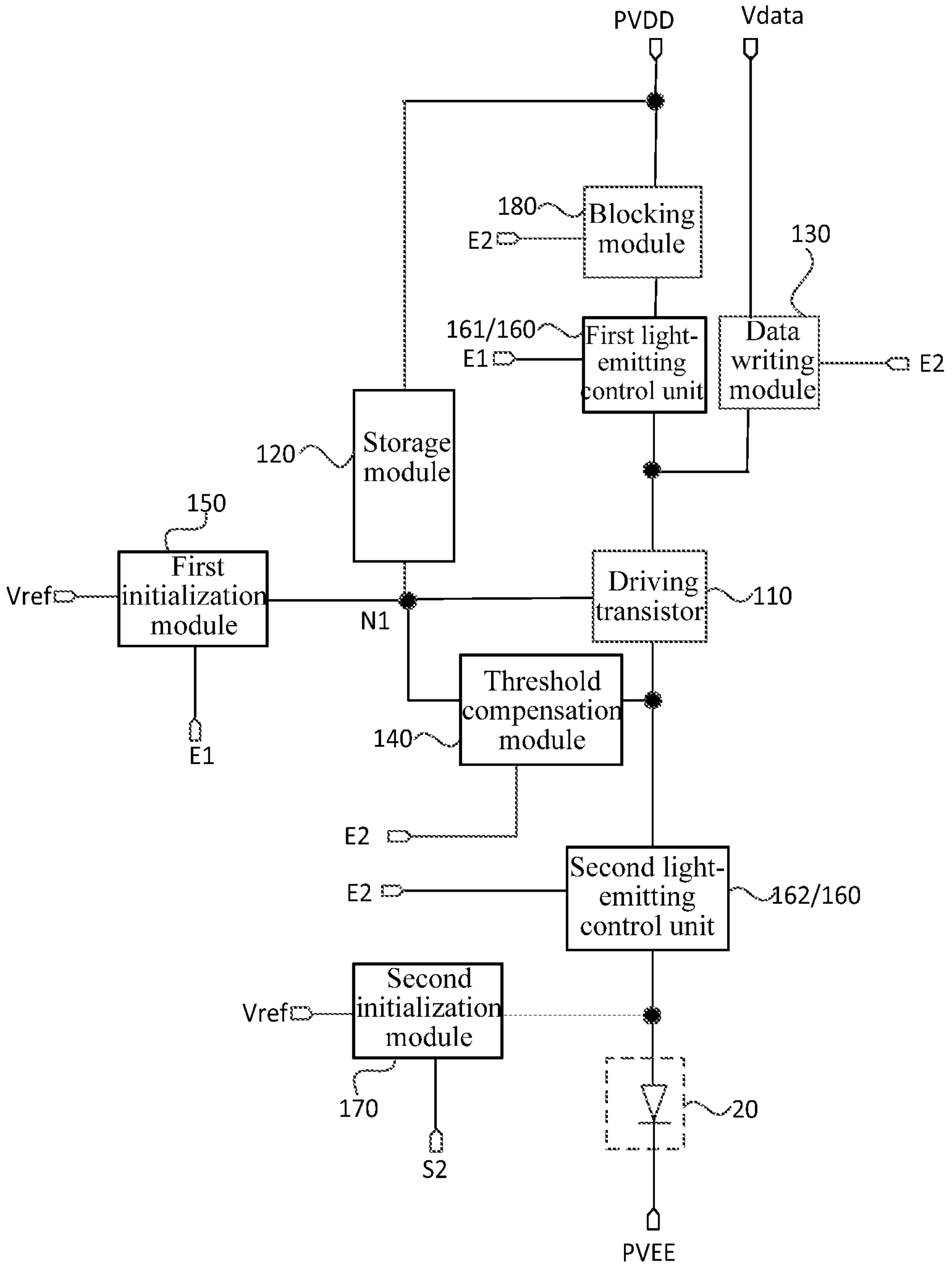
FIG. 36 is a block diagram of a pixel driving circuit provided by an embodiment of the present disclosure.
Figure 37:
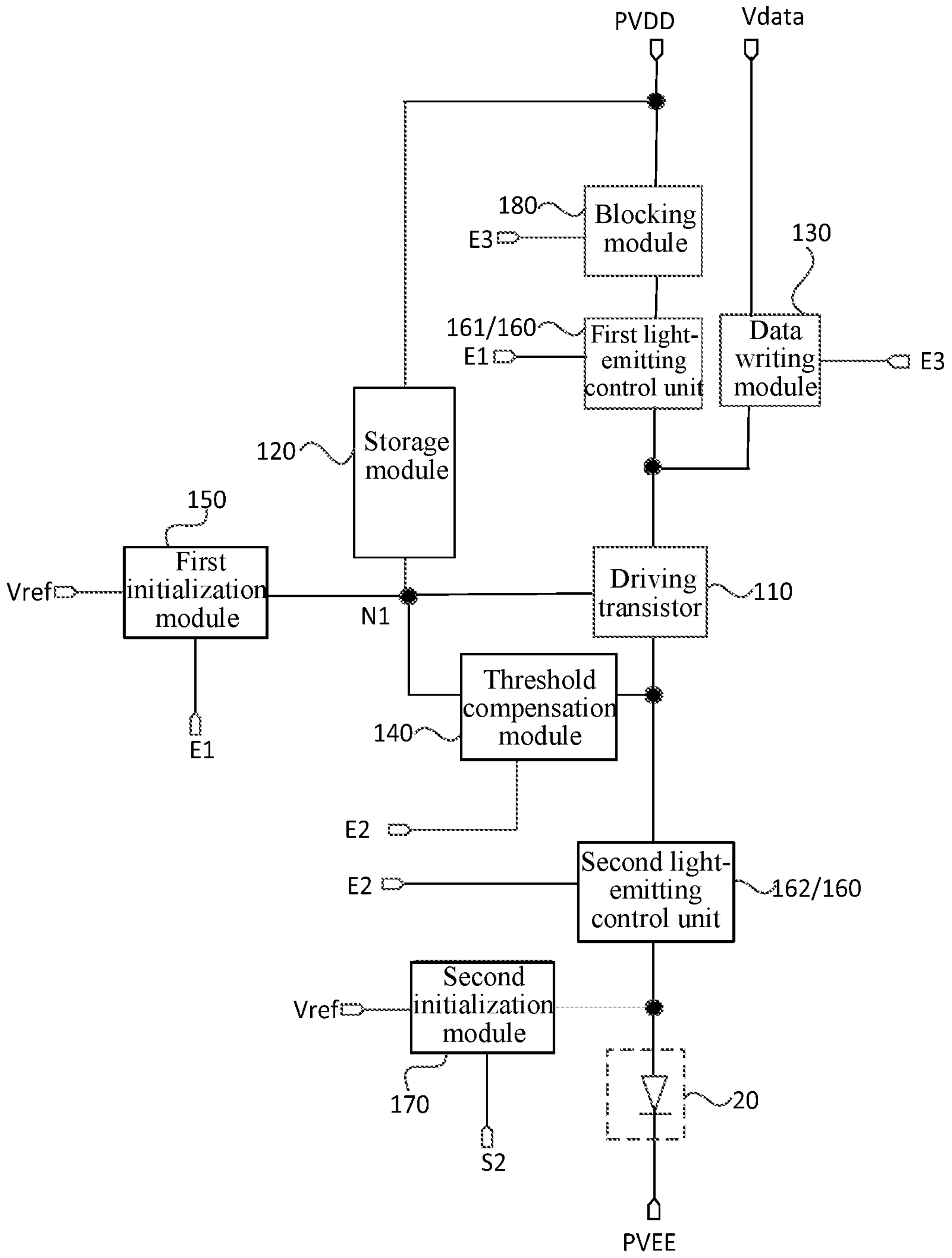
FIG. 37 is a block diagram of another pixel driving circuit provided by an embodiment of the present disclosure.

FIG. 36 is a block diagram of a pixel driving circuit provided by an embodiment of the present disclosure. FIG. 37 is a block diagram of another pixel driving circuit provided by an embodiment of the present disclosure. Referring to FIGS. 30, 31, 36 and 37, a difference between the pixel driving circuit 10 shown in FIG. 36 and the pixel driving circuit 10 shown in FIG. 30, and the difference between the pixel driving circuit 10 shown in FIG. 37 and pixel driving circuit 10 shown FIG. 31 is that, optionally, the display panel also includes a second gate driving circuit. The second gate driving circuit includes multiple cascaded second gate driving units. The pixel driving circuit 10 also includes a second initialization module 170 which is electrically connected between an initialization signal terminal Vref and an anode of a light-emitting component 20, a control terminal of the second initialization module 170 is electrically connected to an output terminal S2 of the second gate driving unit at a current stage; and the second initialization module 170 is used for providing an initialization voltage signal to the anode of the light-emitting component 20.

Optionally, the second gate driving circuit includes X-stage cascaded second gate driving units. The second gate driving unit at the current stage of the pixel driving circuit 10 located in a j-th row is a second gate driving unit in a j-th stage, where X and Y are both positive integers greater than or equal to 1, and $1 \le j \le X$.

Figure 38:
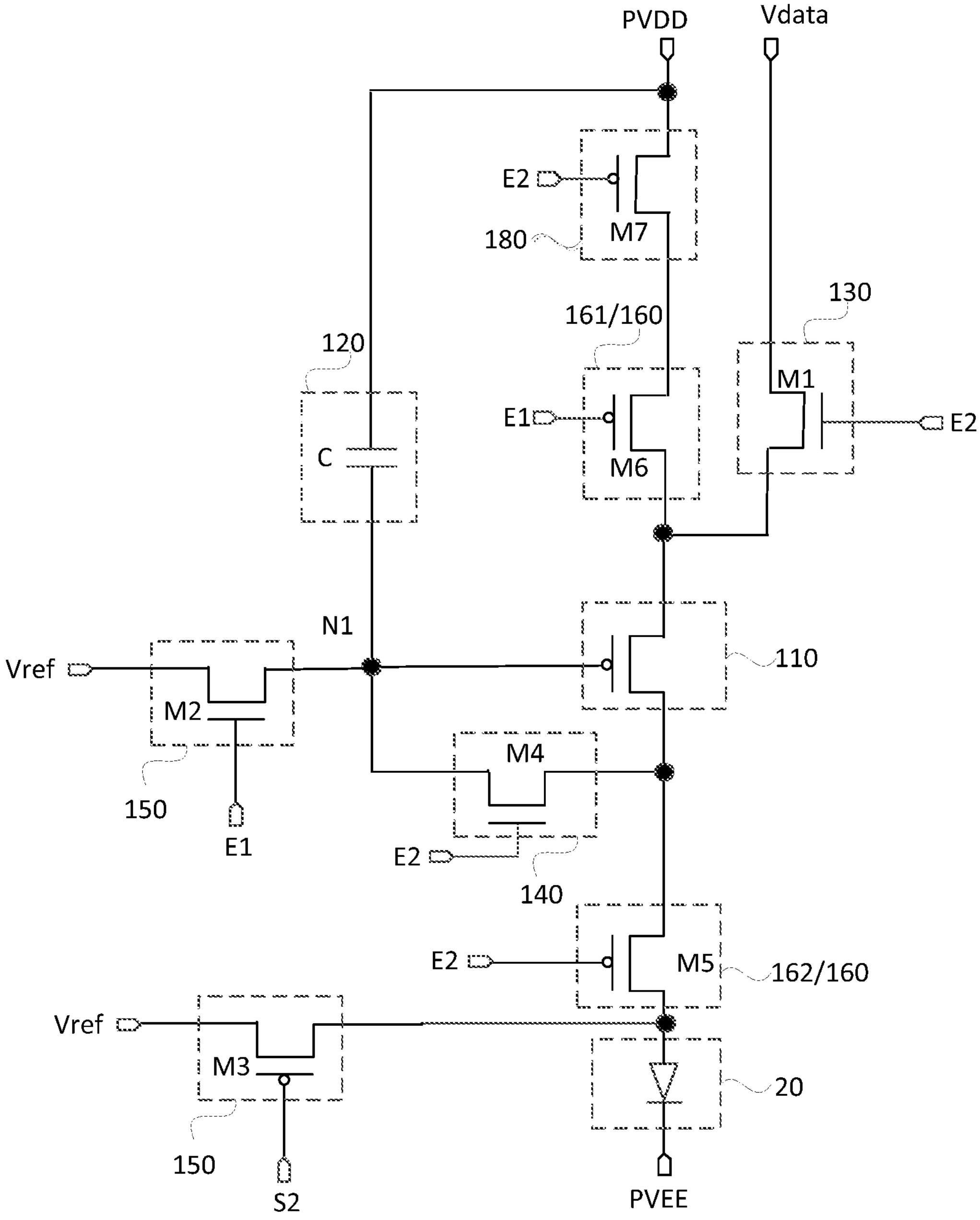
FIG. 38 is a schematic diagram showing circuit components of a pixel driving circuit shown in FIG. 36.
Figure 39:
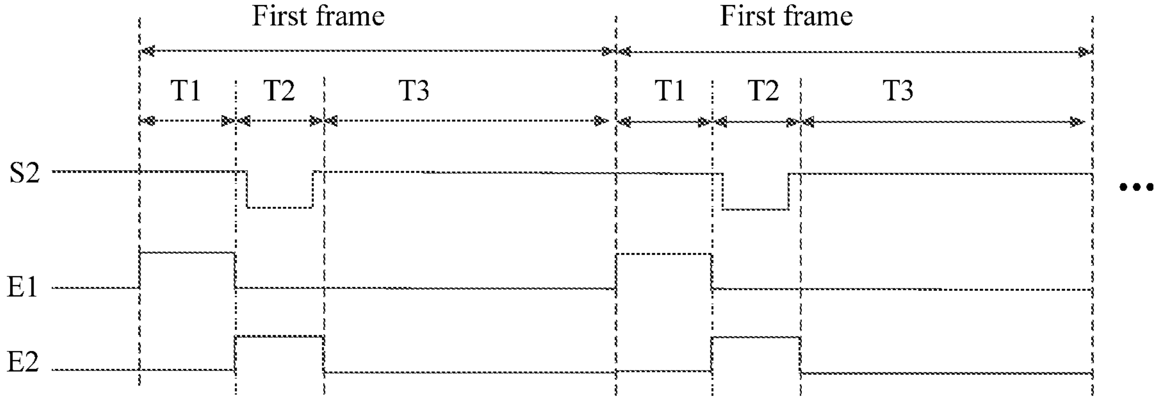
FIG. 39 is another driving timing graph provided by an embodiment of the present disclosure.

FIG. 38 is a schematic diagram showing circuit components of a pixel driving circuit shown in FIG. 36. FIG. 39 is another driving timing graph provided by an embodiment of the present disclosure. A working process of the pixel driving circuit 10 shown in FIG. 38 under the control of the driving timing shown in FIG. 39 is as follows.

In a T1 phase, i.e., in an initialization phase, a first gate driving signal at the previous stage output by the first gate driving unit at the previous stage is a logic high-level signal, and a second transistor M2 is turned on and a sixth transistor M6 is turned off; the first gate driving signal at the current stage is the logic high-level signal, a seventh transistor M7 is turned on and a fourth transistor M4 is turned off, a first transistor M1 is turned off and a fifth transistor M5 is turned on; and a second gate driving signal at the current stage output by the second gate driving unit at the current stage is the logic high-level signal, a third transistor M3 is turned off. The initialization voltage signal of the initialization signal terminal Vref is written into the first node N1 through the turned-on second transistor M2.

In a T2 phase, i.e., in a data writing phase, the first gate driving signal at the previous stage is the logic low-level signal, and the second transistor M2 is turned off and the sixth transistor M6 is turned on; the first gate driving signal output by the first gate driving unit at the current stage is the logic high-level signal, the seventh transistor M7 is turned off and the fourth transistor M4 is turned on, the first transistor M1 is turned on and the fifth transistor M5 is turned off; and the second gate driving signal at the current stage is the logic low-level signal, the third transistor M3 is turned on. A data voltage signal of a data signal terminal Vdata is written into a control terminal of the driving transistor 110 (i.e., the first node N1) through the first transistor M1, the driving transistor 110, and the fourth transistor M4 sequentially. Reference may be made to the previous contents for the specific process; a voltage of the control terminal of the driving transistor is stored in the capacitor C; and at the same time, the initialization voltage signal is written into the anode of the light-emitting component 20 through the turned-on third transistor M3.

In a T3 phase, i.e., in a light-emitting phase, the first gate driving signal at the previous stage is the logic low-level signal, the second transistor M2 is turned off, and the sixth transistor M6 is turned on; the first gate driving signal at the current stage is the logic low-level signal, the seventh transistor M7 is turned on, the fourth transistor M4 is turned off, the first transistor M1 is turned off, and the fifth transistor M5 is turned on; and the second gate driving signal at the current stage is the logic high-level signal, the third transistor M3 is turned off. A first power voltage signal of a first power signal terminal PVDD is written into a first terminal of the driving transistor 110 through the turned-on seventh transistor M7 and the turned-on sixth transistor M6, the driving transistor 110 generates a driving current, and the driving current flows into the light-emitting component 20 through the fifth transistor M5 to drive the light-emitting component 20 to emit light.

Figure 40:
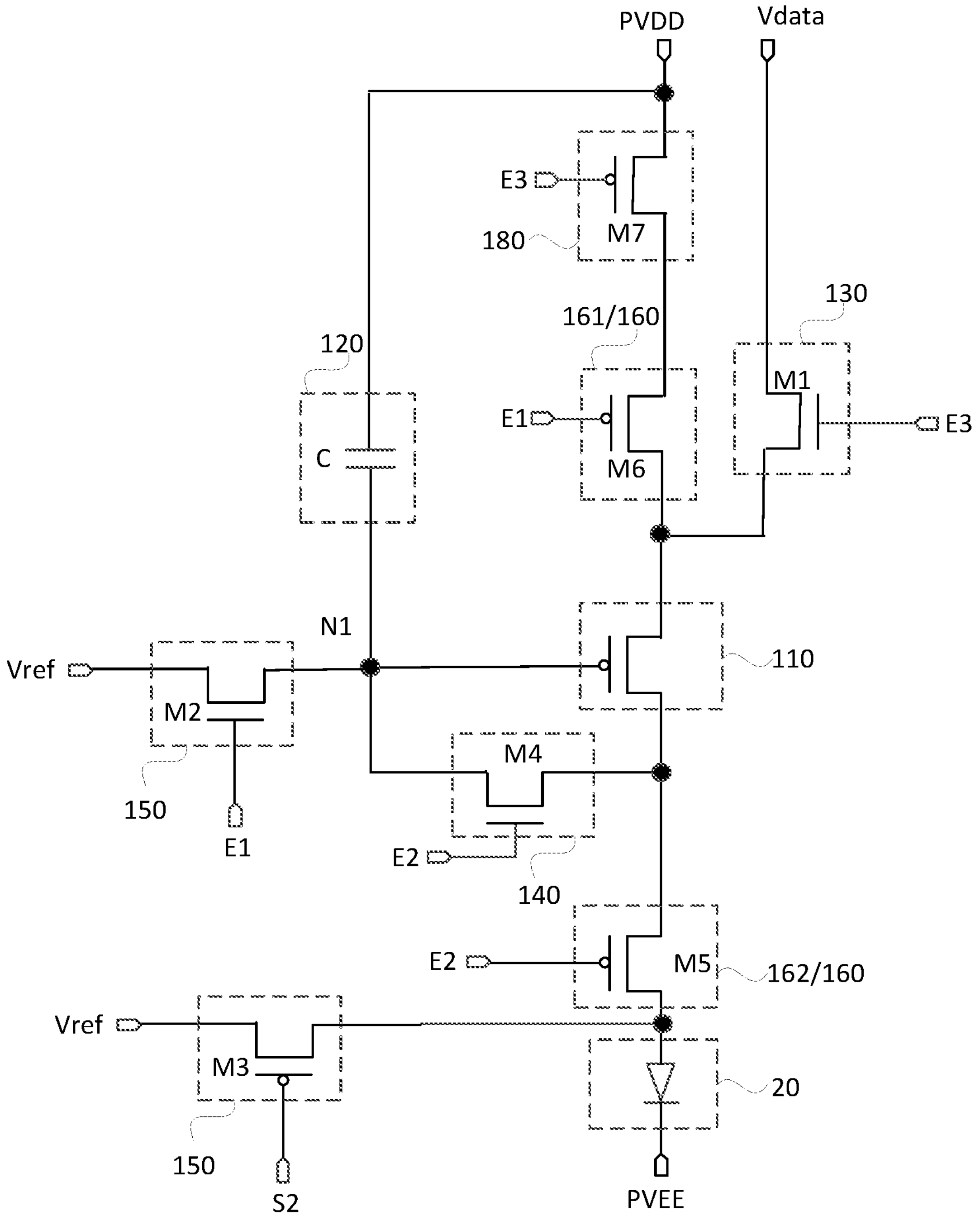
FIG. 40 is a schematic diagram showing circuit components of a pixel driving circuit shown in FIG. 37.

FIG. 40 is a schematic diagram showing circuit components of a pixel driving circuit shown in FIG. 37. A working process of the pixel driving circuit 10 shown in FIG. 40 under the control of the driving timing shown in FIG. 26 is as follows.

In a T1 phase, i.e., a first sub-initialization phase in an initialization phase, the first gate driving signal at the previous stage output by the first gate driving unit at the previous stage is a logic high-level signal, and the second transistor M2 is turned on and the sixth transistor M6 is turned off; the first gate driving signal at the current stage output by the first gate driving unit at the current stage is the logic low-level signal, the fourth transistor M4 is turned off and the fifth transistor M5 is turned on, the first gate driving signal at the subsequent stage output by the first gate driving unit at the subsequent stage is the logic low-level signal, the first transistor M1 is turned off and the seventh transistor M7 is turned on; and the second gate driving signal at the current stage is the logic high-level signal, the third transistor M3 is turned off. The initialization voltage signal of the initialization signal terminal Vref is written into the first node N1 through the turned-on second transistor M2.

In a T2 phase, i.e., in a second sub-initialization phase in the initialization phase, the first gate driving signal at the previous stage is the logic high-level signal, and the second transistor M2 is turned on and the sixth transistor M6 is turned off; the first gate driving signal at the current stage is the logic high-level signal, the fourth transistor M4 is turned on and the fifth transistor M5 is turned off, the first gate driving signal at the subsequent stage is the logic low-level signal, the first transistor M1 is turned off and the seventh transistor M7 is turned on; and the second gate driving signal at the current stage is the logic high-level signal, the third transistor M3 is turned off. The initialization voltage signal of the initialization signal terminal Vref is written into the first node N1 through the turned-on second transistor M2.

In a T3 phase, i.e., in a data writing phase, the first gate driving signal at the previous stage is the logic low-level signal, and the second transistor M2 is turned off and the sixth transistor M6 is turned on; the first gate driving signal at the current stage is the logic high-level signal, the fourth transistor M4 is turned on and the fifth transistor M5 is turned off, the first gate driving signal at the subsequent stage is the logic high-level signal, the first transistor M1 is turned on and the seventh transistor M7 is turned off; and the second gate driving signal at the current stage is the logic low-level signal, the third transistor M3 is turned off. A data voltage signal of a data signal terminal Vdata is written into a control terminal of the driving transistor 110 (i.e., the first node N1) through the first transistor M1, the driving transistor 110, and the fourth transistor M4 sequentially. Reference may be made to the previous contents for the specific process; a voltage of the control terminal of the driving transistor is stored in the capacitor C; and at the same time, the initialization voltage signal is written into the anode of the light-emitting component 20 through the turned-on third transistor M3.

In a T4 phase, the first gate driving signal at the previous stage is the logic low-level signal, and the second transistor M2 is turned off and the sixth transistor M6 is turned on; the first gate driving signal at the current stage is the logic low-level signal, the fourth transistor M4 is turned off and the fifth transistor M5 is turned on, the first gate driving signal at the subsequent stage is the logic high-level signal, the first transistor M1 is turned on, the seventh transistor M7 is turned off; and the second gate driving signal at the current stage is the logic high-level signal, the third transistor M3 is turned off and no action.

In a T5 phase, i.e., in the light-emitting phase, the first gate driving signal at the previous stage is the logic low-level signal, and the second transistor M2 is turned off and the sixth transistor M6 is turned on; the first gate driving signal at the current stage is the logic low-level signal, the fourth transistor M4 is turned off and the fifth transistor M5 is turned on, the first gate driving signal at the subsequent stage is the logic low-level signal, the first transistor M1 is turned off, the seventh transistor M7 is turned on; and the second gate driving signal at the current stage is the logic high-level signal, the third transistor M3 is turned off. A first power voltage signal of a first power signal terminal PVDD is written into a first terminal of the driving transistor 110 through the turned-on seventh transistor M7 and the turned-on sixth transistor M6, the driving transistor 110 generates a driving current, and the driving current flows into the light-emitting component 20 through the fifth transistor M5 to drive the light-emitting component 20 to emit light.

It should be noted that, in the driving timing sequence shown in FIG. 26, initialization of the anode of the light-emitting component 20 occurs at the T3 phase, but this is not a limitation to the present disclosure. In other embodiments, the initialization of the anode of the light-emitting component 20 may also occur at T1 phase and/or T2 phase.

It should be noted that FIGS. 38 and 40 exemplarily show that the third transistor M3, the fifth transistor M5, the sixth transistor M6, the seventh transistor M7 and the driving transistor 110 are P-type transistors, and the first transistor M1, the second transistor M2, the fourth transistor M4 are N-type transistors, but this is not a limitation to the present disclosure. In some optional embodiments, the transistors in the pixel driving circuit 10 may all be N-type transistors, or P-type transistors, or some transistors in the pixel driving circuit 10 are N-type transistors and some transistors in the pixel driving circuit 10 are P-type transistors. The type of each transistor in the pixel driving circuit 10 is not specifically limited in the embodiment of the present disclosure.

Figure 41:
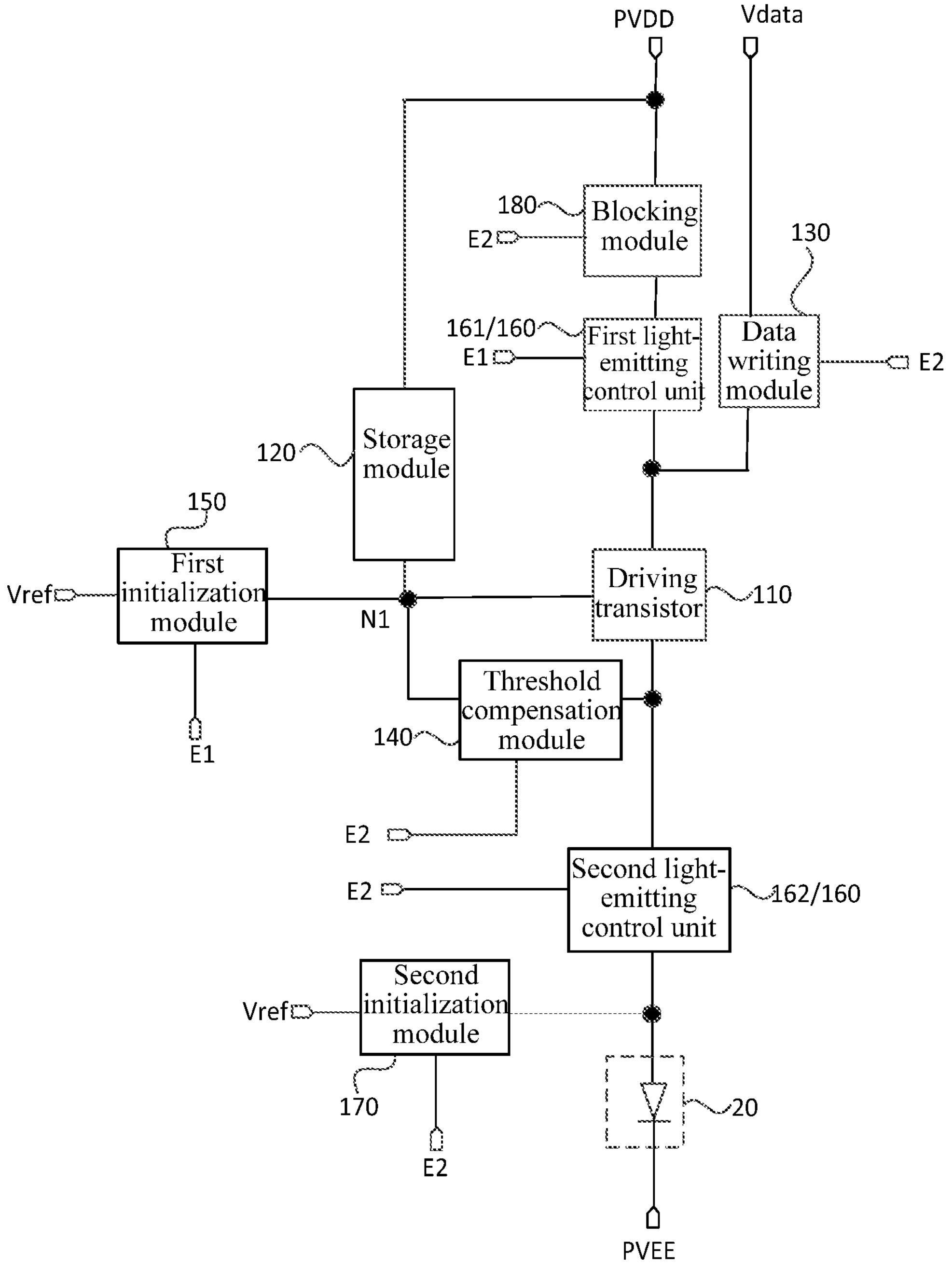
FIG. 41 is a block diagram of another pixel driving circuit provided by an embodiment of the present disclosure.
Figure 42:
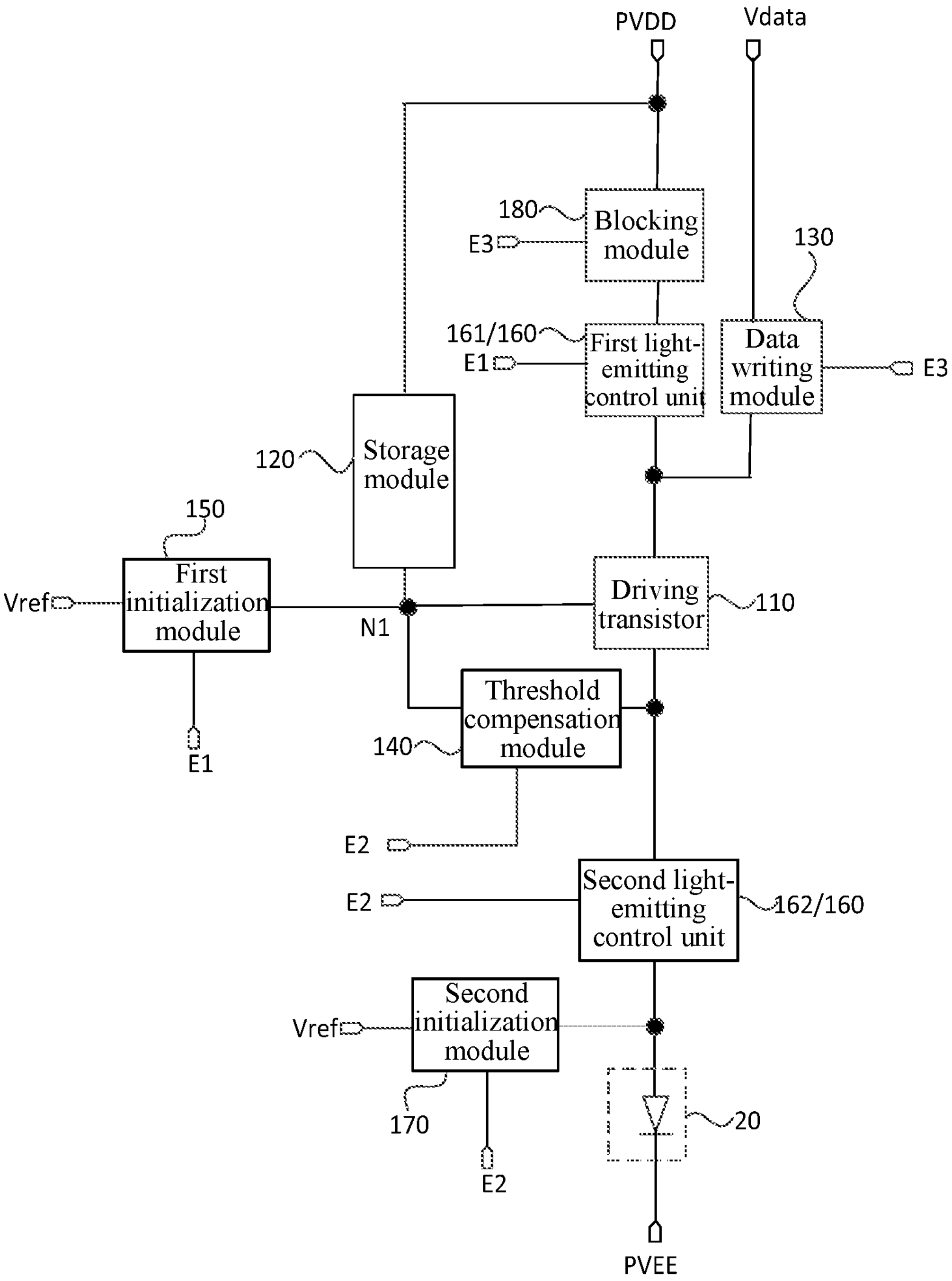
FIG. 42 is a block diagram of another pixel driving circuit provided by an embodiment of the present disclosure.

FIG. 41 is a block diagram of a pixel driving circuit provided by an embodiment of the present disclosure. FIG. 42 is a block diagram of another pixel driving circuit provided by an embodiment of the present disclosure. Referring to FIGS. 30, 31, 41 and 42, a difference between a pixel driving circuit 10 shown in FIG. 41 and a pixel driving circuit 10 shown FIG. 30 and a difference between a pixel driving circuit 10 shown in FIG. 42 and a pixel driving circuit 10 shown FIG. 31 are that, optionally, the pixel driving circuit 10 further includes a second initialization module 170 which is electrically connected between an initialization signal terminal Vref and an anode of a light-emitting component 20. A control terminal of a second initialization module 170 is electrically connected to an output terminal E2 of a first gate driving unit at a current stage; and the second initialization module 170 is used for providing an initialization voltage signal to the anode of the light-emitting component 20.

Figure 43:
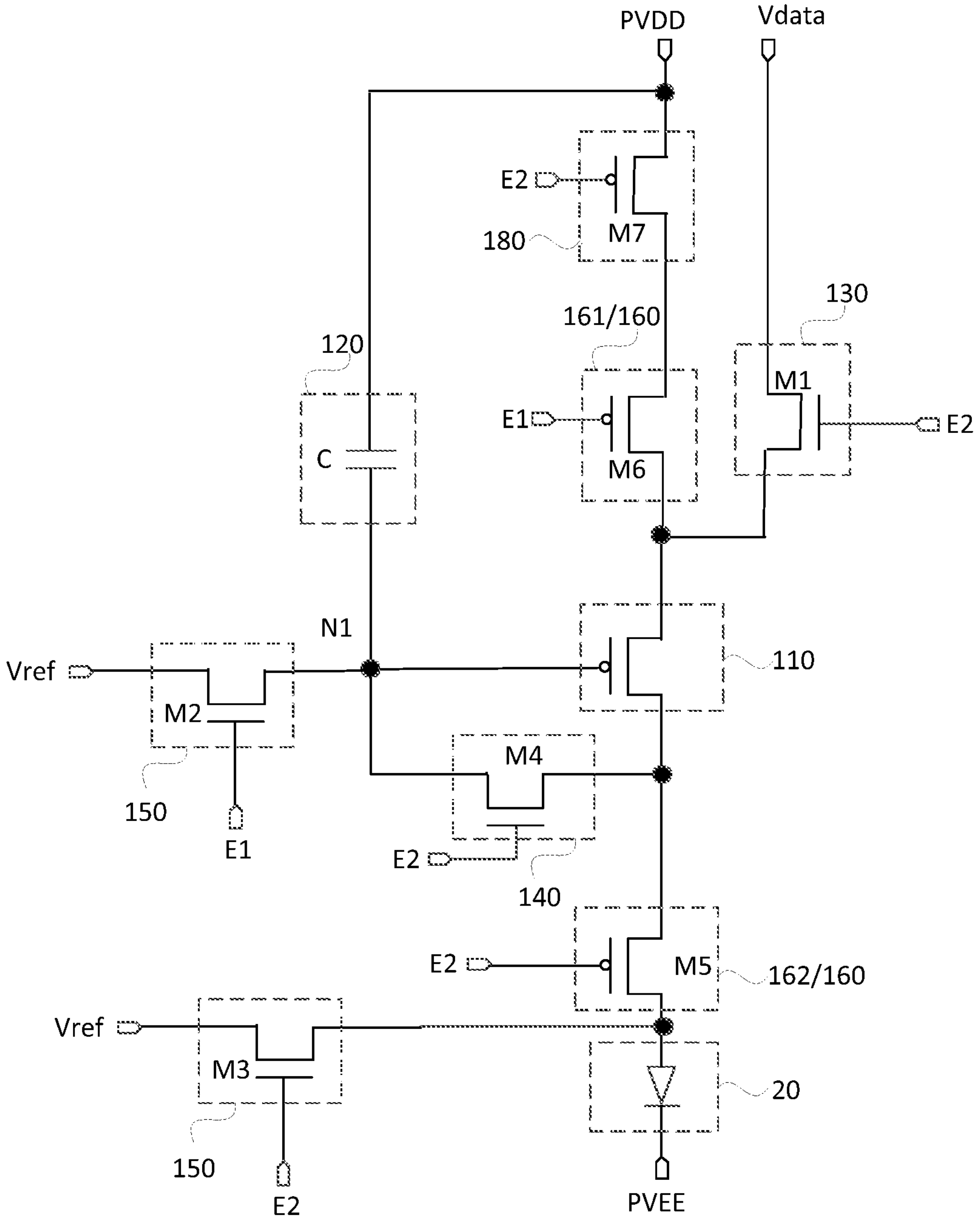
FIG. 43 is a schematic diagram showing circuit components of a pixel driving circuit shown in FIG. 41.

FIG. 43 is a schematic diagram showing circuit components of a pixel driving circuit shown in FIG. 41. A working process of the pixel driving circuit 10 shown in FIG. 43 under the control of the driving timing shown in FIG. 33 is as follows.

In a T1 phase, i.e., in an initialization phase, a first gate driving signal at the previous stage output by the first gate driving unit at the previous stage is a logic high-level signal, and a second transistor M2 is turned on and a sixth transistor M6 is turned off; the first gate driving signal at the current stage is a logic high-level signal, a seventh transistor M7 is turned on and a fourth transistor M4 is turned off, a first transistor M1 is turned off, a fifth transistor M5 is turned on and a third transistor M3 is turned off. The initialization voltage signal of the initialization signal terminal Vref is written into the first node N1 through the turned-on second transistor M2.

In a T2 phase, i.e., in a data writing phase, the first gate driving signal at the previous stage is the logic low-level signal, and the second transistor M2 is turned off and the sixth transistor M6 is turned on; the first gate driving signal output by the first gate driving unit at the current stage is the logic high-level signal, the seventh transistor M7 is turned off and the fourth transistor M4 is turned on, the first transistor M1 is turned on, the fifth transistor M5 is turned off and the third transistor M3 is turned on. A data voltage signal of a data signal terminal Vdata is written into a control terminal of the driving transistor 110 (i.e., the first node N1) through the first transistor M1, the driving transistor 110, and the fourth transistor M4 sequentially. Reference may be made to the previous contents for the specific process; a voltage of the control terminal of the driving transistor is stored in the capacitor C; and at the same time, the initialization voltage signal of the initialization signal terminal Vref is written into the anode of the light-emitting component 20 through the turned-on third transistor M3.

In a T3 phase, i.e., in a light-emitting phase, the first gate driving signal at the previous stage is the logic low-level signal, the second transistor M2 is turned off, and the sixth transistor M6 is turned on; the first gate driving signal at the current stage is the logic low-level signal, the seventh transistor M7 is turned on, the fourth transistor M4 is turned off, the first transistor M1 is turned off, the fifth transistor M5 is turned on and the third transistor M3 is turned off. A first power voltage signal of a first power signal terminal PVDD is written into a first terminal of the driving transistor 110 through the turned-on seventh transistor M7 and the turned-on sixth transistor M6, the driving transistor 110 generates a driving current, and the driving current flows into the light-emitting component 20 through the fifth transistor M5 to drive the light-emitting component 20 to emit light.

Figure 44:
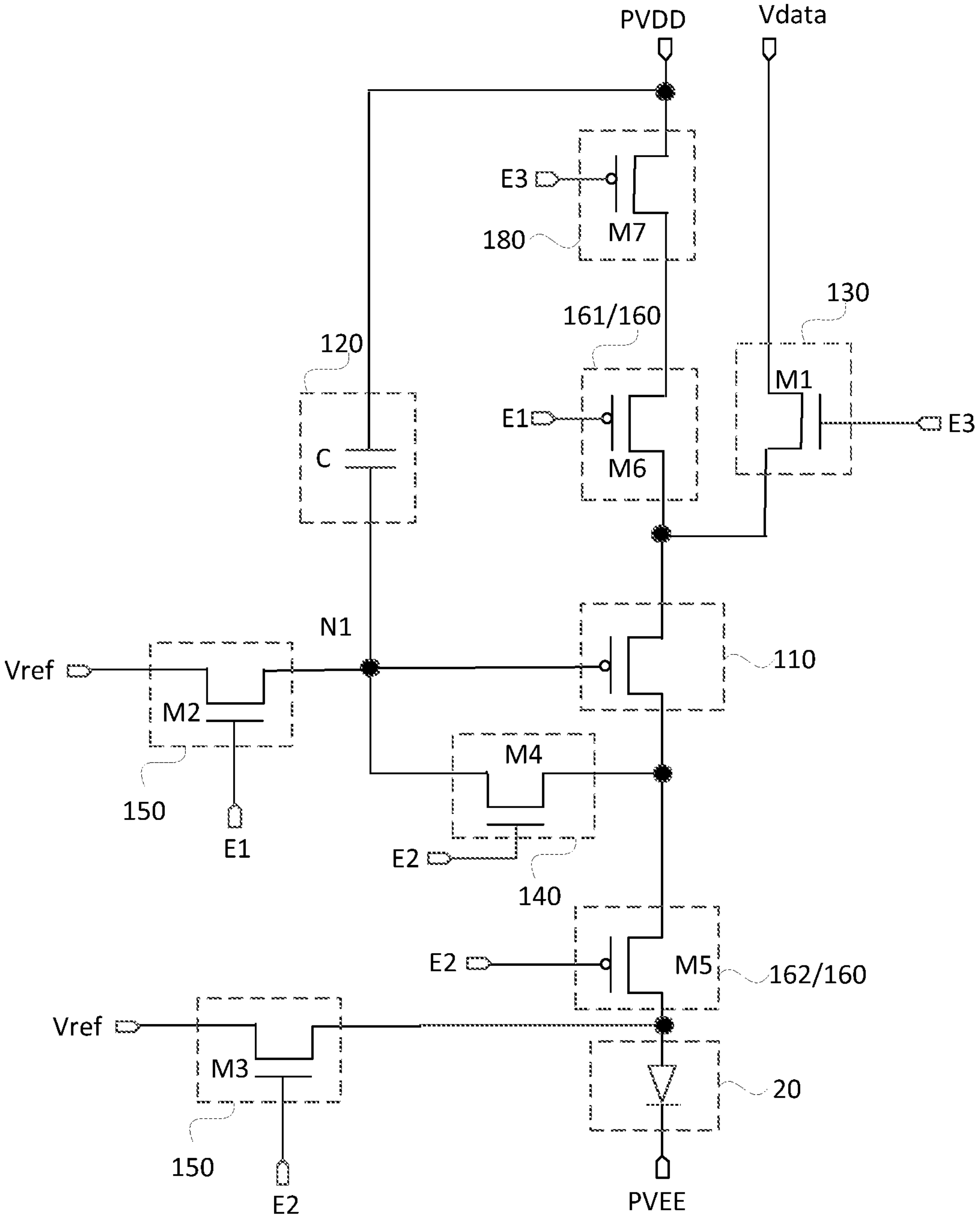
FIG. 44 is a schematic diagram showing circuit components of a pixel driving circuit shown in FIG. 42.

FIG. 44 is a schematic diagram showing circuit components of a pixel driving circuit shown in FIG. 42. A working process of the pixel driving circuit 10 shown in FIG. 44 under the control of the driving timing shown in FIG. 35 is as follows.

In a T1 phase, i.e., a first sub-initialization phase in an initialization phase, the first gate driving signal at the previous stage output by the first gate driving unit at the previous stage is a logic high-level signal, and the second transistor M2 is turned on and the sixth transistor M6 is turned off; the first gate driving signal at the current stage output by the first gate driving unit at the current stage is the logic low-level signal, the fourth transistor M4 is turned off, the fifth transistor M5 is turned on and the third transistor M3 is turned off; and the first gate driving signal at the subsequent stage output by the first gate driving unit at the subsequent stage is the logic low-level signal, the first transistor M1 is turned off and the seventh transistor M7 is turned on. The initialization voltage signal of the initialization signal terminal Vref is written into the first node N1 through the turned-on second transistor M2.

In a T2 phase, i.e., in a second sub-initialization phase in the initialization phase, the first gate driving signal at the previous stage is the logic high-level signal, and the second transistor M2 is turned on and the sixth transistor M6 is turned off; the first gate driving signal at the current stage is the logic high-level signal, the fourth transistor M4 is turned on, the fifth transistor M5 is turned off, and the third transistor M3 is turned on; and the first gate driving signal at the subsequent stage is the logic low-level signal, the first transistor M1 is turned off and the seventh transistor M7 is turned on. The initialization voltage signal of the initialization signal terminal Vref is written into the first node N1 through the turned-on second transistor M2. At the same time, the initialization voltage signal is written into the anode of the light-emitting component 20 through the turned-on third transistor M3.

In a T3 phase, i.e., in a data writing phase, the first gate driving signal at the previous stage is the logic low-level signal, and the second transistor M2 is turned off and the sixth transistor M6 is turned on; the first gate driving signal at the current stage is the logic high-level signal, the fourth transistor M4 is turned on, the fifth transistor M5 is turned off and the third transistor M3 is turned on; and the first gate driving signal at the subsequent stage is the logic high-level signal, the first transistor M1 is turned on and the seventh transistor M7 is turned off A data voltage signal of a data signal terminal Vdata is written into a control terminal of the driving transistor 110 (i.e., the first node N1) through the first transistor M1, the driving transistor 110, and the fourth transistor M4 sequentially. Reference may be made to the previous contents for the specific process; a voltage of the control terminal of the driving transistor is stored in the capacitor C; and at the same time, the initialization voltage signal is written into the anode of the light-emitting component 20 through the turned-on third transistor M3.

In a T4 phase, the first gate driving signal at the previous stage is the logic low-level signal, the second transistor M2 is turned off and the sixth transistor M6 is turned on; the first gate driving signal at the current stage is the logic low-level signal, the fourth transistor M4 is turned off, the fifth transistor M5 is turned on and the third transistor M3 is turned off, the first gate driving signal at the subsequent stage is the logic high-level signal, the first transistor M1 is turned on, the seventh transistor M7 is turned off and no action.

In a T5 phase, i.e., in the light-emitting phase, the first gate driving signal at the previous stage is the logic low-level signal, and the second transistor M2 is turned off and the sixth transistor M6 is turned on; the first gate driving signal at the current stage is the logic low-level signal, the fourth transistor M4 is turned off, the fifth transistor M5 is turned on and the third transistor M3 is turned off; and the first gate driving signal at the subsequent stage is the logic low-level signal, the first transistor M1 is turned off and the seventh transistor M7 is turned on. A first power voltage signal of a first power signal terminal PVDD is written into a first terminal of the driving transistor 110 through the turned-on seventh transistor M7 and the turned-on sixth transistor M6, the driving transistor 110 generates a driving current, and the driving current flows into the light-emitting component 20 through the fifth transistor M5 to drive the light-emitting component 20 to emit light.

It should be noted that FIGS. 43 and 44 exemplarily show that the fifth transistor M5, the sixth transistor M6, the seventh transistor M7 and the driving transistor 110 are P-type transistors, and the first transistor M1, the second transistor M2, the fourth transistor M4 and the third transistor M3 are N-type transistors, but this is not a limitation to the present disclosure. Generally, the P-type transistor is turned on under the control of the logic low-level signal and turned off under the control of the logic high-level signal. The N-type transistor is turned on under the control of the logic high-level signal, and turned off under the control of the logic low-level signal. In some optional embodiments, the transistors in the pixel driving circuit 10 may all be N-type transistors, or P-type transistors, or some transistors in the pixel driving circuit 10 are N-type transistors and some transistors in the pixel driving circuit 10 are P-type transistors. The type of each transistor in the pixel driving circuit 10 is not specifically limited in the embodiment of the present disclosure.

Based on the above technical solution, optionally, a transistor in the threshold compensation module 140 is a semiconductor oxide transistor. Exemplarily, a transistor in the threshold compensation module 140 may be an indium gallium zinc oxide transistor. It can be understood that the relatively small leakage current of the semiconductor oxide transistor is beneficial to stabilizing the voltage of the first node N1, thereby stabilizing the driving current generated by the driving transistor 110 and improving the uniformity of the luminous luminance of the light-emitting component 20.

Optionally, when a second terminal of the first initialization module 150 is electrically connected to the first node N1, a transistor in the first initialization module 150 is a semiconductor oxide transistor. Exemplarily, a transistor in the first initialization module 150 may be an indium gallium zinc oxide transistor. In this way, it is beneficial to stabilizing the voltage of the first node N1, thereby stabilizing the driving current generated by the driving transistor 110, and is beneficial to improving the uniformity of the luminous luminance of the light-emitting component 20.

Figure 45:
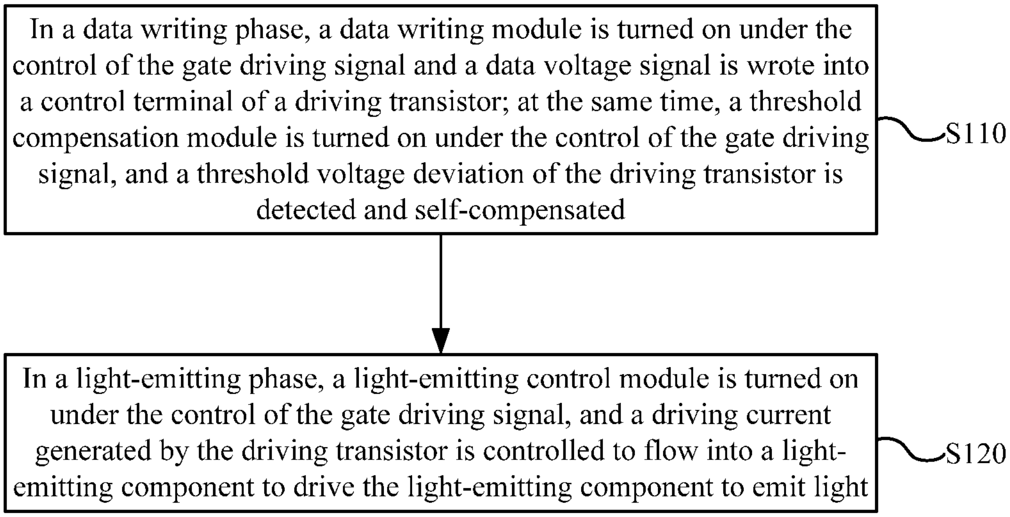
FIG. 45 is a flowchart of a driving method of a display panel provided by an embodiment of the present disclosure.

Based on the above inventive concept, the embodiments of the present disclosure further provide a driving method of a display panel. The driving method is applicable to the display panel described in any embodiment of the present disclosure, and a gate driving circuit is used for outputting a gate driving signal. FIG. 45 is a flowchart of a driving method of a display panel according to an embodiment of the present disclosure. Referring to FIG. 45, the method includes steps described below.

In S110, in a data writing phase, a data writing module is turned on under the control of the gate driving signal and a data voltage signal is wrote into a control terminal of a driving transistor; at the same time, a threshold compensation module is turned on under the control of the gate driving signal, and a threshold voltage deviation of the driving transistor is detected and self-compensated.

In S120, in a light-emitting phase, a light-emitting control module is turned on under the control of the gate driving signal, and a driving current generated by the driving transistor is controlled to flow into a light-emitting component to drive the light-emitting component to emit light.

The threshold compensation module and the light-emitting control module are controlled by the gate driving signal output by a same gate driving circuit, and the threshold compensation module is turned on in response to the gate driving signal being at a first level, and the light-emitting control module is turned on in response to the gate driving signal being at a second level; the first level and the second level are different.

Optionally, the display panel further includes a first initialization module, a control terminal of the first initialization module is electrically connected to the gate driving circuit. The first initialization module is configured for providing an initialization voltage signal at least for the control terminal of the driving transistor; the method further includes steps described below.

In an initialization phase, the first initialization module is turned on under the control of the gate driving signal and at least the initialization voltage signal is provided for the control terminal of the driving transistor.

Based on the above solution, optionally, the light-emitting control module includes a first light-emitting control unit and a second light-emitting control unit. The first light-emitting control unit is electrically connected between a first power signal terminal and a first terminal of the driving transistor. The second light-emitting control unit is electrically connected between a second terminal of the driving transistor and the light-emitting component; the display panel includes a first gate driving circuit and a second gate driving circuit; the first gate driving circuit includes multiple cascaded first gate driving units and the second gate driving circuit includes multiple cascaded second gate driving units; a control terminal of the data writing module is electrically connected to an output terminal of the second gate driving unit at the current stage; a control terminal of the light-emitting control unit and a control terminal of the threshold compensation module are electrically connected to an output terminal of the first gate driving unit at the current stage; a control terminal of the second light-emitting control unit is electrically connected to the output terminal of the first gate driving unit at the current stage or an output terminal of the first gate driving unit at the subsequent stage; the first initialization module is electrically connected between the initialization signal terminal and the second terminal of the driving transistor, and the control terminal of the first initialization module is electrically connected to the output terminal of the second gate driving unit at the previous stage; when the control terminal of the second light-emitting control unit is electrically connected to the output terminal of the first gate driving unit at the current stage, the first initialization module is used for providing the initialization voltage signal to the control terminal of the driving transistor; when the control terminal of the second light-emitting control unit is electrically connected to the output terminal of the first gate driving unit at the subsequent stage, the first initialization module is used for providing the initialization voltage signal for the control terminal of the driving transistor and the anode of the light-emitting component, as shown in FIGS. 9 and 14.

The step in which in the initialization phase, the first initialization module is turned on under the control of the gate driving signal and at least the initialization voltage signal is provided for the control terminal of the driving transistor includes steps described below.

In the initialization phase, the first initialization module is turned on under the control of the second gate driving signal at the previous stage, at the same time, the threshold compensation module is turned on under the control of the first gate driving signal at the current stage, and provides the initialization voltage signal for the control terminal of the driving transistor.

The step in which in the data writing phase, the data writing module is turned on under the control of the gate driving signal and the data voltage signal is wrote into the control terminal of the driving transistor; at the same time, the threshold compensation module is turned on under the control of the gate driving signal, and the threshold voltage deviation of the driving transistor is detected and self-compensated includes steps described below.

In the data writing phase, the data writing module is turned on under the control of the second gate driving signal at the current stage and the data voltage signal is wrote into the control terminal of the driving transistor; at the same time, the threshold compensation module is turned on under the control of the first gate driving signal at the current stage, and the threshold voltage deviation of the driving transistor is detected and self-compensated.

The step in which in the light-emitting phase, the light-emitting control module is turned on under the control of the gate driving signal, and the driving current generated by the driving transistor is controlled to flow into the light-emitting component to drive the light-emitting component to emit light includes steps described below.

In the light-emitting phase, the first light-emitting control unit and the second light-emitting control unit are turned on under the control of the first gate driving signal at the current stage, and the driving current generated by the driving transistor is controlled to flow into the light-emitting component; or the first light-emitting control unit is turned on under the control of the first gate driving signal at the current stage and the second light-emitting control unit is turned on under the control of the first gate driving signal at the subsequent stage, the driving current generated by the driving transistor is controlled to flow into the light-emitting component.

When the control terminal of the second light-emitting control unit is electrically connected to the output terminal of the first gate driving unit at the subsequent stage, the method further includes: in the initialization phase, turning on the first initialization module under the control of the first gate driving signal at the previous stage and turning on the second light-emitting control unit under the control of the first gate driving signal at the subsequent stage, providing the initialization voltage signal for the anode of the light-emitting component.

Optionally, the control terminal of the second light-emitting control unit is electrically connected to the output terminal of the first gate driving unit at the current stage; the pixel driving circuit further includes a second initialization module which is electrically connected between the initialization signal terminal and the anode of the light-emitting component, an control terminal of the second initialization module is electrically connected to the output terminal of the second gate driving unit at the current stage, as shown in FIG. 12.

The method further includes: in the data writing phase, turning on the second initialization module under the control of the second gate driving signal at the current stage and providing the initialization voltage signal for the anode of the light-emitting component.

Optionally, the light-emitting control module includes the first light-emitting control unit and the second light-emitting control unit; the first light-emitting control unit is electrically connected between the first power signal terminal and the first terminal of the driving transistor; the second light-emitting control unit is electrically connected between the second terminal of the driving transistor and the light-emitting component; the pixel driving circuit further includes a blocking module, which is electrically connected between the first power signal terminal and the first terminal of the driving transistor and is connected in series to the first light-emitting control unit, a control terminal of the blocking module is electrically connected to an output terminal of the gate driving circuit, as shown in FIG. 17.

The method further includes a step described below. In the data writing phase, the blocking module is turned off under the control of the gate driving signal to block a first power voltage signal of the first power signal terminal from being transmitted to the first terminal of the driving transistor.

Optionally, the display panel includes the first gate driving circuit and the second gate driving circuit. The first gate driving circuit includes multiple cascaded first gate driving units and the second gate driving circuit includes multiple cascaded second gate driving units; the control terminal of the data writing module is electrically connected to the output terminal of the second gate driving unit at the current stage; a control terminal of the first light-emitting control unit is electrically connected to an output terminal of the first gate driving unit at the previous stage; the control terminal of the blocking module and a control terminal of the threshold compensation module are electrically connected to the output terminal of the first gate driving unit at the current stage; a control terminal of the second light-emitting control unit is electrically connected to the output terminal of the first gate driving unit at the current stage or the output terminal of the first gate driving unit at the subsequent stage; the first initialization module is electrically connected between the initialization signal terminal and the control terminal of the driving transistor, and the control terminal of the first initialization module is electrically connected to the output terminal of the first gate driving unit at the previous stage; when the control terminal of the second light-emitting control unit is electrically connected to the output terminal of the first gate driving unit at the current stage, the first initialization module is used for providing the initialization voltage signal to the control terminal of the driving transistor; when the control terminal of the second light-emitting control unit is electrically connected to the output terminal of the first gate driving unit at the subsequent stage, the first initialization module is used for providing the initialization voltage signal for the control terminal of the driving transistor and the anode of the light-emitting component, as shown in FIGS. 19 and 24.

The step in which in the initialization phase, the first initialization module is turned on under the control of the gate driving signal and at least the initialization voltage signal is provided for the control terminal of the driving transistor includes steps described below.

In the initialization phase, the first initialization module is turned on under the control of the first gate driving signal at the previous stage and the initialization voltage signal is provided for the control terminal of the driving transistor.

The step in which in the data writing phase, the blocking module is turned off under the control of the gate driving signal to block the first power voltage signal of the first power signal terminal from being transmitted to the first terminal of the driving transistor includes a step described below.

In the data writing phase, the blocking module is turned off under the control of the first gate driving signal at the current stage to block the first power voltage signal of the first power signal terminal from being transmitted to the first terminal of the driving transistor.

The step in which in the data writing phase, the data writing module is turned on under the control of the gate driving signal and the data voltage signal is wrote into the control terminal of the driving transistor; at the same time, the threshold compensation module is turned on under the control of the gate driving signal, and the threshold voltage deviation of the driving transistor is detected and self-compensated includes steps described below.

In the data writing phase, the data writing module is turned on under the control of the second gate driving signal at the current stage and the data voltage signal is wrote into the control terminal of the driving transistor; at the same time, the threshold compensation module is turned on under the control of the first gate driving signal at the current stage, and the threshold voltage deviation of the driving transistor is detected and self-compensated.

The step in which in the light-emitting phase, the light-emitting control module is turned on under the control of the gate driving signal, and the driving current generated by the driving transistor is controlled to flow into the light-emitting component to drive the light-emitting component to emit light includes steps described below.

In the light-emitting phase, the first light-emitting control unit is turned on under the control of the first gate driving signal at the previous stage and the second light-emitting control unit is turned on under the control of the first gate driving signal at the current stage, at the same time, the blocking module is turned on under the control of the first gate driving signal at the current stage and the driving current generated by the driving transistor is controlled to flow into the light-emitting component; or the first light-emitting control unit is turned on under the control of the first gate driving signal at the previous stage and the second light-emitting control unit is turned on under the control of the first gate driving signal at the subsequent stage, at the same time, the blocking module is turned on under the control of the first gate driving signal at the current stage and the driving current generated by the driving transistor is controlled to flow into the light-emitting component.

When the control terminal of the second light-emitting control unit is electrically connected to the output terminal of the first gate driving unit at the subsequent stage, the method further includes steps described below. In the initialization phase, the first initialization module is turned on under the control of the first gate driving signal at the previous stage and the second light-emitting control unit is turned on under the control of the first gate driving signal at the subsequent stage, the initialization voltage signal is provided for the anode of the light-emitting component.

Optionally, the control terminal of the second light-emitting control unit is electrically connected to the output terminal of the first gate driving unit at the current stage; the pixel driving circuit further includes a second initialization module which is electrically connected between the initialization signal terminal and the anode of the light-emitting component, an control terminal of the second initialization module is electrically connected to the output terminal of the second gate driving unit at the current stage, as shown in FIG. 22.

The method further includes steps described below. In the data writing phase, the second initialization module is turned on under the control of the second gate driving signal at the current stage and the initialization voltage signal is provided for the anode of the light-emitting component.

Optionally, the display panel includes the first gate driving circuit and the second gate driving circuit; the first gate driving circuit includes multiple cascaded first gate driving units, the second gate driving circuit includes multiple cascaded second gate driving units; the control terminal of the data writing module is electrically connected to the output terminal of the second gate driving unit at the current stage; the control terminal of the first light-emitting control unit is electrically connected to the output terminal of the first gate driving unit at the previous stage; the control terminal of the blocking module and the control terminal of the threshold compensation module are electrically connected to the output terminal of the first gate driving unit at the current stage; the control terminal of the second light-emitting control unit is electrically connected to the output terminal of the first gate driving unit at the current stage or the output terminal of the first gate driving unit at the subsequent stage; and the first initialization module is electrically connected between the initialization signal terminal and the second terminal of the driving transistor, the control terminal of the first initialization module is electrically connected to the output terminal of the first gate driving unit at the previous stage, and the first initialization module is used for providing the initialization voltage signal to the control terminal of the driving transistor and the anode of the light-emitting component.

The step in which in the initialization phase, the first initialization module is turned on under the control of the gate driving signal and at least the initialization voltage signal is provided for the control terminal of the driving transistor includes steps described below.

In the initialization phase, the first initialization module is turned on under the control of the first gate driving signal at the previous stage, at the same time, the threshold compensation module is turned on under the control of the first gate driving signal at the current stage, and the initialization voltage signal is provided for the control terminal of the driving transistor.

The step in which in the data writing phase, the blocking module is turned off under the control of the gate driving signal to block the first power voltage signal of the first power signal terminal from being transmitted to the first terminal of the driving transistor includes a step described below.

In the data writing phase, the blocking module is turned off under the control of the first gate driving signal at the current stage to block the first power voltage signal of the first power signal terminal from being transmitted to the first terminal of the driving transistor.

The step in which in the data writing phase, the data writing module is turned on under the control of the gate driving signal and the data voltage signal is wrote into the control terminal of the driving transistor; at the same time, the threshold compensation module is turned on under the control of the gate driving signal, and the threshold voltage deviation of the driving transistor is detected and self-compensated includes steps described below.

In the data writing phase, the data writing module is turned on under the control of the second gate driving signal at the current stage and the data voltage signal is wrote into the control terminal of the driving transistor; at the same time, the threshold compensation module is turned on under the control of the first gate driving signal at the current stage, and the threshold voltage deviation of the driving transistor is detected and self-compensated.

The step in which in the light-emitting phase, the light-emitting control module is turned on under the control of the gate driving signal, and the driving current generated by the driving transistor is controlled to flow into the light-emitting component to drive the light-emitting component to emit light includes steps described below.

In the light-emitting phase, the first light-emitting control unit is turned on under the control of the first gate driving signal at the previous stage and the second light-emitting control unit is turned on under the control of the first gate driving signal at the current stage, at the same time, the blocking module is turned on under the control of the first gate driving signal at the current stage and the driving current generated by the driving transistor is controlled to flow into the light-emitting component; or the first light-emitting control unit is turned on under the control of the first gate driving signal at the previous stage and the second light-emitting control unit is turned on under the control of the first gate driving signal at the subsequent stage, at the same time, the blocking module is turned on under the control of the first gate driving signal at the current stage and the driving current generated by the driving transistor is controlled to flow into the light-emitting component.

When the control terminal of the second light-emitting control unit is electrically connected to the output terminal of the first gate driving unit at the subsequent stage, the method further includes steps described below. In the initialization phase, the first initialization module is turned on under the control of the first gate driving signal at the previous stage and the second light-emitting control unit is turned on under the control of the first gate driving signal at the subsequent stage, the initialization voltage signal is provided for the anode of the light-emitting component.

Optionally, the display panel includes the first gate driving circuit, and the first gate driving circuit includes multiple cascaded first gate driving units. The control terminal of the first light-emitting control unit is electrically connected to the output terminal of the first gate driving unit at the previous stage, and the control terminal of the blocking module and the control terminal of the data writing module are electrically connected to the output terminal of the first gate driving unit at the current stage or the output terminal of the first gate driving unit at the subsequent stage. The control terminal of the threshold compensation module and the control terminal of the second light-emitting control unit are electrically connected to the output terminal of the first gate driving unit at the current stage. and the first initialization module is electrically connected between the initialization signal terminal and the control terminal of the driving transistor. The control terminal of the first initialization module is electrically connected to the output terminal of the first gate driving unit at the previous stage, and the first initialization module is used for providing the initialization voltage signal for the control terminal of the driving transistor, as shown in FIGS. 30 and 31.

The step in which in the initialization phase, the first initialization module is turned on under the control of the gate driving signal and at least the initialization voltage signal is provided for the control terminal of the driving transistor includes steps described below.

In the initialization phase, the first initialization module is turned on under the control of the first gate driving signal at the previous stage and the initialization voltage signal is provided for the control terminal of the driving transistor.

The step in which in the data writing phase, the blocking module is turned off under the control of the gate driving signal to block the first power voltage signal of the first power signal terminal from being transmitted to the first terminal of the driving transistor; the data writing module is turned on under the control of the gate driving signal and the data voltage signal is wrote into the control terminal of the driving transistor; at the same time, the threshold compensation module is tuned on under the control of the gate driving signal, and the threshold voltage deviation of the driving transistor is detected and self-compensated, in the light-emitting phase, the light-emitting control module is turned on under the control of the gate driving signal, and the driving current generated by the driving transistor is controlled to flow into the light-emitting component includes steps described below.

In the data writing phase, the blocking module is turned off under the control of the first gate driving signal at the current stage to block the first power voltage signal of the first power signal terminal from being transmitted to the first terminal of the driving transistor; the data writing module is turned on under the control of the first gate driving signal at the current stage and the data voltage signal is wrote into the control terminal of the driving transistor; at the same time, the threshold compensation module is turned on under the control of the first gate driving signal at the current stage, and the threshold voltage deviation of the driving transistor is detected and self-compensated, in the light-emitting phase, the first light-emitting control unit is turned on under the control of the first gate driving signal at the previous stage and the second light-emitting control unit is turned on under the control of the first gate driving signal at the current stage, at the same time, the blocking module is turned on under the control of the first gate driving signal at the current stage and the driving current generated by the driving transistor is controlled to flow into the light-emitting component.

Alternatively, in the data writing phase, the blocking module is turned off under the control of the first gate driving signal at the subsequent stage to block the first power voltage signal of the first power signal terminal from being transmitted to the first terminal of the driving transistor; the data writing module is turned on under the control of the first gate driving signal at the subsequent stage and the data voltage signal is wrote into the control terminal of the driving transistor; at the same time, the threshold compensation module is turned on under the control of the first gate driving signal at the current stage, and the threshold voltage deviation of the driving transistor is detected and self-compensated, in the light-emitting phase, the first light-emitting control unit is turned on under the control of the first gate driving signal at the previous stage and the second light-emitting control unit is turned on under the control of the first gate driving signal at the current stage, at the same time, the blocking module is turned on under the control of the first gate driving signal at the subsequent stage and the driving current generated by the driving transistor is controlled to flow into the light-emitting component.

Optionally, the display panel further includes the second gate driving circuit, the second gate driving circuit includes multiple cascaded second gate driving units; the pixel driving circuit further includes the second initialization module, the second initialization module is electrically connected between the initialization signal terminal and the anode of the light-emitting component, the control terminal of the second initialization module is electrically connected to the output terminal of the second gate driving unit at the current stage.

As shown in FIG. 36, when the control terminal of the blocking module and the control terminal of the data writing module are electrically connected to the output terminal of the first gate driving unit at the current stage, the method further includes steps described below. In the data writing phase, the second initialization module is turned on under the control of the second gate driving signal at the current stage and the initialization voltage signal is provided for the anode of the light-emitting component.

As shown in FIG. 37, when the control terminal of the blocking module and the control terminal of the data writing module are electrically connected to the output terminal of the first gate driving unit at the subsequent stage, the method further includes steps described below. In the initialization phase, the second initialization module is turned on under the control of the second gate driving signal at the current stage and the initialization voltage signal is provided for the anode of the light-emitting component.

Optionally, the pixel driving circuit further includes the second initialization module which is electrically connected between the initialization signal terminal and the anode of the light-emitting component, and the control terminal of the second initialization module is electrically connected to the output terminal of the first gate driving unit at the current stage.

As shown in FIG. 41, when the control terminal of the blocking module and the control terminal of the data writing module are electrically connected to the output terminal of the first gate driving unit at the current stage, the method further includes steps described below. In the data writing phase, the second initialization module is turned on under the control of the first gate driving signal at the current stage and the initialization voltage signal is provided for the anode of the light-emitting component.

As shown in FIG. 42, when the control terminal of the blocking module and the control terminal of the data writing module are electrically connected to the output terminal of the first gate driving unit at the subsequent stage, the method further includes steps described below. In the initialization phase and the data writing phase, the second initialization module is turned on under the control of the first gate driving signal at the current stage and the second initialization module provides the initialization voltage signal for the anode of the light-emitting component.

Based on the above inventive concept, the embodiments of the present disclosure further provide a display device. The display device includes the display panel described in any embodiment of the present disclosure. Therefore, the display device also has the beneficial effects of the display panel provided by the embodiments of the present disclosure, and the same content may be understood by referring to the above description and is not repeated hereinafter.

Figure 46:
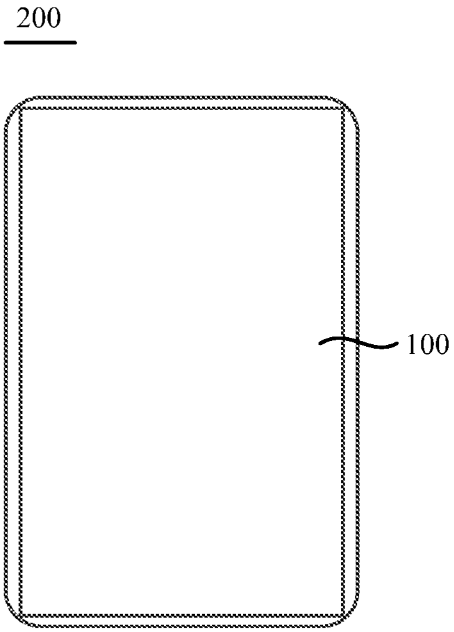
FIG. 46 is a structural diagram of a display device provided by an embodiment of the present disclosure.

Exemplarily, FIG. 46 is a structural diagram of a display device provided by an embodiment of the present disclosure. As shown in FIG. 46, the display device 200 provided by this embodiment of the present disclosure includes the display panel 100 provided by the embodiments of the present disclosure. The display device 200, for example, may be a touch display screen, a mobile phone, a tablet, a laptop, a television or any electronic device having a display function.

It is to be noted that the above are merely preferred embodiments of the present disclosure and the technical principles used therein. It is to be understood by those skilled in the art that the present disclosure is not limited to the specific embodiments described herein. Those skilled in the art can make various apparent modifications, adaptations, combinations and substitutions without departing from the scope of the present disclosure. Therefore, while the present disclosure has been described in detail through the preceding embodiments, the present disclosure is not limited to the preceding embodiments and may further include more other equivalent embodiments without departing from the concept of the present disclosure. The scope of the present disclosure is determined by the scope of the appended claims.

What is claimed is:

1. A display panel, comprising:

a gate driving circuit, a pixel driving circuit, and a light-emitting component;

wherein the pixel driving circuit comprises a driving transistor, a data writing module, a threshold compensation module, and a light-emitting control module;

wherein the data writing module is configured for transmitting a data voltage signal to a control terminal of the driving transistor such that the driving transistor generates a driving current according to the data voltage signal provided by a data signal terminal;

wherein the threshold compensation module is configured for detecting and self-compensating a threshold voltage deviation of the driving transistor;

wherein the light-emitting control module is connected in series between a first power signal terminal and the light-emitting component; and wherein a transistor in the threshold compensation module is a P-type transistor and a transistor in the light-emitting control module is an N-type transistor, or the transistor in the threshold compensation module is an N-type transistor and the transistor in the light-emitting control module is P-type transistor; a control terminal of the threshold compensation module and a control terminal of the light-emitting control module are electrically connected to a same gate driving circuit;

wherein the light-emitting control module comprises a first light-emitting control unit and a second light-emitting control unit;

the first light-emitting control unit is electrically connected between the first power signal terminal and a first terminal of the driving transistor, and the second light-emitting control unit is electrically connected between a second terminal of the driving transistor and the light-emitting component;

wherein the pixel driving circuit further comprises a blocking module which is electrically connected between the first power signal terminal and the first terminal of the driving transistor, and is connected in series to the first light-emitting control unit, a control terminal of the blocking module is electrically connected to an output terminal of the gate driving circuit; the blocking module is configured for blocking a first power voltage signal of the first power signal terminal from being transmitted to the first terminal of the driving transistor in a data writing phase;

wherein the display panel further comprises a first gate driving circuit and a second gate driving circuit; the first gate driving circuit comprises a plurality of cascaded first gate driving units, the second gate driving circuit comprises a plurality of cascaded second gate driving units;

a control terminal of the data writing module is electrically connected to an output terminal of the second gate driving unit at a current stage;

a control terminal of the first light-emitting control unit is electrically connected to an output terminal of the first gate driving unit at a previous stage;

control terminals of both the blocking module and the threshold compensation module are electrically connected to an output terminal of the first gate driving unit at a current stage;

a control terminal of the second light-emitting control unit is electrically connected to the output terminal of the first gate driving unit at the current stage;

the display panel further comprises a first initialization module which is electrically connected between an initialization signal terminal and the control terminal of the driving transistor, and a control terminal of the first initialization module is electrically connected to the output terminal of the first gate driving unit at the previous stage and the first initialization module is configured for providing an initialization voltage signal for the control terminal of the driving transistor.

2. The display panel of claim 1, wherein the display panel comprises at most two gate driving circuits.

3. The display panel of claim 1, wherein the control terminal of the second light-emitting control unit is electrically connected to the output terminal of the first gate driving unit at the current stage;

the pixel driving circuit further comprises a second initialization module which is electrically connected between the initialization signal terminal and the anode of the light-emitting component, and a control terminal of the second initialization module is electrically connected to the output terminal of the second gate driving unit at the current stage; the second initialization module is configured for providing the initialization voltage signal for the anode of the light-emitting component.

4. The display panel of claim 1, wherein the display panel comprises a first gate driving circuit and a second gate driving circuit; the first gate driving circuit comprises a plurality of cascaded first gate driving units, the second gate driving circuit comprises a plurality of cascaded second gate driving units;

a control terminal of the data writing module is electrically connected to an output terminal of the second gate driving unit at a current stage;

a control terminal of the first light-emitting control unit is electrically connected to an output terminal of the first gate driving unit at a previous stage;

the control terminal of the blocking module and the control terminal of the threshold compensation module are both electrically connected to an output terminal of the first gate driving unit at a current stage;

a control terminal of the second light-emitting control unit is electrically connected to the output terminal of the first gate driving unit at the current stage or an output terminal of the first gate driving unit at a subsequent stage;

the display panel further comprises a first initialization module which is electrically connected between an initialization signal terminal and the second terminal of the driving transistor, and a control terminal of the first initialization module is electrically connected to the output terminal of the first gate driving unit at the previous stage; the first initialization module is configured for providing an initialization voltage signal for an anode of the light-emitting component.

5. The display panel of claim 1, wherein the display panel comprises a first gate driving circuit, and the first gate driving circuit comprises a plurality of cascaded first gate driving units;

a control terminal of the first light-emitting control unit is electrically connected to an output terminal of the first gate driving unit at a previous stage;

control terminals of both the blocking module and the data writing module are electrically connected to an output terminal of the first gate driving unit at a current stage or an output terminal of the first gate driving unit at a subsequent stage;

the control terminal of the threshold compensation module and a control terminal of the second light-emitting control unit are electrically connected to the output terminal of the first gate driving unit at the current stage; and the display panel further comprises a first initialization module which is electrically connected between an initialization signal terminal and the control terminal of the driving transistor, and a control terminal of the first initialization module is electrically connected to the output terminal of the first gate driving unit at the previous stage; the first initialization module is configured for providing an initialization voltage signal for the control terminal of the driving transistor.

6. The display panel of claim 5, wherein the display panel further comprises a second gate driving circuit, and the second gate driving circuit comprises a plurality of cascaded second gate driving units;

the pixel driving circuit further comprises a second initialization module which is electrically connected between the initialization signal terminal and an anode of the light-emitting component, and a control terminal of the second initialization module is electrically connected to an output terminal of the second gate driving unit at a current stage; the second initialization module is configured for providing the initialization voltage signal for the anode of the light-emitting component.

7. The display panel of claim 5, the pixel driving circuit further comprises a second initialization module which is electrically connected between the initialization signal terminal and an anode of the light-emitting component, and a control terminal of the second initialization module is electrically connected to the output terminal of the first gate driving unit at the current stage; the second initialization module is configured for providing the initialization voltage signal for the anode of the light-emitting component.

8. The display panel of claim 1, wherein the transistor in the threshold compensation module is a semiconductor oxide transistor.

9. The display panel of claim 1, wherein a transistor in the first initialization module is a semiconductor oxide transistor.

10. The display panel of claim 1, wherein the display panel further comprises a storage module which is electrically connected between the first power signal terminal and the control terminal of the driving transistor and is configured for stabilizing a voltage of the control terminal of the driving transistor in a light-emitting phase.

11. The display panel of claim 10, wherein the storage module comprises one capacitor or multiple capacitors connected in parallel.

12. A display device, comprising the display panel of claim 1.

13. A driving method of a display panel, wherein the driving method is applied to the display panel of claim 1, and the method comprises:

in a data writing phase, turning on a data writing module and writing a data voltage signal into a control terminal of a driving transistor; at the same time, turning on a threshold compensation module, and detecting and self-compensating a threshold voltage deviation of the driving transistor;

in a light-emitting phase, turning on a first light-emitting control unit and a second light-emitting control unit, and controlling a driving current generated by the driving transistor to flow into a light-emitting component to drive the light-emitting component to emit light;

wherein the threshold compensation module and the light-emitting control module are controlled by a gate driving signal output by a same gate driving circuit, and the threshold compensation module is turned on in response to the gate driving signal being at a first level, and the light-emitting control module is turned on in response to the gate driving signal being at a second level, and the first level and the second level are different;

the method further comprises: in the data writing phase, turning off a blocking module to block a first power voltage signal of a first power signal terminal from being transmitted to a first terminal of the driving transistor;

wherein the display panel comprises a first gate driving circuit and a second gate driving circuit; the first gate driving circuit comprises a plurality of cascaded first gate driving units, the second gate driving circuit comprises a plurality of cascaded second gate driving units;

a control terminal of the data writing module is electrically connected to an output terminal of the second gate driving unit at a current stage;

a control terminal of the first light-emitting control unit is electrically connected to an output terminal of the first gate driving unit at a previous stage;

control terminals of both the blocking module and the threshold compensation module are electrically connected to an output terminal of the first gate driving unit at a current stage;

a control terminal of the second light-emitting control unit is electrically connected to the output terminal of the first gate driving unit at the current stage;

the display panel further comprises a first initialization module which is electrically connected between an initialization signal terminal and the control terminal of the driving transistor, a control terminal of the first initialization module is electrically connected to the output terminal of the first gate driving unit at the previous stage and the first initialization module is configured for providing an initialization voltage signal for the control terminal of the driving transistor;

the method further comprises: in an initialization phase, turning on the first initialization module under the control of a gate driving signal output from the output terminal of the first gate driving unit at the previous stage and providing the initialization voltage signal for the control terminal of the driving transistor;

in the data writing phase, turning off the blocking module to block the first power voltage signal of the first power signal terminal from being transmitted to the first terminal of the driving transistor comprises:

in the data writing phase, turning off the blocking module under the control of a gate driving signal output from the output terminal of the first gate driving unit at the current stage to block the first power voltage signal of the first power signal terminal from being transmitted to the first terminal of the driving transistor;

in the data writing phase, turning on the data writing module and writing the data voltage signal into the control terminal of the driving transistor; at the same time, turning on the threshold compensation module, and driving the control terminal of the transistor to detect and self-compensate the threshold voltage deviation of the driving transistor comprises:

in the data writing phase, turning on the data writing module under the control of a gate driving signal output from the output terminal of the second gate driving unit at the current stage and writing the data voltage signal into the control terminal of the driving transistor; at the same time, turning on the threshold compensation module under the control of the gate driving signal output from the output terminal of the first gate driving unit at the current stage, and driving the control terminal of the transistor to detect and self-compensate the threshold voltage deviation of the driving transistor;

in the light-emitting phase, turning on the first light-emitting control unit and the second light-emitting control unit, and controlling the driving current generated by the driving transistor to flow into the light-emitting component comprises:

in the light-emitting phase, turning on the first light-emitting control unit under the control of the gate driving signal output from the output terminal of the first gate driving unit at the previous stage and turning on the second light-emitting control unit under the control of the gate driving signal output from the output terminal of the first gate driving unit at the current stage, at the same time, turning on the blocking module under the control of the gate driving signal output from the output terminal of the first gate driving unit at the current stage and controlling the driving current generated by the driving transistor to flow into the light-emitting component.

14. The driving method of claim 13, wherein the control terminal of the second light-emitting control unit is electrically connected to the output terminal of the first gate driving unit at the current stage;

the pixel driving circuit further comprises a second initialization module which is electrically connected between the initialization signal terminal and the anode of the light-emitting component, and a control terminal of the second initialization module is electrically connected to the output terminal of the second gate driving unit at the current stage;

the method further comprises: in the data writing phase, turning on the second initialization module under the control of the gate driving signal output from the output terminal of the second gate driving unit at the current stage and providing the initialization voltage signal for the anode of the light-emitting component.

15. The driving method of claim 13, wherein the display panel comprises a first gate driving circuit and a second gate driving circuit, the first gate driving circuit comprises a plurality of cascaded first gate driving units, the second gate driving circuit comprises a plurality of cascaded second gate driving units;

a control terminal of the data writing module is electrically connected to an output terminal of the second gate driving unit at a current stage;

a control terminal of the first light-emitting control unit is electrically connected to an output terminal of the first gate driving unit at a previous stage;

the control terminal of the blocking module and the control terminal of the threshold compensation module are both electrically connected to an output terminal of the first gate driving unit at a current stage;

a control terminal of the second light-emitting control unit is electrically connected to the output terminal of the first gate driving unit at the current stage or an output terminal of the first gate driving unit at a subsequent stage;

the display panel further comprises a first initialization module which is electrically connected between an initialization signal terminal and a second terminal of the driving transistor, and a control terminal of the first initialization module is electrically connected to the output terminal of the first gate driving unit at the previous stage; the first initialization module is configured for providing an initialization voltage signal for the control terminal of the driving transistor and an anode of the light-emitting component;

the method further comprises: in an initialization phase, turning on the first initialization module under the control of a gate driving signal output from the output terminal of the first gate driving unit at the previous stage, at the same time, turning on the threshold compensation module under the control of a gate driving signal output from the output terminal of the first gate driving unit at the current stage, and providing the initialization voltage signal for the control terminal of the driving transistor;

in the data writing phase, turning off the blocking module to block the first power voltage signal of the first power signal terminal from being transmitted to the first terminal of the driving transistor comprises:

in the data writing phase, turning off the blocking module under the control of the gate driving signal output from the output terminal of the first gate driving unit at the current stage to block the first power voltage signal of the first power signal terminal from being transmitted to the first terminal of the driving transistor;

in the data writing phase, turning on the data writing module and writing the data voltage signal into the control terminal of the driving transistor; at the same time, turning on the threshold compensation module, and driving the control terminal of the transistor to detect and self-compensate a threshold voltage deviation of the driving transistor comprises:

in the data writing phase, turning on the data writing module under the control of a gate driving signal output from the output terminal of the second gate driving unit at the current stage and writing the data voltage signal into the control terminal of the driving transistor; at the same time, turning on the threshold compensation module under the control of the gate driving signal output from the output terminal of the first gate driving unit at the current stage, and driving the control terminal of the transistor to detect and self-compensate the threshold voltage deviation of the driving transistor;

in the light-emitting phase, turning on the first light-emitting control unit and the second light-emitting control unit, and controlling the driving current generated by the driving transistor to flow into the light-emitting component comprises:

in the light-emitting phase, turning on the first light-emitting control unit under the control of the gate driving signal output from the output terminal of the first gate driving unit at the previous stage and turning on the second light-emitting control unit under the control of the gate driving signal output from the output terminal of the first gate driving unit at the current stage, at the same time, turning on the blocking module under the control of the gate driving signal output from the output terminal of the first gate driving unit at the current stage and controlling the driving current generated by the driving transistor to flow into the light-emitting component; or turning on the first light-emitting control unit under the control of the gate driving signal output from the output terminal of the first gate driving unit at the previous stage and turning on the second light-emitting control unit under the control of a gate driving signal output from the output terminal of the first gate driving unit at the subsequent stage, at the same time, turning on the blocking module under the control of the gate driving signal output from the output terminal of the first gate driving unit at the current stage and controlling the driving current generated by the driving transistor to flow into the light-emitting component; and in response to the control terminal of the second light-emitting control unit being electrically connected to the output terminal of the first gate driving unit at the subsequent stage, the method further comprises: in the initialization phase, turning on the first initialization module under the control of the gate driving signal output from the output terminal of the first gate driving unit at the previous stage and turning on the second light-emitting control unit under the control of the gate driving signal output from the output terminal of the first gate driving unit at the subsequent stage, providing the initialization voltage signal for the anode of the light-emitting component.

16. The driving method of claim 13, wherein the display panel comprises a first gate driving circuit, and the first gate driving circuit comprises a plurality of cascaded first gate driving units;

a control terminal of the first light-emitting control unit is electrically connected to an output terminal of the first gate driving unit at a previous stage;

control terminals of both the blocking module and the data writing module are electrically connected to an output terminal of the first gate driving unit at a current stage or an output terminal of the first gate driving unit at a subsequent stage;

the control terminal of the threshold compensation module and the control terminal of the second light-emitting control unit are both electrically connected to the output terminal of the first gate driving unit at the current stage; and the display panel further comprises a first initialization module which is electrically connected between an initialization signal terminal and the control terminal of the driving transistor, and a control terminal of the first initialization module is electrically connected to the output terminal of the first gate driving unit at the previous stage; the first initialization module is configured for providing an initialization voltage signal for the control terminal of the driving transistor;

the method further comprises: in an initialization phase, turning on the first initialization module under the control of a gate driving signal output from the output terminal of the first gate driving unit at the previous stage and providing the initialization voltage signal for the control terminal of the driving transistor;

in the data writing phase, turning off the blocking module to block the first power voltage signal of the first power signal terminal from being transmitted to the first terminal of the driving transistor; turning on the data writing module and writing the data voltage signal into the control terminal of the driving transistor; at the same time, turning on the threshold compensation module, and driving the control terminal of the transistor to detect and self-compensate the threshold voltage deviation of the driving transistor, in the light-emitting phase, turning on the first light-emitting control unit and the second light-emitting control unit, and controlling the driving current generated by the driving transistor to flow into the light-emitting component comprises:

in the data writing phase, turning off the blocking module under the control of a gate driving signal output from the output terminal of the first gate driving unit at the current stage to block the first power voltage signal of the first power signal terminal from being transmitted to the first terminal of the driving transistor; turning on the data writing module under the control of the gate driving signal output from the output terminal of the first gate driving unit at the current stage and writing the data voltage signal into the control terminal of the driving transistor; at the same time, turning on the threshold compensation module under the control of the gate driving signal output from the output terminal of the first gate driving unit at the current stage, and driving the control terminal of the transistor to detect and self-compensate the threshold voltage deviation of the driving transistor, in the light-emitting phase, turning on the first light-emitting control unit under the control of the gate driving signal output from the output terminal of the first gate driving unit at the previous stage and turning on the second light-emitting control unit under the control of the gate driving signal output from the output terminal of the first gate driving unit at the current stage, at the same time, turning on the blocking module under the control of the gate driving signal output from the output terminal of the first gate driving unit at the current stage and controlling the driving current generated by the driving transistor to flow into the light-emitting component; or in the data writing phase, turning off the blocking module under the control of a gate driving signal output from the output terminal of the first gate driving unit at the subsequent stage to block the first power voltage signal of the first power signal terminal from being transmitted to the first terminal of the driving transistor; turning on the data writing module under the control of the gate driving signal output from the output terminal of the first gate driving unit at the subsequent stage and writing the data voltage signal into the control terminal of the driving transistor; at the same time, turning on the threshold compensation module under the control of a gate driving signal output from the output terminal of the first gate driving unit at the current stage, and driving the control terminal of the transistor to detect and self-compensate the threshold voltage deviation of the driving transistor, in the light-emitting phase, turning on the first light-emitting control unit under the control of the gate driving signal output from the output terminal of the first gate driving unit at the previous stage and turning on the second light-emitting control unit under the control of the gate driving signal output from the output terminal of the first gate driving unit at the current stage, at the same time, turning on the blocking module under the control of the gate driving signal output from the output terminal of the first gate driving unit at the subsequent stage and controlling the driving current generated by the driving transistor to flow into the light-emitting component.

17. The driving method of claim 16, wherein the display panel further comprises a second gate driving circuit, and the second gate driving circuit comprises a plurality of cascaded second gate driving units;

the pixel driving circuit further comprises a second initialization module which is electrically connected between the initialization signal terminal and an anode of the light-emitting component, and a control terminal of the second initialization module is electrically connected to an output terminal of the second gate driving unit at a current stage;

in response to the control terminal of the blocking module and the control terminal of the data writing module being electrically connected to the output terminal of the first gate driving unit at the current stage, the method further comprises: in the data writing phase, turning on the second initialization module under the control of a gate driving signal output from the output terminal of the second gate driving unit at the current stage and providing the initialization voltage signal to the anode of the light-emitting component; and in response to the control terminal of the blocking module and the control terminal of the data writing module being electrically connected to the output terminal of the first gate driving unit at the subsequent stage, the method further comprises: in the initialization phase, turning on the second initialization module under the control of the gate driving signal output from the output terminal of the second gate driving unit at the current stage and providing the initialization voltage signal to the anode of the light-emitting component.

18. The driving method of claim 16, wherein the pixel driving circuit further comprises a second initialization module, the second initialization module is electrically connected between the initialization signal terminal and an anode of the light-emitting component, and a control terminal of the second initialization module is electrically connected to the output terminal of the first gate driving unit at the current stage;

in response to the control terminal of the blocking module and the control terminal of the data writing module being electrically connected to the output terminal of the first gate driving unit at the current stage, the method further comprises: in the data writing phase, turning on the second initialization module under the control of the gate driving signal output from the output terminal of the first gate driving unit at the current stage and providing the initialization voltage signal to the anode of the light-emitting component; and in response to the control terminal of the blocking module and the control terminal of the data writing module being electrically connected to the output terminal of the first gate driving unit at the subsequent stage, the method further comprises: in the initialization phase and the data writing phase, turning on the second initialization module under the control of the gate driving signal output from the output terminal of the first gate driving unit at the current stage and providing the initialization voltage signal by the second initialization module to the anode of the light-emitting component.

* * * * *